(12) United States Patent
Chien

(10) Patent No.: US 11,632,520 B2
(45) Date of Patent: Apr. 18, 2023

(54) LED LIGHT HAS BUILT-IN CAMERA-ASSEMBLY TO CAPTURE COLORFUL DIGITAL-DATA UNDER DARK ENVIRONMENT

(71) Applicant: Tseng-Lu Chien, Walnut, CA (US)

(72) Inventor: Tseng-Lu Chien, Walnut, CA (US)

(73) Assignees: Aaron Chien, Walnut, CA (US); Hsin-Yi Wang, Walnut, CA (US); Te-Ju Chien, Walnut, CA (US)

( * ) Notice: Subject to any disclaimer, the term of this patent is extended or adjusted under 35 U.S.C. 154(b) by 0 days.

(21) Appl. No.: 16/220,544

(22) Filed: Dec. 14, 2018

(65) Prior Publication Data

US 2019/0253670 A1    Aug. 15, 2019

Related U.S. Application Data

(63) Continuation-in-part of application No. 15/972,798, filed on May 7, 2018, now Pat. No. 10,230,880, (Continued)

(51) Int. Cl.
*H04N 7/18* (2006.01)
*H04N 5/225* (2006.01)
(Continued)

(52) U.S. Cl.
CPC .............. *H04N 7/181* (2013.01); *F21S 4/28* (2016.01); *F21S 8/035* (2013.01); *F21S 8/038* (2013.01);
(Continued)

(58) Field of Classification Search
None
See application file for complete search history.

(56) References Cited

U.S. PATENT DOCUMENTS 4,896,039 A * 1/1990 Fraden ................ G01P 13/00
  250/338.3
5,083,106 A * 1/1992 Kostusiak ............ G08B 25/008
  340/506

(Continued)

OTHER PUBLICATIONS

Search report, Google search.*
Machine translation of KR20090063198A.*

*Primary Examiner* — Mohammad J Rahman
(74) *Attorney, Agent, or Firm* — Bacon & Thomas, PLLC

(57) ABSTRACT

A LED Light device for house or stores or business application having built-in camera unit is powered by AC or-and DC power source for a lamp-holder, LED bulb, security light, flashlight, car torch light, garden, entrance door light or other indoor or outdoor LED light device connected to power source by (1) prongs or (2) male-base has conductive piece can be inserted into a female receiving-piece which connect with power source or (3) wired or AC-plug wires. The device has built-in camera-system has plurality functions to make different products and functions. The LED light device has at least one of (a) camera or DV (digital video) to take minimum MP4 or 4K image or photos, (b) digital data memory kits or cloud storage station, (c) wireless connection kits, Bluetooth or USB set for download function, (d) MCU or CPU or IC with circuit with desired motion sensor/moving detector(s)/other sensor, (e) camera-assembly for connecting Wi-Fi, Wi-Fi extend, or-and 3G/4G/5G network or even settle-lite channel, (f) system to transmit or-and receiving wireless signal, (g) APP or other platform incorporated with pre-programed or even AI (artificial intelligence) software has optional area-selections function to make screen-comparison or image comparison to operation pre-program or related device including but not limited to detect moving object(s), face recognition or personal identification or-and habit or-and crime compari-
(Continued)

son, purchase, (h) LED light source to offer sufficient brightness under dark environment for camera-assembly take color data, (i) other electric or mechanical parts & accessories, (j) has moving detector and software built-in to make comparison to judge the movement object of the preferred screen selected-areas; to get desired function(s) for the said LED light device. The said motion sensor/moving detector or other sensor unit has desired camera and Wi-Fi system and part or all of digital data related module or circuit(s) or backup power, and (k) camera-assembly may in separated housing incorporated with all kind of existing light source so people can upgrade the non-camera device to has built-in camera and digital device for their old non-camera security light.

32 Claims, 29 Drawing Sheets

Related U.S. Application Data which is a continuation-in-part of application No. 15/901,251, filed on Feb. 21, 2018, now Pat. No. 10,264,170, which is a continuation-in-part of application No. 15/390,783, filed on Dec. 27, 2016, now Pat. No. 9,845,948, which is a continuation-in-part of application No. 15/268,125, filed on Sep. 16, 2016, now Pat. No. 9,832,430, which is a continuation-in-part of application No. 14/863,553, filed on Sep. 24, 2015, now Pat. No. 10,326,921, which is a continuation-in-part of application No. 14/793,209, filed on Jul. 7, 2015, now Pat. No. 9,549,110, which is a continuation-in-part of application No. 14/728,369, filed on Jun. 2, 2015, now Pat. No. 9,787,885, which is a continuation-in-part of application No. 14/265,738, filed on Apr. 30, 2014, now Pat. No. 9,560,322, and a continuation-in-part of application No. 13/295,301, filed on Nov. 14, 2011, now Pat. No. 8,760,514, which is a continuation-in-part of application No. 14/265,838, filed on Apr. 30, 2014, now Pat. No. 9,197,865, and a continuation-in-part of application No. 13/295,301, filed on Nov. 14, 2011, now Pat. No. 8,760,514.

(51) Int. Cl.

| | | |
|---|---|---|
| F21V 23/04 | (2006.01) | |
| F21S 8/00 | (2006.01) | |
| F21S 9/02 | (2006.01) | |
| F21S 10/00 | (2006.01) | |
| H04N 5/76 | (2006.01) | |
| F21V 14/02 | (2006.01) | |
| F21V 21/08 | (2006.01) | |
| F21V 21/14 | (2006.01) | |
| F21V 33/00 | (2006.01) | |
| G01S 3/786 | (2006.01) | |
| H04N 5/247 | (2006.01) | |
| H04N 5/235 | (2006.01) | |
| F21V 29/00 | (2015.01) | |
| F21S 4/28 | (2016.01) | |
| H04N 5/232 | (2006.01) | |
| F21V 21/29 | (2006.01) | |
| F21V 21/22 | (2006.01) | |
| F21S 2/00 | (2016.01) | |
| F21V 19/00 | (2006.01) | |
| F21K 9/235 | (2016.01) | |
| F21Y 115/10 | (2016.01) | |
| F21W 121/00 | (2006.01) | |
| F21Y 101/00 | (2016.01) | |
| F21V 9/08 | (2018.01) | |
| F21V 21/30 | (2006.01) | |
| G01S 13/04 | (2006.01) | |

(52) U.S. Cl.
CPC ............. *F21S 9/022* (2013.01); *F21S 10/002* (2013.01); *F21V 14/02* (2013.01); *F21V 21/08* (2013.01); *F21V 21/14* (2013.01); *F21V 23/04* (2013.01); *F21V 29/00* (2013.01); *F21V 33/0052* (2013.01); *G01S 3/7864* (2013.01); *H04N 5/2252* (2013.01); *H04N 5/2256* (2013.01); *H04N 5/2257* (2013.01); *H04N 5/2354* (2013.01); *H04N 5/23241* (2013.01); *H04N 5/247* (2013.01); *H04N 5/76* (2013.01); *H04N 7/183* (2013.01); *F21K 9/235* (2016.08); *F21S 2/005* (2013.01); *F21V 9/08* (2013.01); *F21V 19/006* (2013.01); *F21V 21/22* (2013.01); *F21V 21/29* (2013.01); *F21V 21/30* (2013.01); *F21V 23/0442* (2013.01); *F21V 23/0492* (2013.01); *F21W 2121/00* (2013.01); *F21Y 2101/00* (2013.01); *F21Y 2115/10* (2016.08); *G01S 13/04* (2013.01); *Y02B 10/30* (2013.01); *Y10S 362/80* (2013.01)

(56) References Cited

U.S. PATENT DOCUMENTS

| | | | |
|---|---|---|---|
| 5,107,120 A | 4/1992 | Tom | |
| 5,895,128 A * | 4/1999 | Kishimoto | G03B 15/05 |
| | | | 396/61 |
| 5,946,404 A | 8/1999 | Bakshi et al. | |
| 6,069,655 A * | 5/2000 | Seeley | H04N 7/181 |
| | | | 348/154 |
| 6,100,803 A | 8/2000 | Chang | |
| 6,270,228 B1 | 8/2001 | Axen et al. | |
| 6,686,952 B1 | 2/2004 | Brazier | |
| 6,812,970 B1 | 11/2004 | McBride | |
| 6,944,343 B2 * | 9/2005 | Lefler | G06T 7/0002 |
| | | | 348/86 |
| 7,161,483 B2 * | 1/2007 | Chung | H04L 12/2803 |
| | | | 340/12.53 |
| 7,321,783 B2 | 1/2008 | Kim | |
| 7,330,649 B2 | 2/2008 | Finizio et al. | |
| 7,346,196 B2 | 3/2008 | Gin | |
| 8,123,376 B2 * | 2/2012 | Van De Ven | F21K 9/64 |
| | | | 362/231 |
| 8,461,991 B2 | 6/2013 | Botha | |
| 8,588,677 B2 * | 11/2013 | Tijink | G07B 15/06 |
| | | | 455/3.01 |
| 9,441,793 B2 * | 9/2016 | Van De Ven | F21K 9/232 |
| 2002/0113697 A1 * | 8/2002 | Kaganer | G08B 13/19634 |
| | | | 340/541 |
| 2003/0016874 A1 * | 1/2003 | Lefler | G06T 7/0002 |
| | | | 382/229 |
| 2003/0197807 A1 | 10/2003 | Wu | |
| 2003/0216151 A1 * | 11/2003 | Kitano | H04M 19/048 |
| | | | 455/556.1 |
| 2004/0080615 A1 * | 4/2004 | Klein | G08B 13/19658 |
| | | | 348/143 |
| 2004/0130624 A1 * | 7/2004 | Ryley | G08B 13/19621 |
| | | | 348/155 |
| 2004/0192444 A1 * | 9/2004 | Morrison | G07F 17/32 |
| | | | 463/46 |
| 2004/0212678 A1 | 10/2004 | Cooper et al. | |
| 2005/0085131 A1 | 4/2005 | Sutherland | |
| 2005/0179539 A1 * | 8/2005 | Hill | G08B 13/19632 |
| | | | 340/539.1 |
| 2006/0038916 A1 * | 2/2006 | Knoedgen | H04N 17/00 |
| | | | 348/371 |
| 2006/0136544 A1 * | 6/2006 | Atsmon | A63H 3/28 |
| | | | 709/200 |

(56) References Cited

U.S. PATENT DOCUMENTS

| | | | |
|---|---|---|---|
| 2006/0146167 A1* | 7/2006 | Aizawa | G11B 27/34 348/333.01 |
| 2006/0164258 A1* | 7/2006 | Garibotto | G08G 1/017 340/937 |
| 2006/0179463 A1* | 8/2006 | Chisholm | G08B 13/19656 725/90 |
| 2006/0215031 A1* | 9/2006 | Krahnstoever | G06T 7/80 348/187 |
| 2006/0219776 A1* | 10/2006 | Finn | G06K 19/07732 235/380 |
| 2007/0013513 A1 | 1/2007 | Tang et al. | |
| 2007/0120058 A1* | 5/2007 | Blackwell | G01J 5/10 250/338.1 |
| 2007/0126700 A1* | 6/2007 | Wright | G06F 3/0317 345/161 |
| 2007/0152076 A1* | 7/2007 | Chiang | F25D 29/00 236/94 |
| 2007/0171625 A1* | 7/2007 | Glazner | H05B 45/37 362/95 |
| 2008/0151050 A1 | 6/2008 | Self | |
| 2008/0191864 A1* | 8/2008 | Wolfson | G06F 3/04815 340/524 |
| 2008/0225120 A1 | 9/2008 | Stuecker | |
| 2008/0252730 A1 | 10/2008 | Hong | |
| 2009/0059603 A1 | 3/2009 | Recker et al. | |
| 2009/0168063 A1* | 7/2009 | Kobayashi | G01J 3/02 356/404 |
| 2009/0180274 A1* | 7/2009 | Glazner | H05B 45/00 362/95 |
| 2009/0278937 A1* | 11/2009 | Botchen | G06K 9/00771 348/169 |
| 2010/0201820 A1* | 8/2010 | Lopota | G08B 13/1961 348/152 |
| 2010/0317371 A1* | 12/2010 | Westerinen | H04W 4/029 455/456.6 |
| 2011/0134239 A1 | 6/2011 | Vadai et al. | |
| 2011/0244798 A1* | 10/2011 | Daigle | H04L 67/12 455/41.2 |
| 2011/0280561 A1* | 11/2011 | Geffert | H04N 5/235 396/164 |
| 2012/0001755 A1* | 1/2012 | Conrady | H04N 7/186 340/540 |
| 2012/0019659 A1* | 1/2012 | Warzelhan | H04N 7/18 348/143 |
| 2012/0020060 A1* | 1/2012 | Myer | F21V 14/02 362/183 |
| 2012/0023171 A1* | 1/2012 | Redmond | H04W 76/14 709/205 |
| 2012/0028680 A1* | 2/2012 | Breed | B60N 2/0232 455/556.1 |
| 2012/0044354 A1* | 2/2012 | Cheng | H04N 5/23203 348/159 |
| 2012/0075442 A1* | 3/2012 | Vujic | G07C 9/257 235/472.01 |
| 2012/0084054 A1* | 4/2012 | Yuen | A61B 5/222 702/160 |
| 2012/0113514 A1* | 5/2012 | Rodman | G02B 27/646 359/556 |
| 2012/0143383 A1* | 6/2012 | Cooperrider | H05B 47/175 700/295 |
| 2012/0203086 A1* | 8/2012 | Rorabaugh | A61B 3/1173 600/321 |
| 2012/0250581 A1* | 10/2012 | Bilcu | G08B 25/009 370/254 |
| 2012/0258800 A1* | 10/2012 | Mikhailov | A63F 13/24 463/37 |
| 2012/0288114 A1 | 11/2012 | Duraiswami et al. | |
| 2013/0066623 A1* | 3/2013 | Chou | H04L 67/2823 704/2 |

* cited by examiner

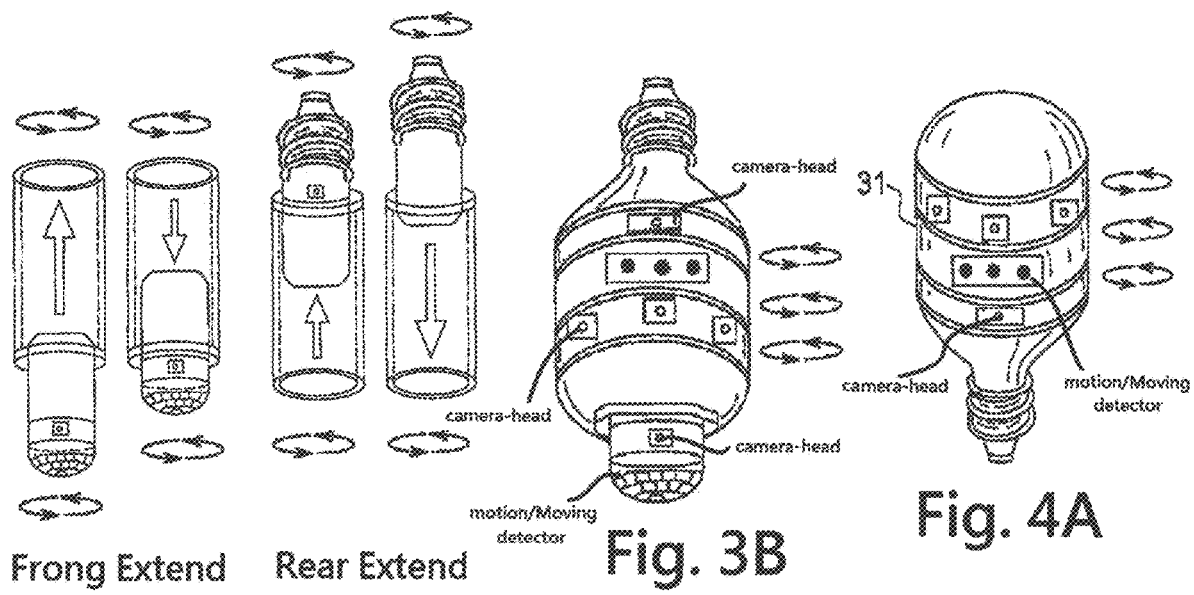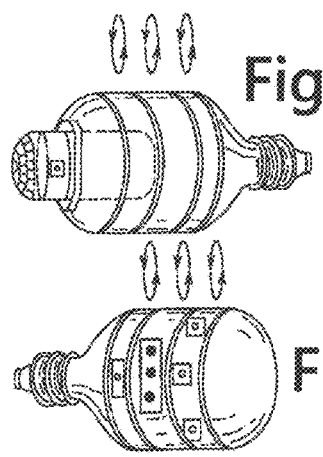

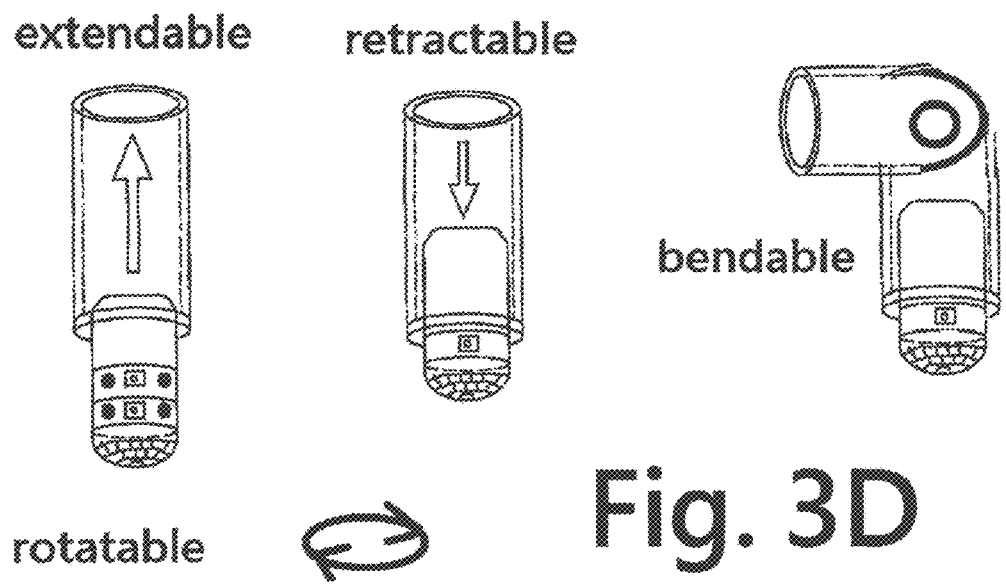
Fig. 3D
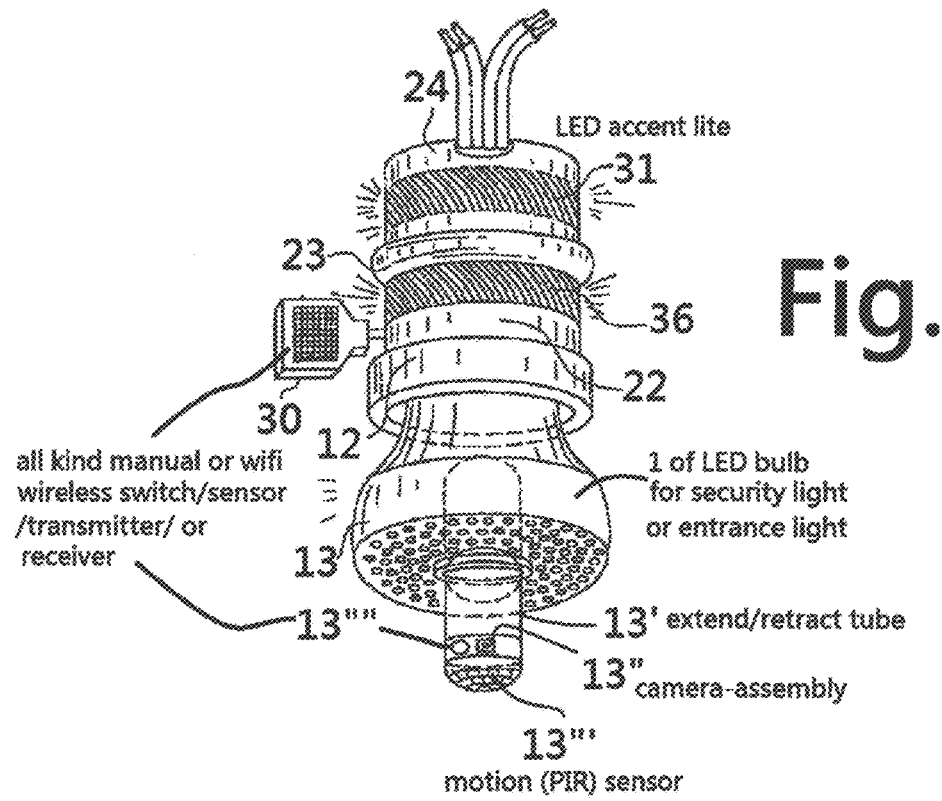
Fig. 3E

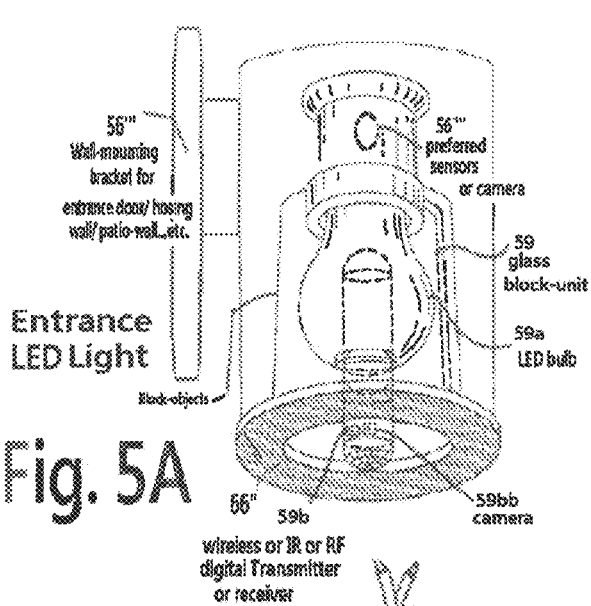
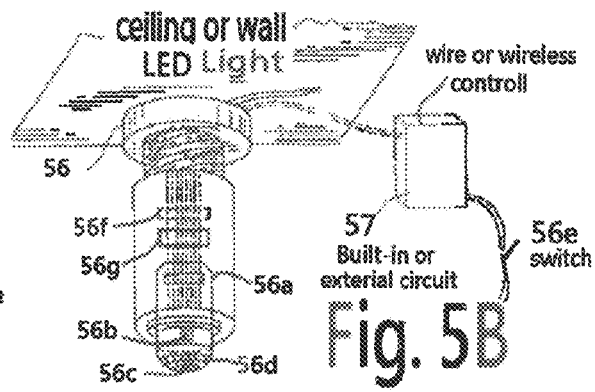
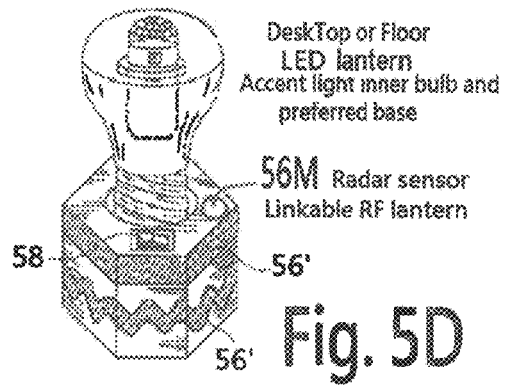
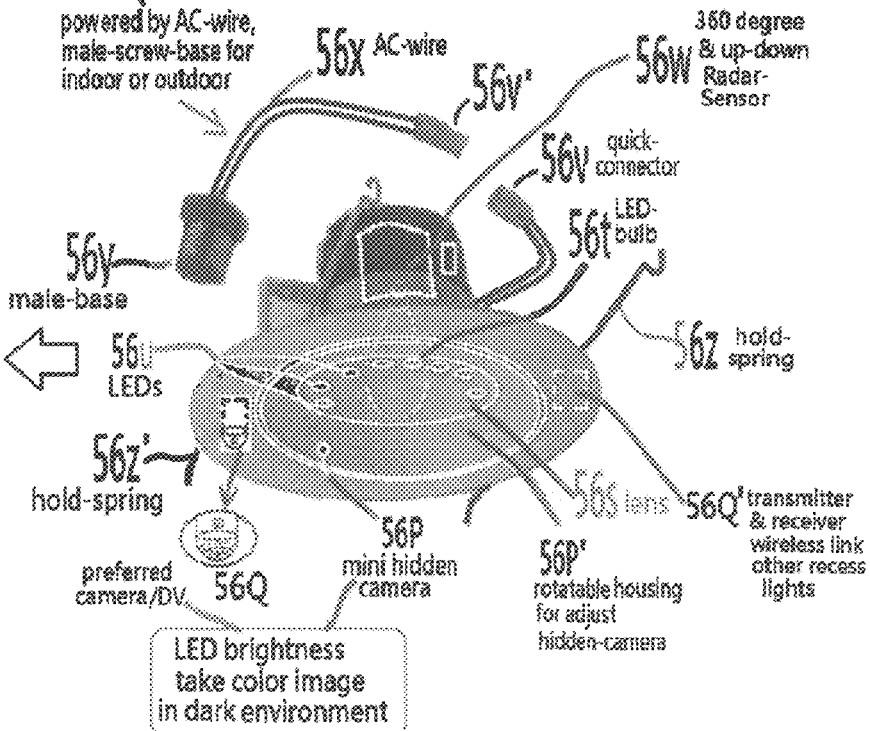

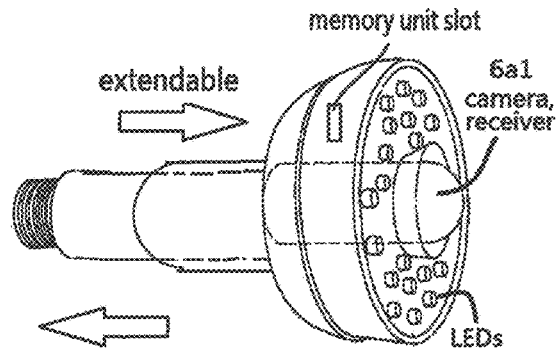
Fig. 6A
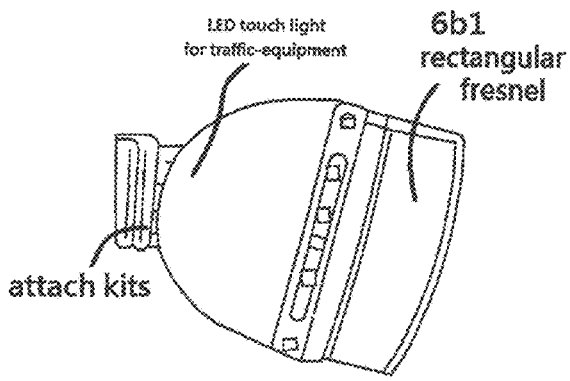
Fig. 6B
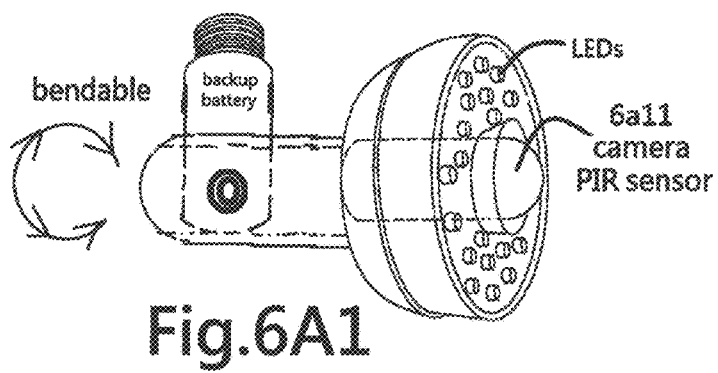
Fig. 6A1
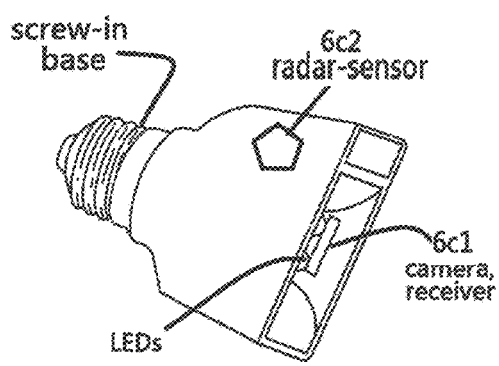
Fig. 6C
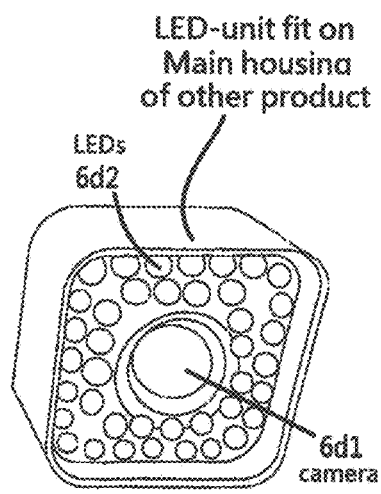
Fig. 6D AC plug-wire or transformer Prong or Flap-over solar Flashlight hase built-in Camera Flashlight with built-in Camera to take colorful image under dark environment and flashlight offer sufficient brightness Wall mounted LED light having built-in camera-assembly with preferred conductive-piece to get power to take photo or video or steam image to people phone with or without wifi, wifi-extend, download APP to control.

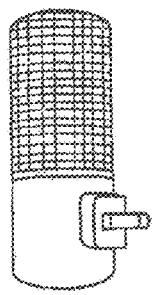

Fig. 9A

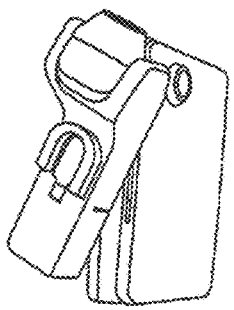

Fig. 9B

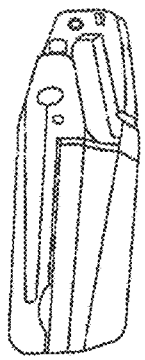

Fig. 9C

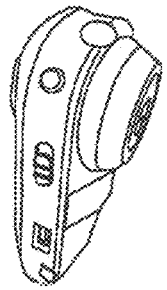

Fig. 9D

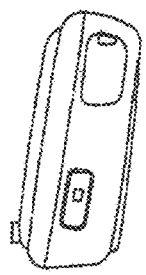

Fig. 9E

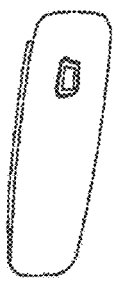

Fig. 9F

Connector choice for Indoor /Outdoor LED light has built-in Camera-assembly

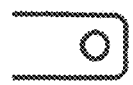

Fig. 9G1
Prongs

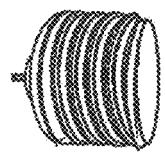

Fig. 9F2
Bulb-Base

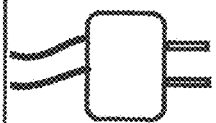

Fig. 9G3
AC Plug-wire or Wired

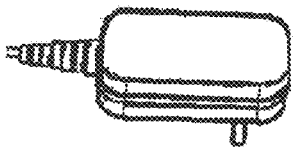

Fig. 9g4
AC-to-DC Transformer

Fig. 9G

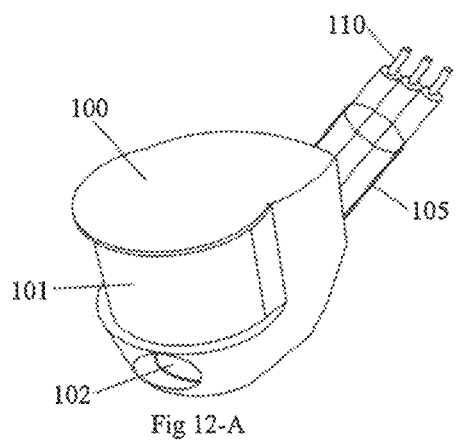
Fig 12-A
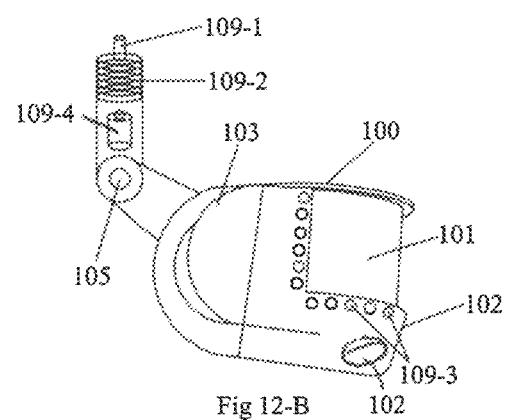
Fig 12-B
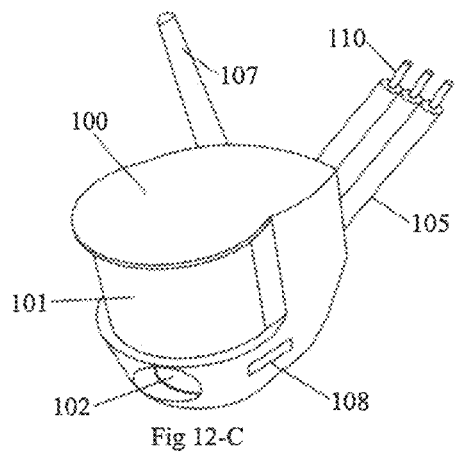
Fig 12-C
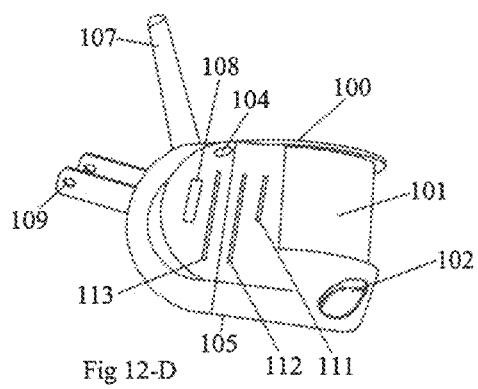
Fig 12-D

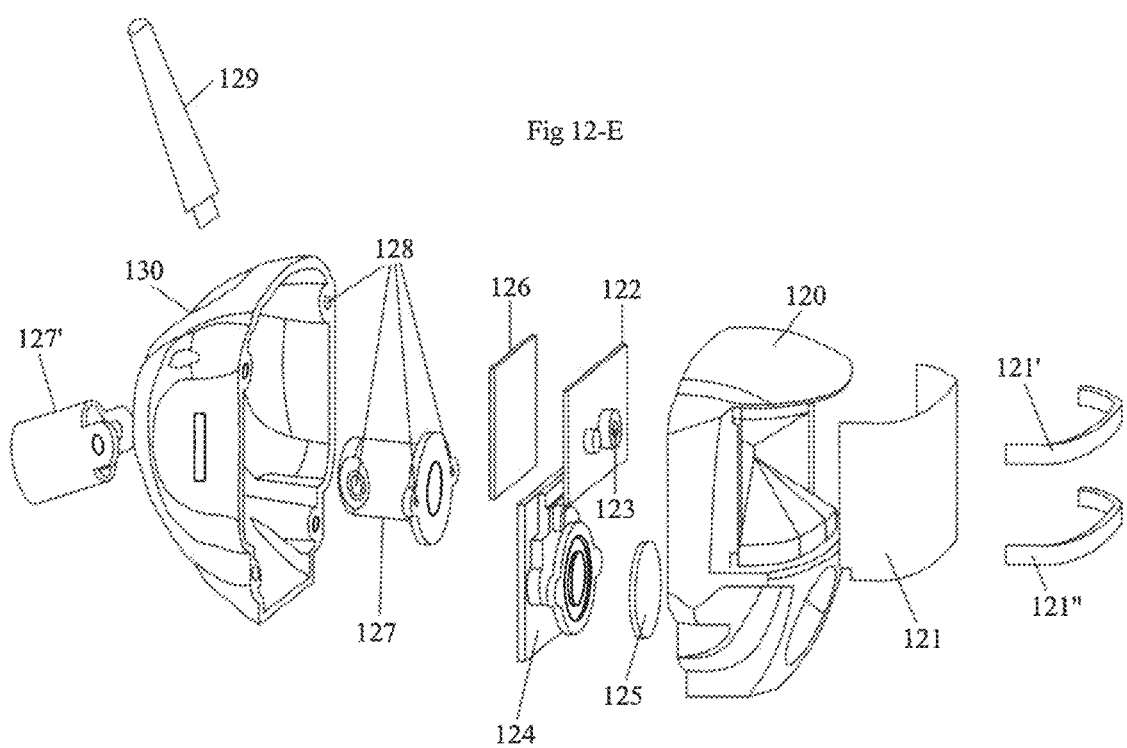

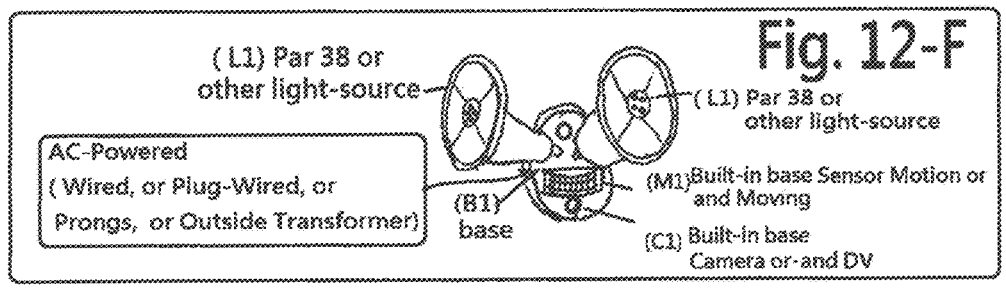
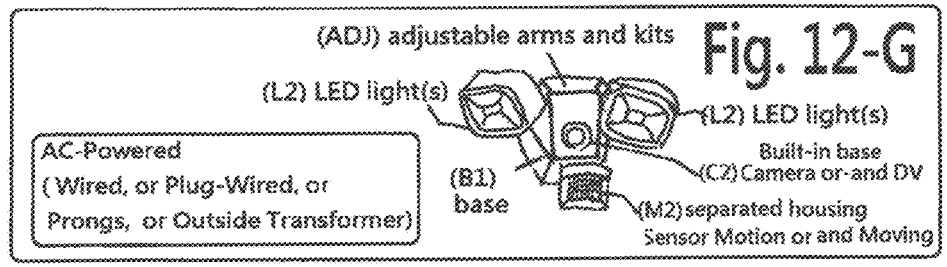
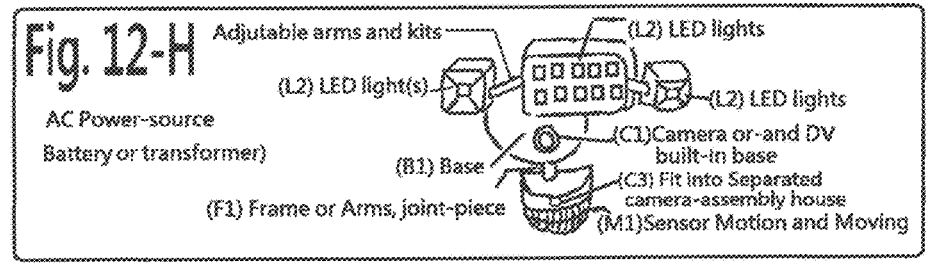
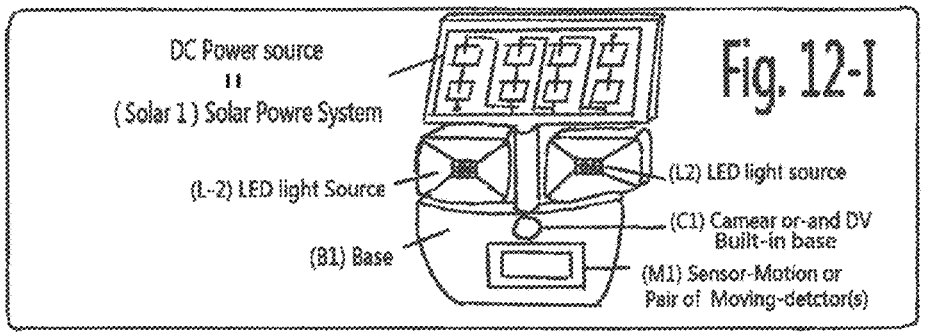
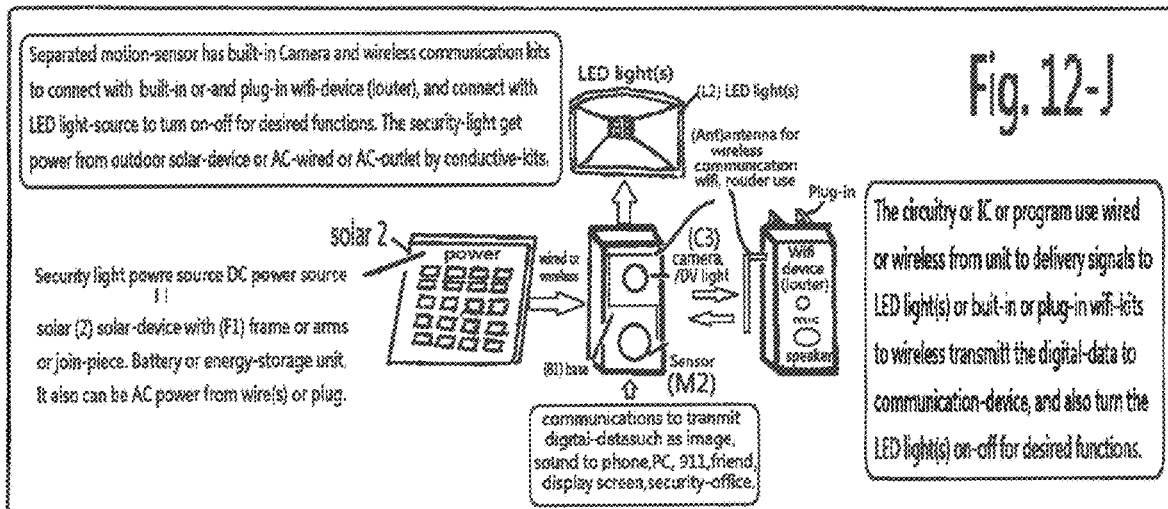

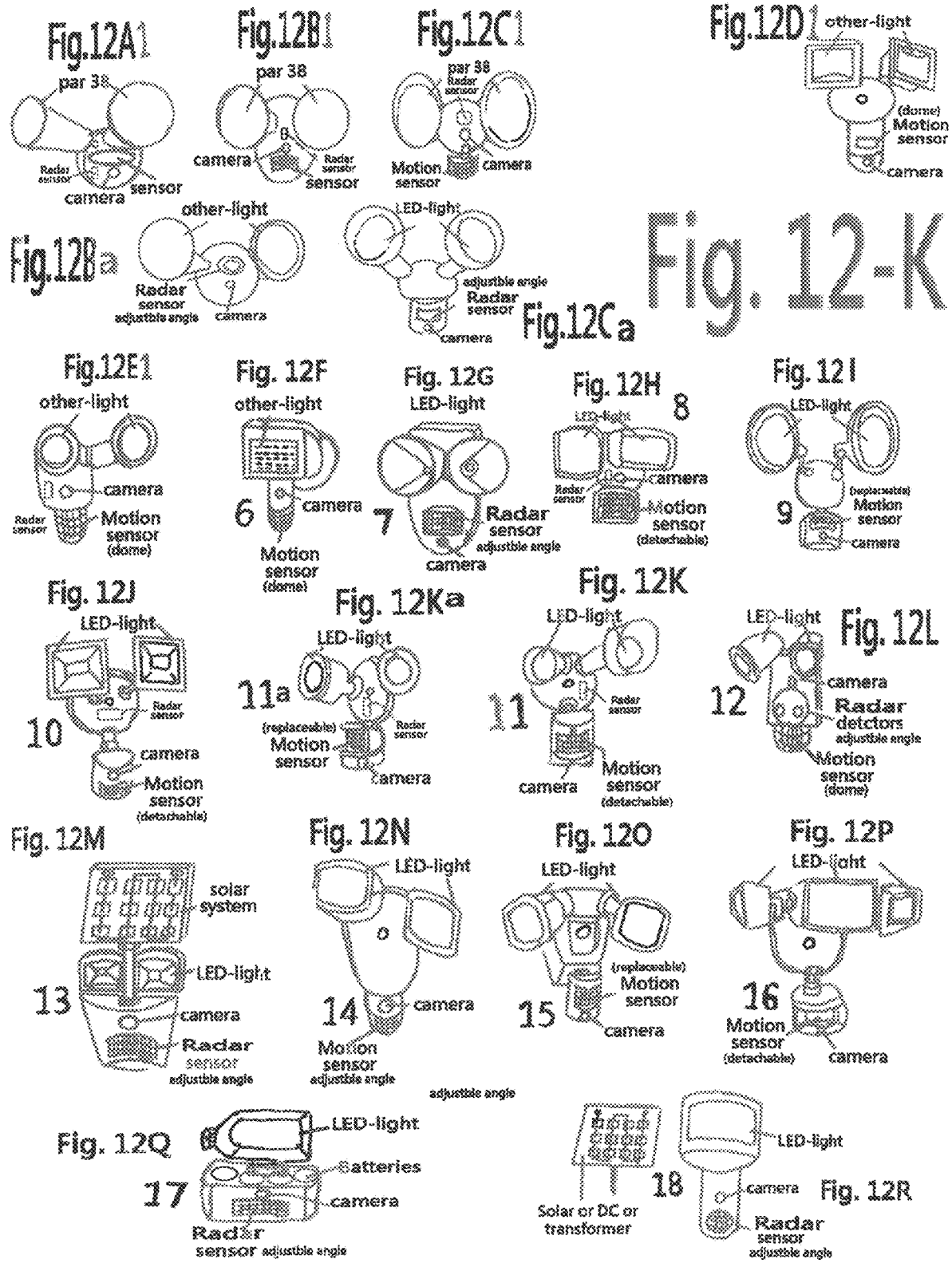

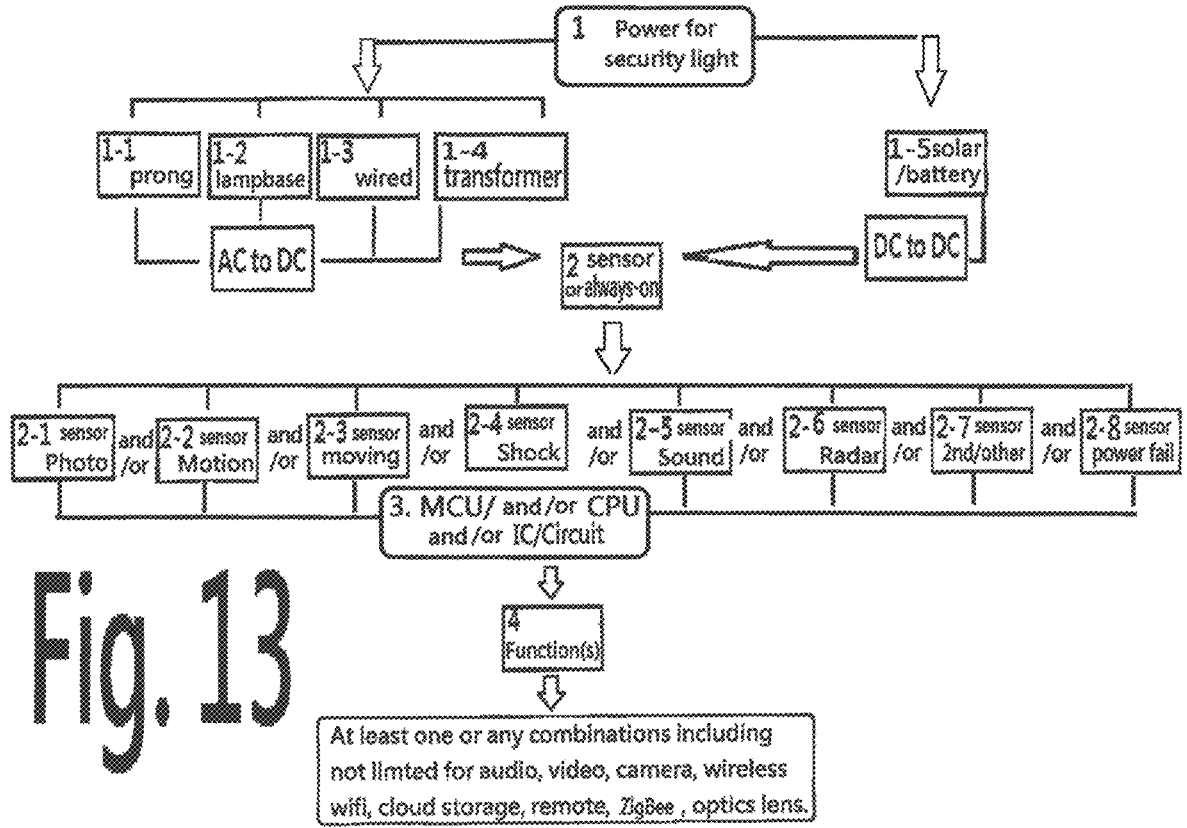
Fig. 13
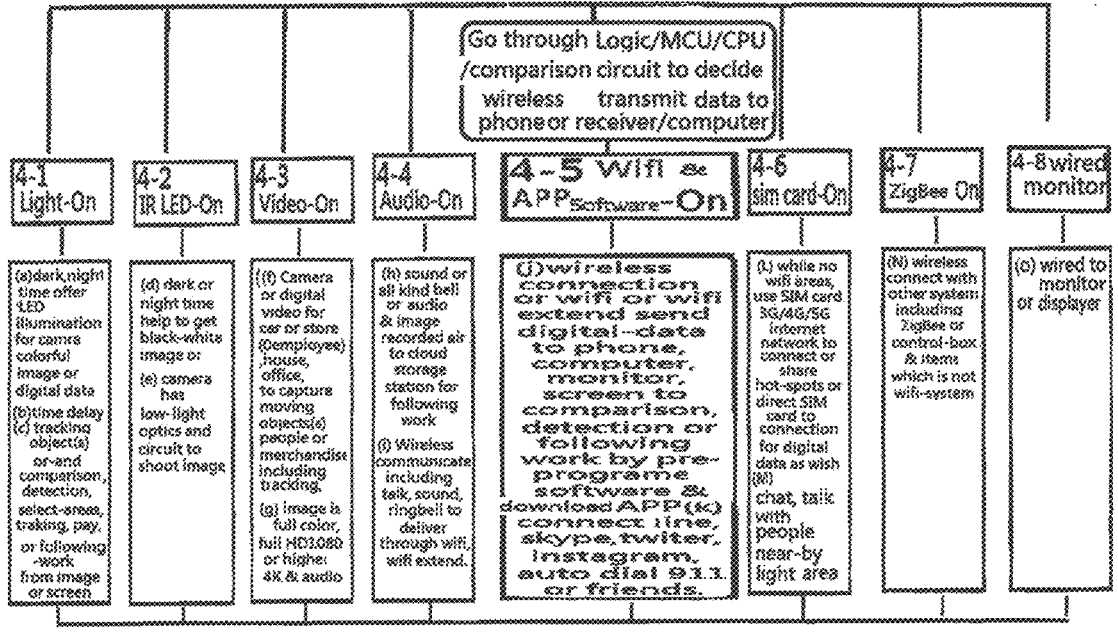

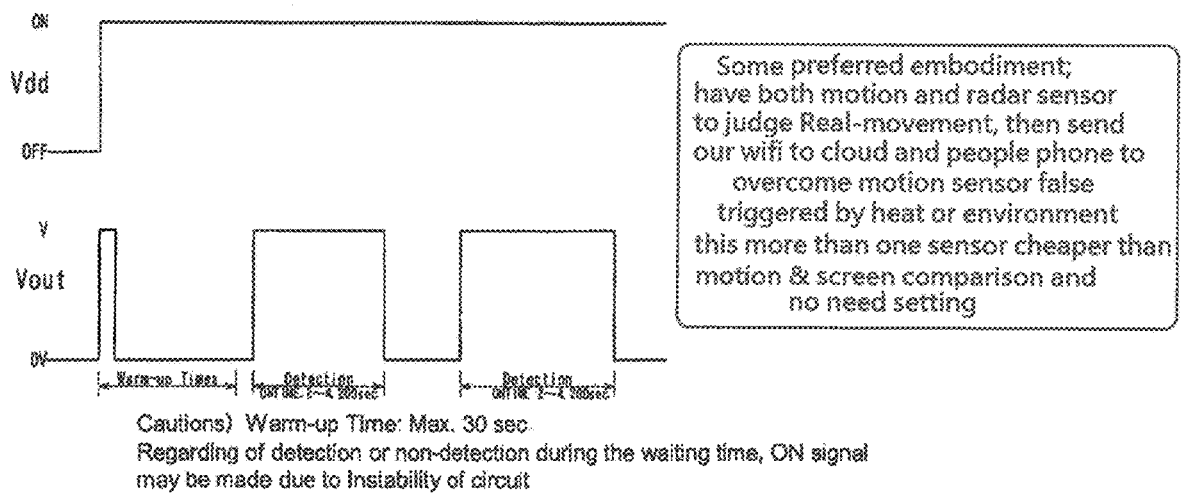
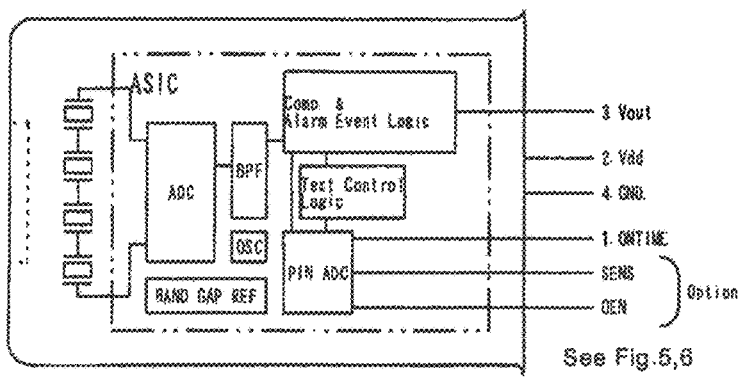
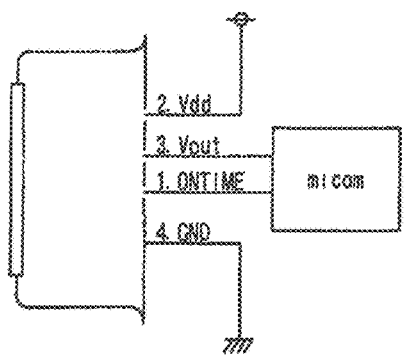
Fig.14

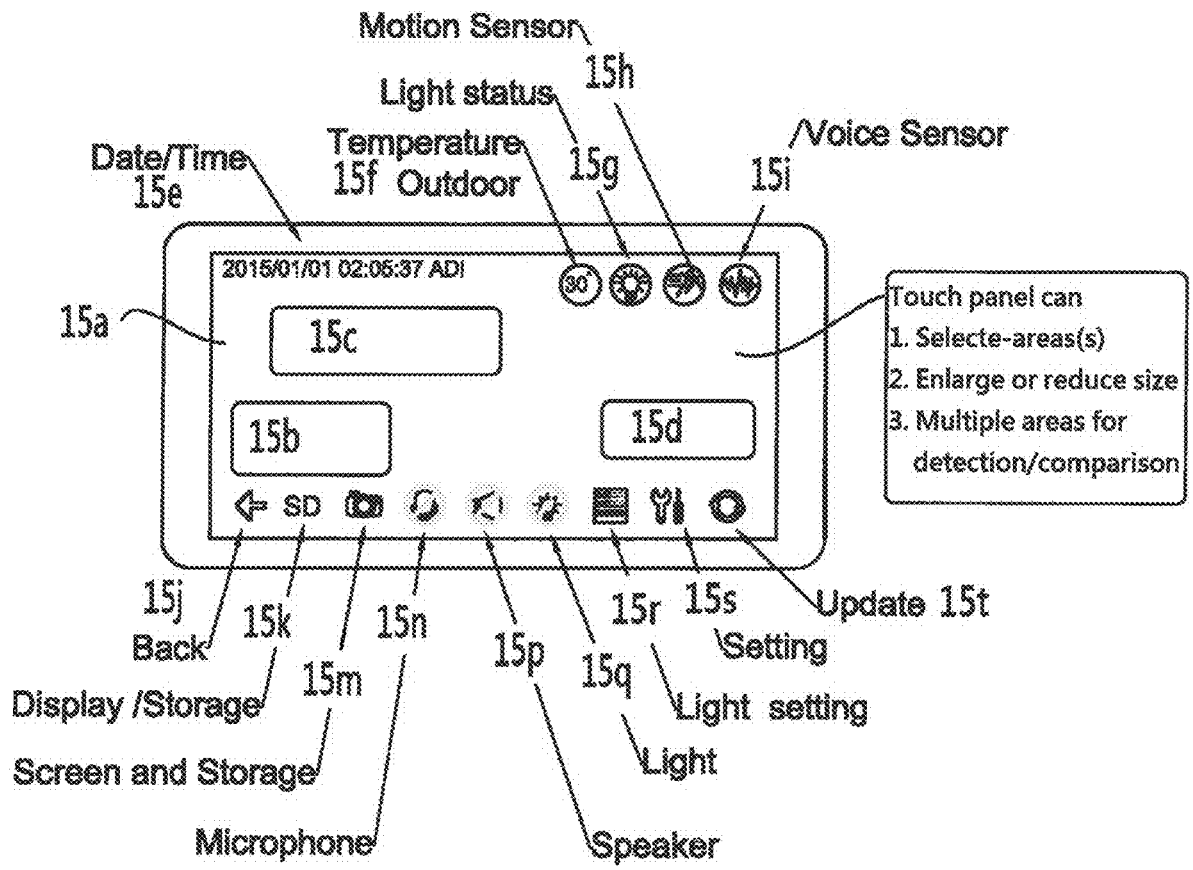
 Storage files
 Screen and Storage
 Microphone on/off
 Speak on/off
 Light on/off
 Update
Fig.15
Display or Screen for Preferred Download APP with desired selected-area(s) for setting/ ajustment/ comparison incorporate with Photo. motion sensor to take colorful image under dark environment.

Fig.16
Alternative one of preferred
APP program for Download APP

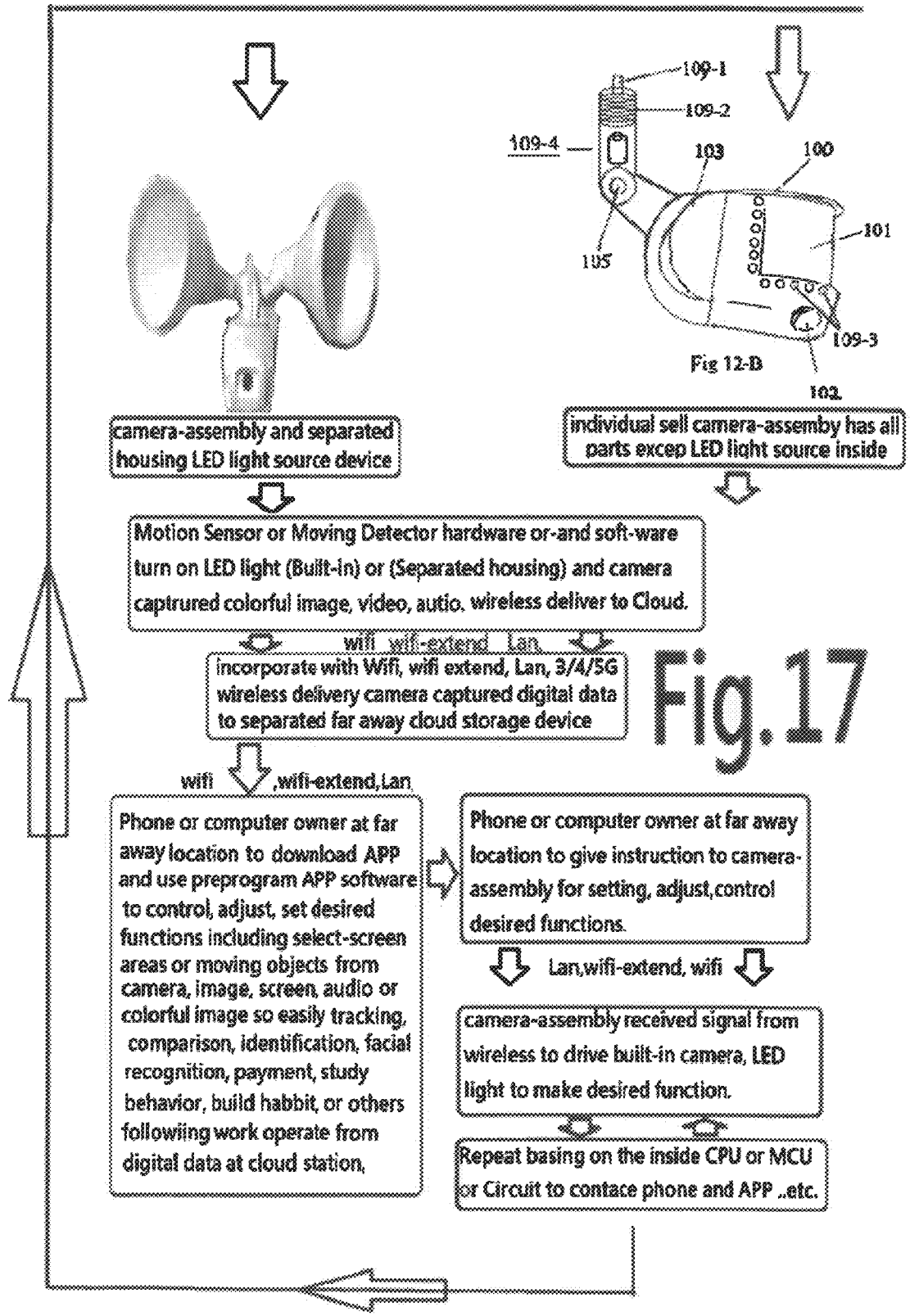

Car, Boat, Bus, Truck moving device has angle-adjust torch/flashlight built-in camera to take colorful photos under dark environment optional wifi or 4/5G to transmitt out Microwave Sensor

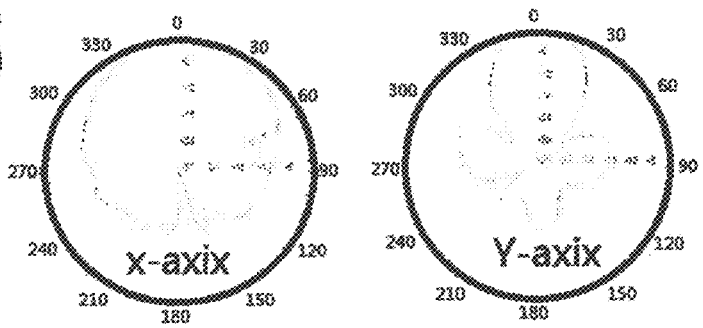
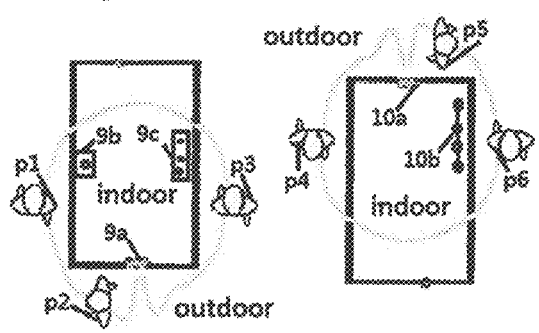 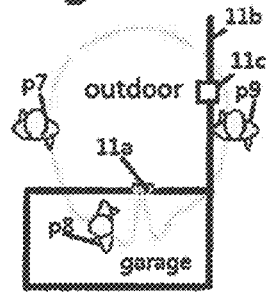 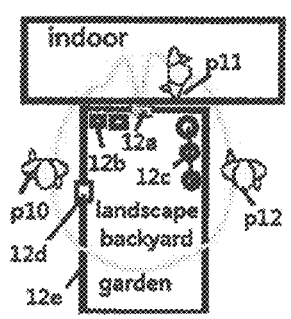
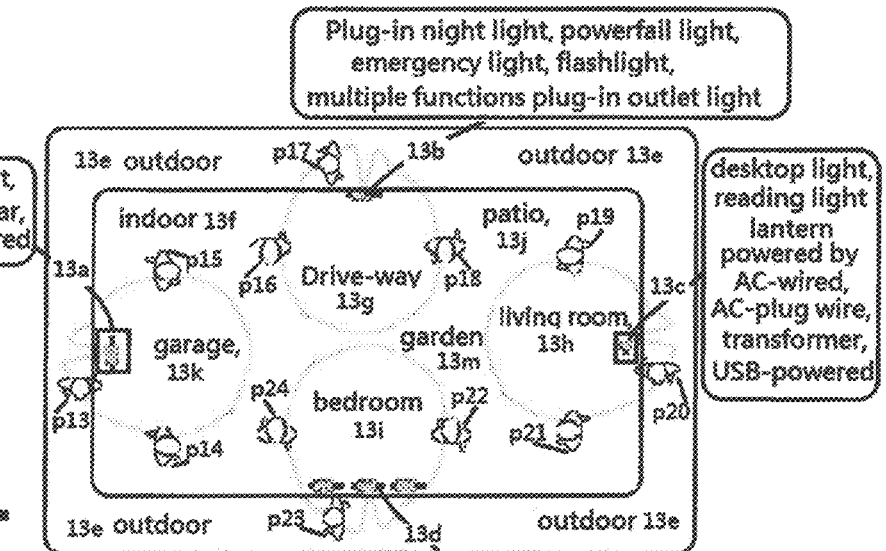

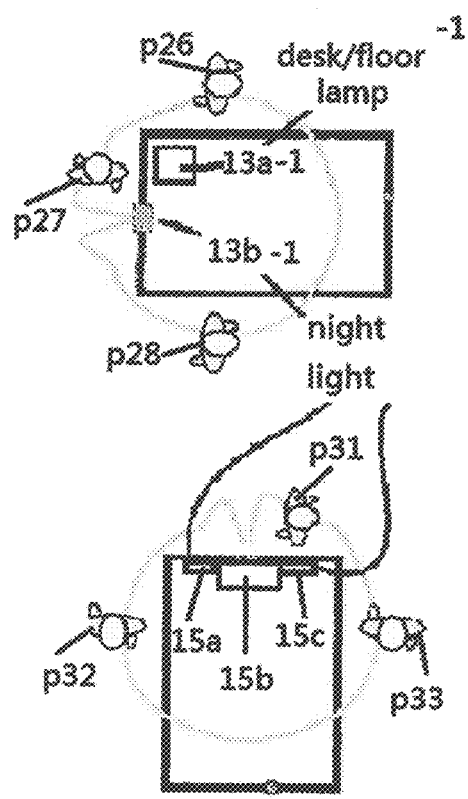
Fig.32
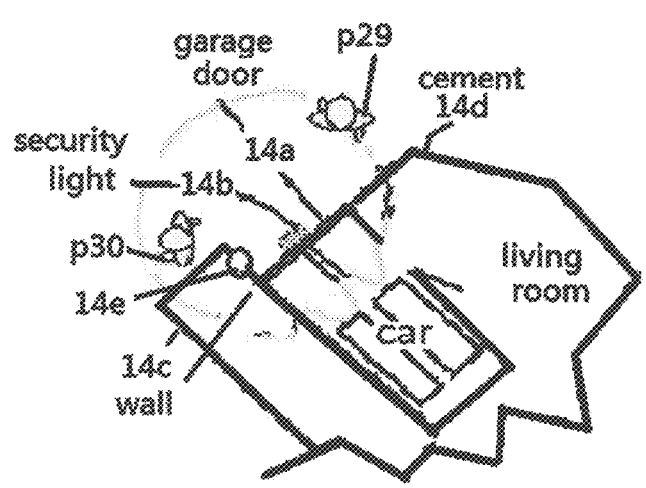
Fig.33
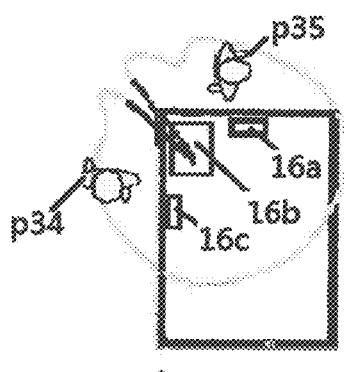
Fig.35
Fig.34
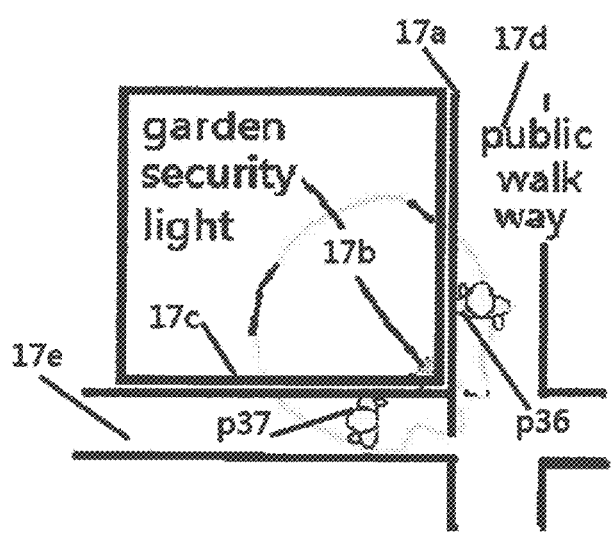
Fig.36

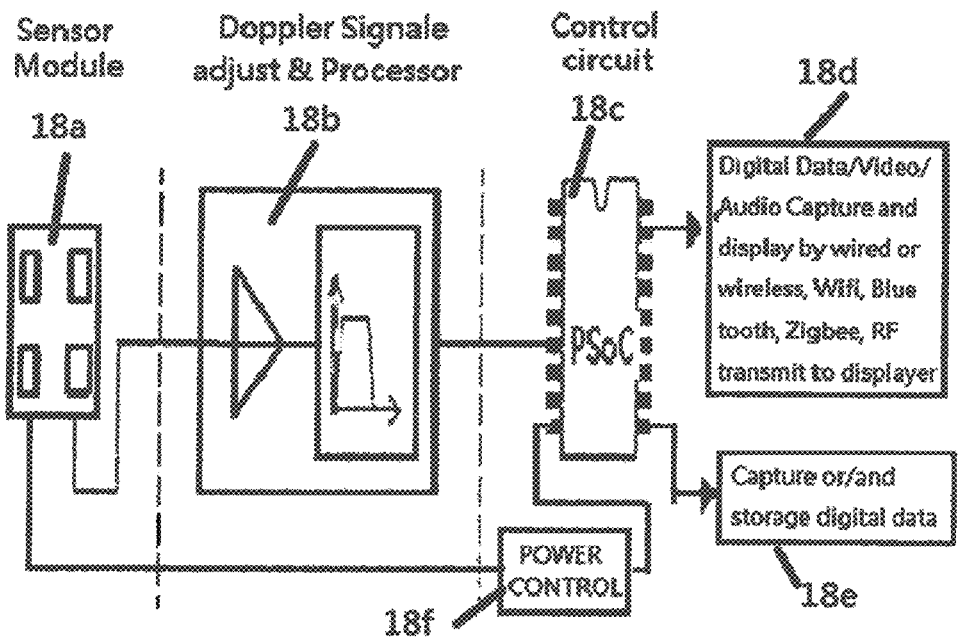
Flow-Charter Fig. 37
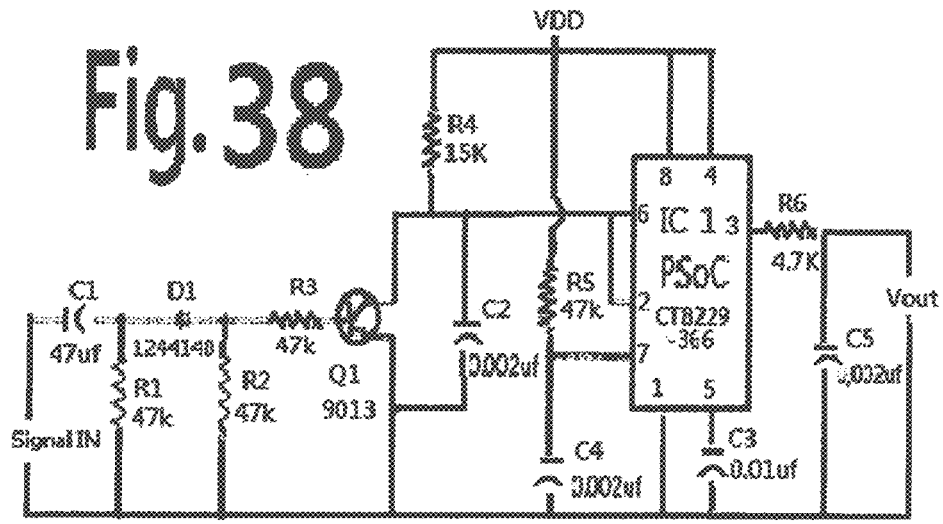
Fig. 38
Transfer Circuit for Frequency/Voltage

Module for Microwave Sensor diagram

● Module terminals connection diagram

| LEGS | FUNCTIONS |
|---|---|
| 1 | (+) Positive of Power Source |
| 2 | Signal export-end |
| 3 | (-) Negative of Power Source |
| CDS | Connect Photo Sensor(CDS) |
| A | 16 level sensitivity adjust sw. |
| B | 4 models for trigger type |

Fig. 39

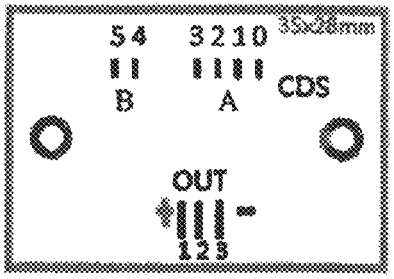

Fig. 39A

Example of Diagram for Application

A. LOAD CIRCUIT FOR DIRECT CURRENT (D.C.)

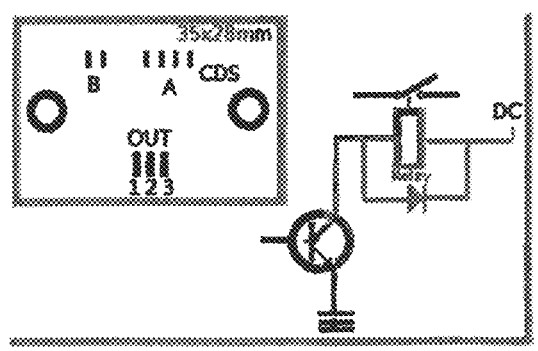

Fig. 39B

B. LOAD CIRCUIT FOR ALTERNATIVE CURRENT (A.C.)

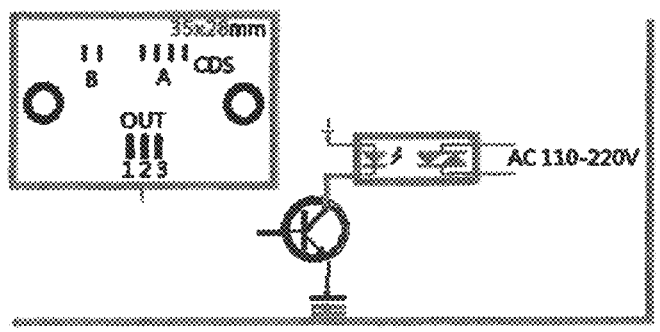

Fig. 39C

Module for Microwave sensor

One Market available of Module for Microwave sensor
Circuitry Diagram

Fig. 39F
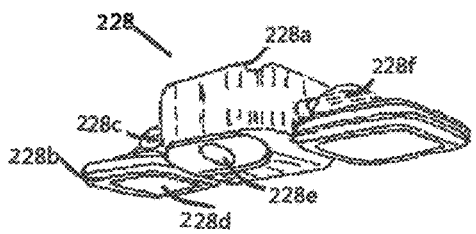
Fig. 39G
2 round
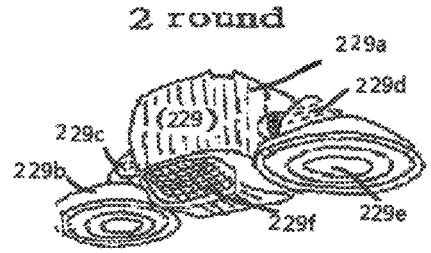
Fig. 39H
3 head
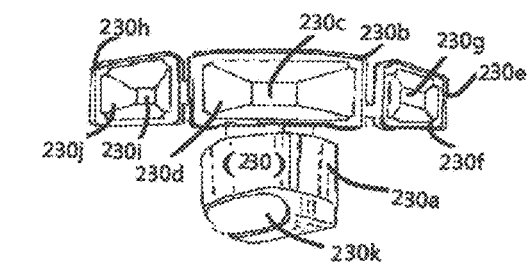
Fig. 39I
2 1/2 ball @360 degree
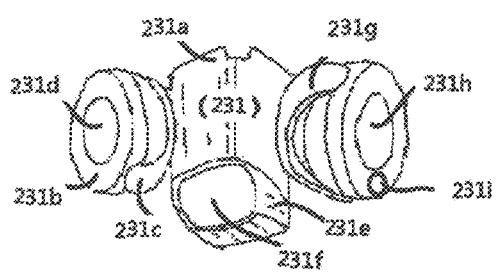
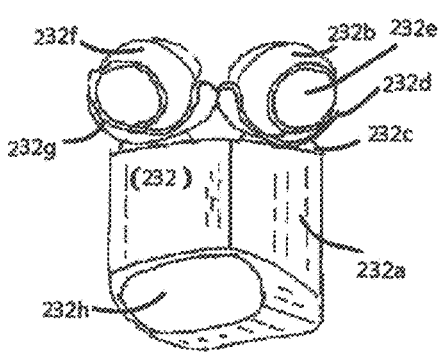
2 1/2 ball @360 degree
Fig. 39J
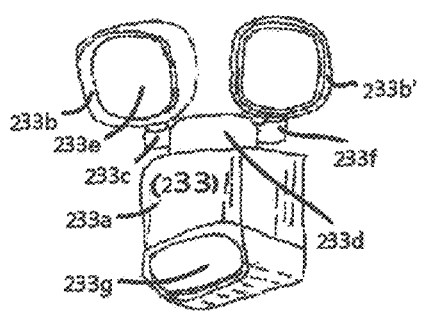
square
Fig. 39K
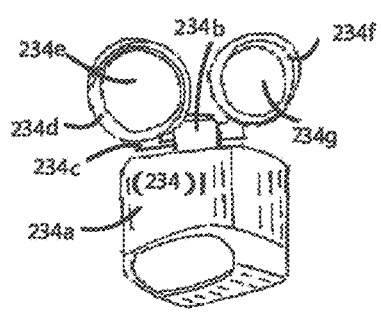
2 Oric
Fig. 39L
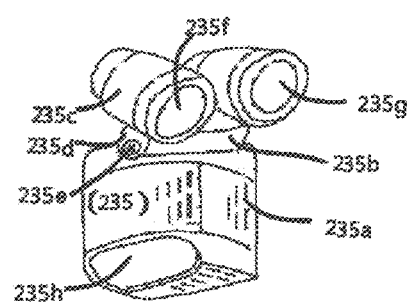
2 cylinder
Fig. 39M

LED LIGHT HAS BUILT-IN CAMERA-ASSEMBLY TO CAPTURE COLORFUL DIGITAL-DATA UNDER DARK ENVIRONMENT

RELATED U.S. PATENT DATA

This application is Division or-and continuation-in-part of (#KKK-10) U.S. patent Ser. No. 15/972,798 filed on May 7, 2018, now is allowance on Nov. 30, 2018 This application is Division or-and continuation-in-part of (#KKK-9) U.S. patent Ser. No. 15/901,251 filed on Feb. 21, 2018 which is in continuation of application is continuation-in-part of (#KKK-4) U.S. patent Ser. No. 15/390,783 filed on Dec. 27, 2016, now U.S. Pat. No. 9,838,430 issued on Nov. 28, 2017 which is in continuation of application is continuation-in-part of (#KKK-8) U.S. patent Ser. No. 15/268,125 filed on Sep. 16, 2016, now is U.S. Pat. No. 9,838,430 issued on Nov. 28, 2017 which is in continuation of application is continuation-in-part of (#KKK-7) U.S. patent Ser. No. 15/453,270 filed on Mar. 8, 2017, now is U.S. Pat. No. 9,838,652 issued on Dec. 5, 2017 which is continuation of this application is continuation-in-part of (#KKK-6) U.S. patent Ser. No. 14/863,553 filed on Sep. 24, 2015.

This application is a continuation-in-part of (#KKK-5) U.S. patent application Ser. No. 14/793,209, filed Jun. 30, 2015, now is U.S. Pat. No. 9,549,110 issued Jan. 17, 2017 which is a continuation-in-part of This application is a continuation-in-part of (#KKK-3) U.S. patent application Ser. No. 14/728,369, filed Jun. 2, 2015, now is U.S. Pat. No. 9,787,885 issued on 10-120-2017 which is a continuation-in-part of (#KKK-2) U.S. patent application Ser. No. 14/265,838, filed Apr. 30, 2014, now is U.S. Pat. No. 9,197,865 issued on Nov. 24, 2015, which is a continuation-in-part of (#KKK-I) U.S. patent application Ser. No. 14/265,738, filed Apr. 30, 2014, now is U.S. Pat. No. 9,560,322 issued on Jan. 31, 2017 which is a continuation-in-part of (#KKK-2011) U.S. patent application Ser. No. 13/295,301, filed Nov. 15, 2011, now U.S. Pat. No. 8,760,514, each of which is incorporated herein by reference.

This application also is continue filing of relevance are the (#KKK-2011) inventor's U.S. patent application Ser. No. 13/295,301, filed on Nov. 11, 2011, now is U.S. Pat. No. 8,760,514 issued on Jun. 24, 2014) and directed to a device having built-in digital data means and powered by a power source for a lamp holder, and This application is a continuation-in-part of inventor's (#JJJ-11) U.S. patent application Ser. No. 13/296,508 also filed on Nov. 11, 2011 and directed to a device having built-in digital data means and powered by a power source for an LED Bulb (Now is U.S. Pat. No. 8,562,158 issued on Oct. 22, 2013). Also, this application is a continuation-in-part of relevance are the inventor's (#R) U.S. patent application Ser. No. 11/806,285 filed on Apr. 30, 2007, which discloses an LED night light having multiple functions, and (#ZZ-10) U.S. patent application Ser. No. 12/951,501 now U.S. Pat. No. 9,033,569 issued on May 19, 2015), which discloses a lamp holder having a built-in LED light. This application is a continuation-in-part of U.S. patent application Ser. No. 14/728,369, filed Jun. 2, 2015 which is a continuation-in-part of U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No. 8,760,514, each of which is incorporated herein by reference. This application also is continue filing of relevance are the inventor's U.S. patent application Ser. No. 13/295,301, filed on Nov. 11, 2011 (Now is U.S. Pat. No. 8,760,514 issued on Jun. 24, 2014) and directed to a device having built-in digital data means and powered by an power source for a lamp holder, and inventor's U.S. patent application Ser. No. 13/296,508 also filed on Nov. 11, 2011 (Now is U.S. Pat. No. 8,760,514 issued on Jun. 24, 2014) and directed to a device having built-in digital data means and powered by a power source for an LED Bulb (Now is U.S. Pat. No. 8,562,158 issued on Oct. 22, 2013). Also of particular relevance are the inventor's U.S. patent application Ser. No. 11/806,285 filed on Apr. 30, 2007, which discloses an LED night light having multiple functions, and Ser. No. 12/951,501 (Now U.S. Pat. No. 9,033,569 issued on May 19, 2015), which discloses a lamp holder having a built-in LED light.

BACKGROUND OF THE INVENTION

This application is Division or-and continuation-in-part of (#KKK-10) U.S. patent Ser. No. 15/972,798 filed on May 7, 2018, now is allowance on Nov. 30, 2018

This application is Division or-and continuation-in-part of

This application is Division or-and continuation-in-part of (#KKK-9) U.S. patent Ser. No. 15/901,251 filed on Feb. 21, 2018 which is in continuation of application is continuation-in-part of (#KKK-4) U.S. patent Ser. No. 15/390,783 filed on Dec. 27, 2016, now U.S. Pat. No. 9,838,430 issued on Nov. 28, 2017 which is in continuation of application is continuation-in-part of (#KKK-8) U.S. patent Ser. No. 15/268,125 filed on Sep. 16, 2016, now is U.S. Pat. No. 9,838,430 issued on Nov. 28, 2017 which is in continuation of application is continuation-in-part of (#KKK-7) U.S. patent Ser. No. 15/453,270 filed on Mar. 8, 2017, now is U.S. Pat. No. 9,838,652 issued on Dec. 5, 2017 which is continuation of this application is continuation-in-part of (#KKK-6) U.S. patent Ser. No. 14/863,553 filed on Sep. 24, 2015.

This application is a continuation-in-part of (#KKK-5) U.S. patent application Ser. No. 14/793,209, filed Jun. 30, 2015, now is U.S. Pat. No. 9,549,110 issued Jan. 17, 2017 which is a continuation-in-part of (#KKK-3) U.S. patent application Ser. No. 14/728,369, filed Jun. 2, 2015, now is U.S. Pat. No. 9,787,885 issued on 10-120-2017 which is a continuation-in-part of (#KKK-2) U.S. patent application Ser. No. 14/265,838, filed Apr. 30, 2014, now is U.S. Pat. No. 9,197,865 issued on Nov. 24, 2015, which is a continuation-in-part of (#KKK-I) U.S. patent application Ser. No. 14/265,738, filed Apr. 30, 2014, now is U.S. Pat. No. 9,560,322 issued on Jan. 31, 2017 which is a continuation-in-part of (#KKK-2011) U.S. patent application Ser. No. 13/295,301, filed Nov. 15, 2011, now U.S. Pat. No. 8,760,514, each of which is incorporated herein by reference.

This application also is continue filing of relevance are the (#KKK-2011) inventor's U.S. patent application Ser. No. 13/295,301, filed on Nov. 11, 2011, now is U.S. Pat. No. 8,760,514 issued on Jun. 24, 2014) and directed to a device having built-in digital data means and powered by a power source for a lamp holder, and This application is a continuation-in-part of inventor's
(#JJJ-11) U.S. patent application Ser. No. 13/296,508 also filed on Nov. 11, 2011 and directed to a device having built-in digital data means and powered by a power source for an LED Bulb (Now is U.S. Pat. No. 8,562,158 issued on Oct. 22, 2013). Also, this application is a continuation-in-part of relevance are the inventor's
(#R) U.S. patent application Ser. No. 11/806,285 filed on Apr. 30, 2007, which discloses an LED night light having multiple functions, and
(#ZZ-10) U.S. patent application Ser. No. 12/951,501 now U.S. Pat. No. 9,033,569 issued on May 19, 2015), This application has subject matter in common with the inventor's U.S. patent application Ser. Nos. 12/624,621, 12/622,100, 12/318,471, 12/318,470, 12/318,473, 12/292, 153, 12/232,505, 12/232,035, 12/149,963, 12/149,964, 12/073,095, 12/073,889, 12/007,076, 12/003,691, 12/003, 809, 11/806,711, 11/806,285, 11/806,284, 11/566,322, 11/527,628, 11/527,629, 11/498,874, 12/545,992, 12/806, 711, 12/806,285, 12/806,284, 12/566,322, 12/527,628, 12/527,629, 12/527,631, 12/502,661, 11/498,881, 11/255, 981, 11/184,771, 11/152,063, 11/094,215, 11/092,742, 11/092,741, 11/094,215, 11/094,156, 11/094,155, 10/954, 189, 10/902,123, 10/883,719, 10/883,747, 10/341,519, 12/545,992, 12/292,580, 12/710,918, 12/624,621, 12/622, 000, 12/318,471, 12/318,470, 12/318,473, 12/292,153, 12/710,561, 12/710,918, 12/711,456, 12/771,003, and Ser. No. 12/951,501. Technical background and time table with document supported: This application also is continue filing of particular relevance are the inventor's U.S. patent application Ser. No. 13/295,301, filed on Nov. 11, 2011 (Now is U.S. Pat. No. 8,760,514 issued on Jun. 24, 2014) and directed to a device having built-in digital data means and powered by an power source for a lamp holder, and inventor's U.S. patent application Ser. No. 13/296,508 also filed on Nov. 11, 2011 and directed to a device having built-in digital data means and powered by a power source for an LED Bulb (Now is U.S. Pat. No. 8,562,158 issued on Oct. 22, 2013).

Also, the said particular relevance are the inventor's U.S. patent application Ser. No. 11/806,285 filed on Apr. 30, 2007, which discloses an LED night light having multiple functions, and Ser. No. 12/951,501 (Now U.S. Pat. No. 9,033,569 issued on May 19, 2015, which discloses a lamp holder having a built-in LED light. Home security products currently available in the marketplaces such as Lowes or Home Depot, especially wireless home security products, are expensive and overpriced, the current invention aims to reach out to multiple divisions of people's willingness and budget to spend money on home protection products; therefore, the current invention's functions are not limited to one combination but multiple combinations of different functions said below, differentiating on the budget of customers and the set combination of functions of the current invention.

The current invention involves an LED light, which may be in the form of a night light, bulb, lamp holder, or other light source or LED illumination device, and which has built-in digital device(s) of which, the current invention has built in digital device(s) with motion sensors, moving sensor, digital data recording, storage elements, wireless communications, cellular phone communications, smartphone applications communications, and display functions, of which, the current invention can transmit digital sounds, messages, photos, movies, films, audios, videos, recorded sounds, application notifications by update communication tools including 3G/4G/MP4 format file/Wi-Fi/cloud storage stations not like all prior art which use out of date JPEG, MPM or 2G or more narrow wireless transmission or even use Bluetooth which only good for small file to transmitting. etc.

The current invention has additional functions, however, but not limited to, such as living object (humans, animals) or objects (trees, leaves, rain, etc.) tracking ability, optional retractable prongs for flashlight also had such camera and Wi-Fi and cloud or SD card storage elements, and/or lamp-base installments, optional/add-on night-vision ability for dark area/late hours' usage; all additional functions aims to enhance user's experience when operating and the guarantee the reliability of the current invention.

The current invention aims to enhance the user's safety measures by providing high resolution (such as Full HD colorful image), real-time photos (Through MP4 format digital file+Wi-Fi or 4G or 5G internet+cloud/or servers storage station), videos, and/or streams of a designated area of the user's choice which is not available before 2009 basing on 4G mobile phone came out and all wireless station well established national wide.

When using streams, the current invention will use its Wi-Fi and/or Bluetooth function to connect to users' home network or cellphones and/or smartphones and be able to stream through cellphones or smartphones applications for users' viewing purposes again this need to depend on update internet upgrade to 3G to 5G, Phone has 4G or up communication capability, or even has better and faster server or cloud storage stations.

The current invention also carries the ability to store videos and pictures, under the conventional formats which are used in modern times such as MP4, MPEG I to 4, AVI, GIF, WMV, AMV, JPEG, etc.

The means of the storage of this current invention includes but not limited to conventional and common storage cards such as SD cards, TF cards, cloud storage services such as iCloud, Dropbox, Google clouds, USB drives. The stored videos or pictures can also, but not always have to, feature in 30 frames per seconds, 60 frames per seconds or other combinations of video related elements however, these update digital file MP4 format incorporated Wi-Fi and servers or/cloud storage for stream transmission is not happen and exist before 2009 furthermore the market has no any mobile phone such as 3G or 4G with national wide has all base stations well installed before 2009.

The current invention can also take pictures through applications' commands under the resolutions (such as Full HD) which is capable to have pictures taken at the conventional and common resolutions in modern times. The current invention's power input comes from either prongs or wired or optional retractable prongs or lamp-holder bases, or conventional batteries (preferred rechargeable) which serves as backup sources.

The current invention may also consist of similar or equal function or alternative functions device such as compact Digital Video (referred as DV) device such as webcam, driving camera, IP camera, and/or GoPro, which can be built into the light device to simple to make current invention products. Preferably, the camera has lenses in a small-form-factor for hidden purposes, so the camera can easily be built-into the light device while remain incognito. The invention aims to use lower cost, however efficient camera devices, to avoid problems which requires technicians to investigate troubles the device might cause.

The camera will send digital data to the said display units while receiving power directly from a power source including AC or DC or backup power source as said above. Then depending on the functions, the current invention can link to Wi-Fi or Bluetooth or 3G/4G even current new 5G station or other networks and send notifications through applications (APP or equivalent software) to any smartphones, text messages or warning calls to cellular phones, pictures, videos, recorded sounds, or live stream in different file format can also be sent through Wi-Fi to said smart phones however only if the smart phones have internet services of 4G or update 5G net-work, or any other modem internet services.

The said internet services a cellular device, smart phone device, tablet device, TABLE-US-00001 Generation Speed Technology Features 2G 9.6/14.4 TDMA, 2G capabilities are achieved by kbps CDMA allowing multiple users on a single channel via multiplexing. 2G enabled mobile phones can be used for data along with voice communication. 3G 3.1 Mbps CDMA 2000 3G provides amazing internet (peak) (ITUR), browsing speeds. Opens the door 500-700 EVDO) to a whole bag of opportunities Kbps UMTS, with video calling, video EDGE streaming, etc. In 3G, universal access ad portability across different device types are made possible. (Telephone & PDA's) 3.5G 14.4 Mbps HSPA 3.5G supports even higher speeds (peak) and enhances higher data needs. 1-3 Mbps 4G 100-300 Wimax Speeds for 4G are increased to Mbps LTE lightning fast to keep (peak) up with data access demand used 3-5 Mbps by various services. It also supports HD streaming. HD phones can be fully utilized on a 4G network. computer, laptop, or any other computing devices which consist data-transmitting function must have said 3G, 4G, or any other modern internet servicing speed for the current device to transmit large or small amount of data to the above said devices. The first 3G network were introduced in 1998 and the fourth generation (4G). (apekshatelecom.com)

It is inarguably that the first globalizing time when 3G network starts to be generalized is when iPhone 3G came out on Jul. 11, 2008. (iPhone 3G, Wikipedia) Ever since the release of the mainstream phone iPhone 3G, the 3G networks started to public until the very modern days. It is correct to say that any patents before the release of iPhone 3G and the generalization of 3G networks of similar ideas differs from my invention is because the ability to transmit high-volume data of pictures or video, or even to stream live feeds cannot be done due to the lack of technology before the development of the 3G network.

It is inarguably that the first globalizing time of 4G or LTE network starts to be generalized is when in 2008 the International Telecommunications Union-Radio communications sector (ITUR) specified the standards of 4G or LTE which must reach at least 100 megabits per seconds, this internet servicing speed is aimed for high speed, mobile telecommunications for variety of purposes. (4G, Wikipedia) The current invention utilizes 4G technology, and aims to use any modern network services succeeding 4G speed to send out valuable security information of customer's home protected, pre-determined area to any mobile devices. The said information sent to customers contains any but not limited to the followings: digital sounds, messages, photos, movies, films, audios, videos, recorded sounds, application notifications, etc. The very first smart phone to carry out the 4G capability was the HTC Max 4G, which was pressed released on Nov. 12, 2008. This date sets the very first date that the current invention's 3G and 4G LTE transmit function.

It is inarguably that the current invention is first of its kind to have the function to store any digital information taken by the camera inside cloud services such as iCloud, Dropbox, Google clouds. The introduction of cloud computing began early 2000, however, this specific function started to generalize first by Amazon on October 2008, then by Windows, Rackspace Hosting and Nasa, IBM, and Oracle on the years between 2010 and 2012. (Cloud Computing, Wikipedia) The previous related patents before the year of 2008 are considered irrelevant in words of cloud storage means to the current invention.

The current invention may also consist ability to store the said digital data in a SD card, TF card, USB flash drive, cloud services such as iCloud, Dropbox, Google clouds, or any other digital data servers. For SD cards, TF cards and/or USB flash drives, the current invention aims to reach an easy plug-and-go form factor for simple downloading any stored photos, videos, recorded sounds, etc. to any electrical equipment any customer has on his or her possession.

The cloud services depend on the customers' preferences. There are multiple cloud services around the world that are free of charge (e.g. Dropbox, iCloud, Google Cloud, etc.), or charge depending on the total size of the cloud. The current invention will have an option for customers to, instead of using a SD card, TF card, USB drive, or other hardware storage units, link to a cloud storage and store all taken digital sounds, messages, photos, movies, films, audios, videos, recorded sounds, application notifications, etc. for future references. The cloud can also be none online clouds called Network Attached Storage (NAS) such as using a server cloud right in the possession of the home owner who uses the current invention, meaning, the usage of multiple Terabytes (TB) HDD and the formation of a server using other products from brands like Synology.

The said digital sounds, messages, photos, movies, films, audios, videos, recorded sounds can be in forms of any kind that are generally and commonly used in modern days, such as file format of AVI, FLV, WMV, MOV, MP4, etc. for video related formats; JPEG, TIFF, BMP, raw image format, BIT, etc. for picture related format. These are only inclusions but not limited to the above noted formats, any modern file format is included even if not listed.

Even though Wi-Fi came as early as 1999, the generalization began when the common people started using mobile smartphones to link themselves to the internet without overpaying the cellphone company. The inclusion of Wi-Fi in the current invention only uses Wi-Fi as a bridge for connectivity for Clouds, mobile alerts and streams for cellular and smart phones.

The said motion sensors of the current invention include all kind but not limited to below: Passive Infrared Sensor (Shorted for PIR), Ultrasonic Sensor, Microwave sensor, Tomographic sensor, or any of its combination. The usage of each kind of sensors depends on the customers' budgets and how much likely hood of false alarms a design will want to decrease. Some motion detector might be included in IC in pair of a camera lens, which detects movement between two periods time so the camera or other designated device will active as soon movement is scanned. Each and the modern said motion sensors are included in the current invention. (www.elprocus.com)

Current home security products available in the marketplace, and especially wireless home security products, are very expensive. Furthermore, not only are they too costly, they are also too much trouble to install (may need engineer to help) and some application need use outside control box with complicated setting which is not easily for youth or aged peoples. the batteries or power storage means must be replaced very often.

However, market required for easily install and short time installation, so the current invention also apply the camera digital device for battery powered unit.

Compare with all below listed US Prior arts. The current invention had update technical and has faster to wire transmission the MP4 format digital data to shown or to other display device.

(Prior=1) US prior art U.S. Pat. Nos. 8,926,139 and 8,872,964.

(1) The Reed '964 disclosure the outdoor lighting which has imager to take image and though the process to get the electromagnetic spectrum to determine the light device function (FIG. 2A, FIG. 2B, FIG. 2C). (2) The Reed '139 same as the '964 the imager took image 1st and become electromagnetic spectrum so make decision for light functions. (column 3 line 54 to line 62). Also, the camera is take for period time is not like the current invention light turn on 1 st and camera do the work accordingly. Also, Current invention never want to see spectrum which is only good for military or war filed, Current invention need a full color image so can make identification for person or lived objects. (3) Compare with current invention the LED light is turn on 1 st so can offer the enough brightness to the camera to take colorful and clear picture or video and preferred combine other added functions or circuitry. This is totally different for Imager operation and final storage or show the electromagnetic spectrum vs. full color image with sound of current invention.

(Prior=2) Also, U.S. Pat. Nos. 8,926,139 and 8,872,964 patented to Reed et, al. discloses an outdoor lighting device which has image taker to take images through process of electromagnetic spectrum to determine the light device functions (FIG. 2A, FIG. 2B, FIG. 2C). The invention Reed et, al. discloses takes pictures first then go through the electromagnetic spectrum to determine the light functions, unlike my invention, our devices' lights go out first, then the devices take pictures to ensure the natural color of the predetermined shape is stored inside the storage means mentioned above. Also, as above mentioned, the current invention doesn't require the usage of electromagnetic spectrum which is preferably used in higher-technical situations such as battlefields or any other security space which cost expensively, my invention aims to fit budget for each customer. The current invention lights up the first, so the camera can then take the full natural color images, videos, or other data in the most vivid way possible, when everything is lightened up.

(Prior=3) US Prior arts US Filing series No. 2003 021 0340 which show the camera device is connect with bulb lamp-holder to get power which is totally not same as the current invention including:

(1) current invention to use LED or LEDs has desired number of own housing and each LED or LEDs inside own housing is direct connect with the light device circuitry so NO ANY LAMP HOLDER NEEDED for LED or LEDs light source production.

(2) The '0340 ROMANNOWICH prior art teach the camera connect with lamp holder will be rusted very short time so the camera device will become no function because lamp holder normally is too easily rust while put outdoor applications.

(3) The current invention has desired number of housing for LED or LEDs light source which depend on what brightness and how high the raised temperature will created so can make light source housing number from I to N (any number) and each LED or LEDs housing is directly connect with main circuitry so can prevent from any one of N (any number) light source or the wires or functions is out of order and not totally loose functions.

(4) The current invention most important the camera assembly connected with the main circuitry directly not connect with lamp holder (Because LED or LEDs light source no need lamp holder at all).

(5) The current invention disclosure the most important design the said camera with or without built-in slot for the memory kits including but not limited for the SD card or Mini-SD card which can be take days for picture or video and with optional over-write function so the memory kits can last for years without need to change at all. This is other features which taught by current invention for memory kits main function. Current invention has the built-in memory kits as basic model which has no other added wireless or wired display function for cost consideration so can let all consumers affordable to buy low cost unit. Which '0340 ROMANOWICH is not teach this most important built-in memory kits such as SD or Mini-SD card for most important features. All wired or wireless to present image or digital data is a luxury options for current invention. So, this is different with the construction and functions and application for the camera apply for any light device.

Also, US Prior number 2003-021-0340 by Frederick ROMANOWICH explained a design of camera combined with a bulb socket with a lighting bulb. The current invention does not limit itself to bulb bases or sockets, however, bulb sockets are one way to provide illumination for LED lights. The LED in my design is directly connected to the light device circuitry and no help should a lamp holder provide in order for the lighting to take place. The other main difference between the two patents are the usage of storage means. The current invention consists the usage of SD cards, TF cards, and/or USB drives, however, ROMANOWICH did not mention the usage of any of them. The difference is clear on how my design will fit any kind of budget a customer is willing to pay, because my design gives variety of combination for each level of security my design can possible provide.

(Prior=4) prior arts U.S. Pat. No. 2,007,001 3513 which taught the street light which is not same as current invention (1) Light source is 175 Watt Mercury Vapor light source which is totally different with current invention for LED light source (2) The '3513 use the Photo sensor to make the on-Off light which is different with current invention for the motion or moving sensor (3) The wireless communication system of '3513 is though the cellar phone net-work system to send out wireless to near-by station and then, send to the generation station and pass to other station to the monitor team which is not same as current is connect with housing or resident Wi-Fi system. So '3513 is for outdoor internet and current invention is through the house or residence system which is different. So, this is not any relation for current invention.

also, US Prior number 2007-001-3513 by Tang et al. described an invention in street-light fashion which is not similar to the current invention. The other differences are the invention by Tang et al. utilizes 175 Watt mercury Vapor light source; on the other hand, the current invention utilizes LED light sources. The patent by Tang et al. uses photo sensor to make on-off light which is not the same as the current invention which uses motion sensor. The patent by Tang et al. uses cellular phone network to transmit data from wireless station then to a general station monitor team then to the cellphone, which is not similar to the current invention which utilizes 4G or above internet services, Wi-Fi networks, Bluetooth network, streaming services, or all other mentioned "wireless" methods to transmit the said digital data to cellular phones or smartphones directly from the device.

(Prior=5) Prior arts U.S. Pat. No. 7,455,435 MATTEW is teach a data delivery channel by the house lighting device wires to make the digital data delivery like fiber optics theory but different carriers which is one of the digital data carriers like WIFI or internet. MATTEW did teach the data delivery and receiver majority for the audio device for speaker or amplifier. Nothing to do with the any image or camera and relation for LED light and Camera with memory kit so this is not any relation with current invention.

Also, Prior U.S. Pat. No. 7,455,435 by MATTEW et al. described a design consisting a speaker, which is not included in current invention. MATTEW et al. limited his/her invention to transmission only through AC power line through a standard bulb socket, while the current invention aims to transmit digital sounds, messages, photos, movies, films, audios, videos, recorded sounds, application notifications, etc. through 4G or modern internet services, Wi-Fi, Bluetooth, storage means such as SD cards, TF cards, and/or USB flash drives, or notifications to smart phones, texts to cellular phones, streaming to phones or other display units such as flat screen TV, Amazon, Google, Apple TV or its equivalent. According to Mathews et al., his or her invention does not include a camera device to capture real-time image or picture in order, for security reasons, to show them to authorities or for other purposes, therefore this patent has no similarity to the current invention.

(Prior=6) Prior art U.S. Pat. No. 6,686,952 Brazier teach the pedestal assembly light device which has rotating construction with plurality of motion sensor detector for moving objects. The built-in removable light source has light socket and camera built top of the rotatable base. Brazier is different with current invention for (1) Brazier teach is outdoor pedestal construction which is too far away for wall surface and too difficult to install on the wall need some solid support or metal bracket (2) light source is removable and has light socket to install so this is not the LED or LEDs light source has its own housing without any removable or light socket to install or replace. (3) The Brazier has no any memory kits or the slot to install the said memory kits including but not limited for SD card or Min-SD card so can save the image or sound into with optional days recording capacity or even years while has over-write capability.

All the current invention installation the light device base is parallel to install on the wall which is not belong to any pedestal construction which is like become light construction and application. So, can take out from built-in memory kits while had any bad things happened for house, residence, building, office, outdoor. So, the difference for light source, memory kits, narrow camera shooting angle, motor-gear set, pedestal body is totally different with current invention.

(Prior=7) US prior art U.S. Pat. No. 2,004,021 2678 Cooper teach a system which has the (1) I. sup. st low-resolution image sensor to take I.sup.st image of a scene and go through the controller for determine where motion has occurred based on images captured by the sensor. This is difference than the current invention I.sup.st is turn on-off light device and then camera take picture or photos under pre-determined functions which has no I.sup.st sensor and wait for controller searching is meet controller definition then go to take high resolution image. (2) The Cooper unit is battery Powered which is different with the current invention for variety of power and even current invention use Battery power still have back-up battery for continue supply current. (3) The current invention no need 2 different resolution image sensor or Camera to make 2 steps with the complicated program design which may not meet all kind of people wanted. Current invention just take camera because has built-in memory kits which for days or years memory kits including but not limited of SD card or mini-SD card with or without over-write functions to make days or years difference. So, the Cooper items is too costly for 2 image sensor or camera+complication program design for controller which not let all People accepted satisfactory+lack economical SD card or Mini-SD card to make low end cost LED light device has the camera and took clear photos or video for police to check if had bad things happened.

Also, US Prior number 20040212678 by Cooper et al. described a low-quality image capture device that is not the same as the current invention due to the process of taking digital sounds, messages, photos, movies, films, audios, videos, recorded sounds. The Cooper et al. invention takes pictures and then transmits the pictures into a control unit to determine motion; while the current invention provides lights and then capture pictures for natural quality and color. The Cooper et al. invention is also only battery operated, while the current invention relies on the AC through DC power input from different sources listed above, however, batteries can still operate as a backup power source for the current invention but not limited to this ability. The Cooper et al. invention also has two mode switching between sleep and normal; the current invention does not require such complicated programming, not only because it will increase the possible cost, but also not necessary as power for current invention is not to be considered about because the current invention will have unlimited power as it is plugged in varies of ways into a direct power source.

(Prior=8) US prior U.S. Pat. No. 5,107,120 (89F=PIR head and sensing range design) Tom U.S. Pat. No. 5,107,120 which is out of date PIR design. The current invention only using 1 single PIR can cover the 30 to 270 degree range. So this is not able compare with current invention. Also, U.S. Pat. No. 5,107,120 by Tom described an invention of passive infrared detecting device which uses different methods than the current invention to reach up to 180 degrees' field of view, however, the current invention includes a Fresnel design and single PIR to reach the field of view of 270 degrees.

(Prior=9) US prior U.S. Pat. No. 5,946,404 (98F=For School Bus use) BAKSHI device for school bus use. This is not same as the current invention for the home or hand carry products. So, this is not comparable at all. Also, the Wi-Fi definition came out on 1997 for 2.4G 2M which there had no any device came out from market at all, so it has out of date for the Wi-Fi or internet can transmit big size of the full color digital data at that ancient time. Also, U.S. Pat. No. 5,946,404 by BAKSHI et al. described an invention consisting a transparent glass and a dummy camera with video and audio recording ability, this is different from the current invention due to the current invention does not include a transparent glass, the current invention has a Fresnel included in front of the motion detector to reach maximum 270 degrees. The BAKSHI et al. invention uses the glass to further protect the camera and microphone included, the current invention uses the Fresnel to provide better motion detection for the device.

(Prior=10) US prior U.S. Pat. No. 6,100,803 (99F=Ceiling Light fixture with Motion sensor unit) Chang device for the Lighting fixture base had built-in motion sensor set to turn on Bulb and the light device has one electric connector 13 for directly electrically connecting with a common bulb socket. (the column 2 line 38 to 40) so the power is get from the Bulb socket AC current. Which is not same as current invention power source which is not from the Bulb socket (13). Chang also lack any camera. Chang filed on 1999 and at that time no any Wi-Fi or big or wider channel band can send out the full color HD colorful image though the any wireless station or the related network, so Chang device is not comparable with current invention. Also, U.S. Pat. No. 6,100,803 by Chang described an infrared warning detector consisting at least two of each lights and detector. The Chang's invention does not include a camera mean as the current invention does, and the Chang's invention has no digital transmission means as the current invention does. Chang's invention also consist bulb socket AC powered light device, which the current invention does not limited the power source to. Chang's invention has different purpose which is to illuminate the surrounding and provide sound alerts to remote areas, the current invention aims to store any digital information and data to provide safety for the designated areas of the customers' choices.

(Prior=11) US prior U.S. Pat. No. 7,321,783 (03F=internet or wireless for mobile not Wi-Fi at home) Kim teach a mobile entertainment and commination device on Nov. 20, 2003 which for palm-held size housing has a cellular or satellite telephone capable of wireless communication with the internet. This is not the Permanent installation for current invention for home installation or handcarry flashlight device. Kim device also built-in display screen and speaker and earphone, those all for phone construction, so no comparable with current motion sensor security light device. Also, U.S. Pat. No. 7,321,783 by Kim introduced a palm-sized, cellular phone-like device which can transmit digital data and record sound and take pictures in an ambiguous measurement of distance. This patent was allowed on Nov. 20, 2003, which 3G, 4G and Wi-Fi has not yet been introduced publicly like in the modern days, so the methods of transmitting the digital data are different. Kim's design differs from the current invention also, when the current invention uses illuminations to capture nature color images, but Kim's design does not include any illumination (flash lights, LEDs, etc.) Lastly and furthermore, Kim's designed his or her invention on the purpose of entertainment, for recording musicals, the current invention was designed for area security which have the same bases but different purposes.

(Prior=12) US prior U.S. Pat. No. 8,461,991 (10F=plurality of adjacent sector for Fresnel+reflector for light source). Botha device for multiple PIR sensor head with multiple Fresnel windows to sensor the moving objects and through the Circuit to make the said top Light device to emit the light because the 2010 filed by the Botha used old and out of date the PIR sensor which only can cover small area from FIG. 3 seems only 90 degree so Botha need use a movable mechanical to change the PIR head to different directions to check the desired wider area (180 degree) and whenever the PIR change to different direction, The front Fresnel lens also need to change position to match inner PIR sensor head, so need multiple window surrounding the 180 degree and use many Fresnel lens. This is different with current invention only use ONLY ONE PIR sensor head which can cover from 30 up to 270 degree. The current invention had update for PIR sensor head so no need the so expensive mechanical to make moving or rotating for PIR and need a lot of Fresnel lens through a lot of window. So, this is not comparable with current invention for 2 different technical Botha is out of date ancient device and current invention had update good PIR so no need motor, no need moving PIR head No need a lot of Fresnel lens and Fresnel window.

Botha also lack the camera and Wi-Fi and movable SD card and download device to wireless transmitting concept at all. Also, U.S. Pat. No. 8,461,991 by Botha described a security light device which includes a motor to turn the light source for better tracking and on-spot illumination. This is different with the current invention because the current invention has advanced optical Fresnel technology to reach maximum of 270 degrees for the motion-sensor or the moving-detector to search the surrounding for possible hostile situations. Additionally, the Botha invention does not include any storage means or transmission means such as SD cards, etc. and 4G, Wi-Fi etc. which are mentioned above and included in this current invention. Therefore, the Botha invention and current invention are not the same.

(Prior=13) US prior US2003-019-7807 (Camera adaptor has bulb socket to receiving existing Bulb) Wu item one camera (110) built-into adaptor (102) which can receiving-end (106) the separated existing bulb (108) and other end has male bulb screw base (104) and top had front door lantern housing. The Wu products as (0010) Line 6 to line 9, the system can also include a display device connected to the network transceiver to accept and display the digital image information. This means the wireless communication is too big size at that old time may be the format still at AV or other old-time date which too big to send old time network so from Wu's (network power line modem 220) on FIGS. 4, 5, 6, 7 need the (Modem 220) to help go get the image. However, the current invention transmitting the digital data by MP4 or more advanced technical for image format and transmitting by wife or more advanced channels than Wu's old time technical.

From electric technical the MP4 or higher image format definition start from 2001 for I.sup.st phase and current invention use at least MP4 for higher technical and use Wi-Fi to delivery so it only short time can receive the digital data and no need the (connect AC outlet to get AC power for network powerline modem 220). Back to Camera installation. The Wu application use out of date camera so has narrow range so need to adjust the camera direction while the camera installed on the rotating or adaptor. This is different with current invention the said LED light unit or/and camera is semi-Permanently after first time install on location no need rotating because use wide angle PIR motion sensor and camera assembly.

The current invention has digital data had min. MP4 or equivalent format so can use Wi-Fi to transmit small file. Not like Wu's need through the (220 Network powerline modem) to get the image.

Also, US Prior number 20030197807 by Wu described a bulb base camera design which uses the bulb socket for AC current which can also use batteries and replenish the batteries. Wu's design also uses a flexible arm in order for the camera and internet computing device to fit into any screw-in bulb bases and to cover the desired area to carry out the design's function, this is different from the current invention as the current invention uses an advanced Fresnel design to reach maximum of 270 degrees of coverage in the front plane of the camera unit, so the current design do not require a manual-flexing arm for the camera to work properly. Wu's design also differs from the current invention as there is no (1) storage means for stored images and videos such as SD cards, TF cards, Cloud storages connectivity, USB drives, (2) network notification kits to cellular/smart phones for alerts and streams using at least 4G or modern internet services or Wi-Fi or Bluetooth (3) other power source kits such as prongs/wires. Therefore, there are numerous technical updates since the written date of Wu's patent compared to the current invention, the two designs are different.

(Prior=14) US prior US2005-008-5131 (03F=Existing electric device 1 add one adaptor 2 which has bulb base or prongs Sutherland product is make a new Screw base to fit the existing electric appliance into (See FIG. 1) and connect all existing appliance power wires or controller (FIG. 2 and FIG. 3) with the said new screw base. From FIG. 4 and FIG. 5 show the how to design a new screw base or prong base. So, this prior art does not have any similar from construction, camera, image, LED light and further for the digital data, Wi-Fi wireless transmitting, storage device SD card or display or reply with current invention. Also, US Prior number 2005-008-5131 by Sutherland described a lighting fixture that connects to a junction box. This is totally different from the current invention as the current invention can be placed anywhere desired with simple installation. Sutherland's design also does not include a camera unit, wireless transmitting digital data unit, storage units, which are the main functions of the current invention. Therefore, the two designs are not similar at all.

(Prior=15) US prior 2007-025-7195 (07F=has many non-adjustable detector and camera to combine one monitor system.

REIBEL products show is security system has (1) controller to communicate with security-monitoring device. The monitoring device and controller is separate units and away from each other form FIG. 1 and also connect with all other peripheral communications.

This is not same as any one of current invention claims for (1) Security light has everything inside housing (2) Individual Motion sensor-unit (3) camera assembly for each item can take at least MP4 format image, sound, audio and use Wi-Fi to be transmitting out digital data and let receiver device can instantly to see or review or display or print out.

REIBEL also has no any light device to help the monitoring device to have sufficient brightness to take a full color at least MP4 format color image to easily and instantly send to receiver to see at once. (15) US Prior 2008-015-1050 (07F=Motion take camera and send to computer center to Mobile=This means '050 do not have any light device to help take phone under dark environment and '050 have to work with Computer to make the capture image into JPEG format for the still images, or use computer to capture video into MPEG or MPEG2 format to wire transfer (0029) and (Claims).

This is not same as current to take image at least has MP4 format and can instantly directly wireless transmitting by Wi-Fi, and send by APP software including skype, line, WeChat, WhatsApp, twitter, Instagram to mobile phone to review or display or printing. Self also did not show and discuss for any of LED light device to help the camera assembly to take full color at least MP4 format digital data under low or dark environment. So Self camera only can take out of date Black and White at dark or low brightness environment. Also, US Prior number 2008-015-1050 patented to Michael R. Self, entitled "Enhanced Multimedia Intrusion Notification System and Method" describes a notification system which signals portable phones through Multimedia Messaging System (MIMS), which can only send pictures, media files, or videos, up to 40 seconds at a super slow service speed. Michael R. Self's invention differs from the current invention due to the current invention has Wi-Fi function which allows the invention to connect to home or nearby Wi-Fi network, which is fashionable in the year 2017, and notify users' cellular phones or smartphones through the internet, which requires the said phones to include at least 2G, 3G, 4G, 5G, Wi-Fi, and/or Bluetooth, or future internet connectivity services to be introduced. Michael R. Self's invention also does not include a light unit for brighter illumination of dark areas during any given hour, the current invention includes LED bulb for illumination of dark areas to achieve full color, high resolution, and color-accurate pictures or videos provided to users at any time.

(Prior=16) US prior 2008-022-5120 (The 31 is outside the device) STUECKER products is not same as the current invention the Security light system (10) has motion sensor (30) and a direct electric powered security module (31) incorporating a storage device (63). From FIG. 1 can clear to see the direct electric powered security module (31) is located on the separated location and plug into wall outlet (21) to get AC power and transfer into (DC power). This is not same as current invention all the circuitry is inside the said security light.

Also, can see the Direct electric powered security module (31) has the all parts including digital camera mechanism (50), Transformer (61), Battery (62), Storage device (63), Antenna (64), Transceiver (65), security code switch (66) all built-inside the Direct electric powered security module (31) this basing the out of date technical. Not like current invention for all digital data has MP4 format and use Wi-Fi channel and APP software so can easily wireless transmitting out the MP4 format for digital data image.

SO, this is not comparable with current inventions. Also, US Prior number 2008-022-5120 by STUECKER design consist a network transmission towards telephonic companies then towards the cellular phones (Claim one). This point is different from the current invention because the current invention uses Wi-Fi, 4G LTE or modern internet services, application data notifications, Bluetooth to notify a cellular or smart phone device, not going through telephonic companies like STUECKER design is. Also, in FIG. 1 of STUECKER design, it is clear to see the direct electric power (DC) is located on a separated location and plugged into a wall outlet to get AC power into DC power. This is not the same as the current invention, which uses more modern technology to fit every circuitry inside the main housing of the invention.

(Prior=17) US prior 2008-025-2730 Hong product the illuminator (109) is supplied with an AC current from the AC power source (144) via a relay (148) which switches the AC current for the illuminator (109) on or off as determined by digital camera processor (140) at column (0025) line 1 to line 4.

This is different with current invention. The current invention LED light will turn on or off basing on the motion sensor detected moving object under low brightness environment Gudge by one simple photo sensor or photo diode). No need to passing through any IC. Hong has an image sensor 152 such as CCD or CMOS sensor is controlled by the digital camera process (140) which is too expensive for the current invention.

The current invention just activated the camera assembly whenever the moving objects been detected by only one motion sensor, no such expensive device. Hong connect with the PIR (166) and image sensor (152) and light sensor (156) with digital signal processor (140) which is different with current invention for simple use motion sensor or-and switch to turn on the LED light or-and camera assembly. Hong product also has USB ports to connect with unit so can get uploading the digital image to a personnel computer. This is not workable for the security light always install on high position and difficult to work for this USB wire to upload or download the digital data. Hong products also need memory card, but not just like current invention just save all the digital data inside the movable memory card while need to see inside digital data than use a USB wire to download or upload from high position security light So these are difference with Hong products. Furthermore, Hong did for AC powered source. Not discuss battery operated unit. Hong also did not have any wireless transmitting at least MP4 format digital data to receiver by Wi-Fi or-and software APP such as skype, line, WeChat, WhatsApp, twitter, Instagram for instantly got digital data to review and display or print out. Also, US Prior number 20080252730 by Hong product the illuminator (109) is supplied with an AC current from the AC power source (144) via a relay (148) which switches the AC current o the illuminator 109 on or off as determined by digital camera processor (140) and (0025) line 1 to line 4) This is different with current invention. The current invention LED light will turn on or off basing on the motion sensor detected moving object under low brightness environment Gudge by one simple photo sensor or photo diode). No need to passing through any IC. Hong has an image sensor 152 such as CCD or CMOS sensor is controlled by the digital camera process (140) which is too expensive for the current invention. The current invention just activates the camera assembly whenever the moving objects been detected by Only One motion sensor. No such expensive device. Hong connect with the PIR (166) and image sensor (152) and light sensor (156) with digital signal processor (140) which is different with current invention for simple use motion sensor or-and switch to turn on the LED light or-and camera assembly. Hong product also has USB ports to connect with unit so can get uploading the digital image to a personnel computer. The current invention includes the usage of memory cards. Hong products also need memory card, but not just like current invention just save all the digital data inside the movable memory card while need to see inside digital data than use a USB wire to download or upload from high position security light. So, these are difference with Hong products. Furthermore, Hong did for AC powered source. Not discuss battery operated unit. Hong also did not have any wireless transmitting at least MP4 format digital data to receiver by Wi-Fi or-and software APP such as skype, line, WeChat, WhatsApp, twitter, Instagram for instantly got digital data to review and display or print out.

(Prior=18) US Prior 2011-013-4239 (Street light)

VaDai products application for street light so all the application, construction, installation, and light output power and power consumption is different than the current invention and it also different for light need turn on from dust to dawn which is not workable for current invention which powered by motion sensor under low brightness environment only.

So, this is not comparable and no any point is similar or can be replaceable. Also, US Prior number 2011-013-4239 by Vadai products application for street light so all the application, construction, installation, and light output power and power consumption is different than the current invention and it also different for light need turn on from dust to dawn which is not workable for current invention which powered by motion sensor under low brightness environment only. Vadai's invention also contains a heat sink, which is not in inclusion of the current invention. Vadai's invention also contains a temperature detector, which is not included in the current invention, which will also increase the cost for the total product, which is not the point of the current invention. Vadai's remote surveillance design contains no storage means just or it is ambiguous, which is different from the current invention in inclusion of SD cards, USB drives, Cloud storages, and etc. mentioned above.

(Prior=19) US Prior REBECK Michael U.S. Pat. No. 8,203,445 and its Child Filed cases (Radio Frequency application)

U.S. Pat. Nos. 8,023,445, 8,362,713, 8,415,901, 8,491,159, 8,519,566, 8,669,716, 8,764,242, 8,829,799, 8,994,276, 9,066,393, 9,074,736, 9,078,313, 9,236,727, 9,247,623, 9,247,625, 9,252,595, 9,338,839, 9,342,967, 9,351,353, 9,392,669, 9,408,268, 9,543,788, 9,544,967, 9,807,858, 9,860,965 All device basing on Radio Frequency transmitter (RF) and receiver application for battery operated LED lighting device which lack of the camera and had digital-data including full color video, image or photos with or without the audio digital delivery by 4G or 5G with WIFI or-and WIFI-extender for delivery the full color image/photos to cloud device as current inventions. These group filed case is not same and timing is not matching the WIFI, 4G/5G, cloud, related lighting controller which can use download APP. So, these series filed case is not same as current invention basing on the equipment been created at right timing.

From Mihaael V. Recker (25) patents before the current invention parent filed date November 2011 including following US. application Series No.

1. U.S. application Ser. No. 11/847,509=Aug. 30, 2007F=U.S. Pat. No. 8,669,716=Mar. 11, 2024issued=battery LED light+Input wireless signal=
2. U.S. application Ser. No. 11/851,096=Sep. 6, 2007F=U.S. Pat. No. 8,023,445=Sep. 20, 2011 issued=Relay+Transmitter+Receiver=
3. U.S. application Ser. No. 12/772,563=May 3, 2010F=U.S. Pat. No. 8,362,713=Jan. 29, 2013issued=(Outside RF remote)+Battery=
4. U.S. application Ser. No. 12/827,574=Jun. 30, 2010F=U.S. Pat. No. 8,491,159=Jul. 23, 2013issued=(motion 2170)=RF transmitter+Battery LED lit=
5. U.S. application Ser. No. 12/903,273=Oct. 13, 2010F=U.S. Pat. No. 8,519,566=Aug. 27, 2013issued=Power shut-down to other power=
6. U.S. application Ser. No. 12/942,134=Nov. 9, 2010F=U.S. Pat. No. 8,829,799=Sep. 9, 2014issued=LED select from 2 different power source=
7. U.S. application Ser. No. 13/231,822=Sep. 13, 2011F=U.S. Pat. No. 8,415,901=Ser. No. 13/231,822=Sep. 13, 2011F=Apr. 9, 2013issued=Emergency light=Battery+Sensor (Both Wireless)=
8. U.S. application Ser. No. 13/247,620=Sep. 28, 2011=U.S. Pat. No. 9,247,623=Jan. 26, 2016i=Battery Power+Sensor= (Both Wireless)=
9. U.S. application Ser. No. 13/267,851-Oct. 6, 2011F=U.S. Pat. No. 9,074,736=Jul. 7, 2015i=Battery Power+Sensor (Both Wireless)=
10. U.S. application Ser. No. 13/283,468=Oct. 27, 2011F=U.S. Pat. No. 9,338,839=May 10, 2016i=Power Failure light (Both) Wireless=

The other (12) Michale V. Recker patents is filed on later time than current invention parent (#KKK-2011) U.S. patent application Ser. No. 13/295,301, filed Nov. 15, 2011, now U.S. Pat. No. 8,760,514. Those other (12) patent is no valid to against any or current filing and all parent filed patents. The listed 10 issued patents none of anyone have current invention basic-model of LED security light has AC or Solar power with camera-assembly to take colorful photo, video, stream image(s) under dark environment and the colorful image made by LED lights supply sufficient light brightness so can take colorful image. The current inventions further incorporate more practical electric-parts and accessories as below discussion.

(prior=20) Re: Farmer (2012/0293652)

First '652 Farmer system is Out-of-Date system at 2011 May there has no any

Cloud, and APP widely use is after (Apple V) Sep. 21, 2012 start to had people for software to control LED light and which is $1^{st}$ use by Phillips ZigBee even not APP software to adjust or mix color of LED bulb on Oct. 29, 2012. Both is evidence that Farmer is out of date device.

V.S. Current invention is continuously filed case basing on parent filed case of November 2011 and filed update CIP or Div case.

a. '652 Farmer unit (LED module or LED device or LED lighting) all belong to one-housing has all parts inside (FIG. 1, 2, 3)=>Current invention for 2 independent claims a-1: current invention for (Security light) which the sensor-unit or camera-assembly has everything and except the LED light source to install a security light base's adjustable-arms. The all LED light source has its own housing and install on security-light base's other adjustable-arms.

a-2: current invention only claim individual or separated housing of Sensor unit or Camera-assembly has everything without LED light source, The individual sensor unit or camera-assembly is only claim because it can install on all old-existing security light which has its own light source for all kids.

a-3: '652 Farmer concept: Each LED module (100) has its own thermal spreader (104) and the module (100) fit into outside heat-sink (200) has a lot of assembly kits including (internal socket (204) mounting feature (126), contactor (124), fit into connector (206), connection feature (214), electric contact (210) and electric contact (212)→(FIGS. 1 and 2 details description), This to form a PAR type or MR16 or MR20 type lamp (Column 0049)

This prove the FARMER design is for the PAR type LED lamp.

v.s. current invention for security light or sensor unit or camera assembly→totally different for construction, application, concept, idea so FARMER '652 is not proper prior art v.s. current invention.

a-4: '652 Farmer concept for FIG. 4 diagram: "The said driver (400) is suitable for use as the driver (106) of the LED module 100 shown in FIG. 1" (Column 0054) and "The driver 400 comprises processor 402, memory 404, LED dreiver 406, sensor interface 408, camera interface 410, communication interface 412, all coupled to communicate over bus 414".

v.s. The said all the parts except LED light unit with LED light source is inside one of the sensor-unit or camera-unit is totally different construction, application, idea.

a-5: '652 Farmer concept for all claims and all text has the LED module (100) has thermal spreader (104) and the LED module (100) assembly with outside heat-sink (200)→

V.S. The current invention the separated housing LED-unit or separated housing has LED light source which is NOT SAME housing of the other parts and no need to has such complicated thermal spreader (104) and outside heat-sink (200) with so many complicated assembly kits as (a-1) listed all parts for make a PAR type LED bulb.

a-6: '652 Farmer all the "The driver 400 comprises processor 402, memory 404, LED dreiver 406, sensor interface 408, camera interface 410, communication interface 412, all coupled to communicate over bus 414" is inside the PAR type lamp . . . .

V.S. This is not same as current invention which "All parts except LED-unit is in one housing" and "All LED-unit has its own housing" so can isolate the (heat source) away from the "all electric parts for camera, storage, wireless communication, audio-related parts.

a-7: '652 Farmer FIG. 4 and its text explanation, all the parts ("the driver 400 comprises processor 402, memory 404, LED driver 406, sensor interface 408, camera interface 410, communication interface 412, all coupled to communicate over bus 414") is inside the LED module (100) such as PAR type lamp . . . . All controller is built-inside and work by process (402)→This is the out of date electric application. Because Farmer 2011 May do not have (1) Cloud to storage digital data (2) Not wireless to download APP (3) APP at May 2011 not existing software to control all the device from communication device including iphone or ipad (4) download APP with software to control for lighting star from Phillips on 2014 so Farmer that old days is out of date (5) All current invention is download APP software to control all setting, adjust of LED light, camera, audio, or wireless communication including talking, audio transmitting, call other parties all from phone or ipad hand-held device no more from the pre-program processor (402) at all.

V.S. current invention has detail listed for (AA) wireless storage camera capture video or audio digital data into CLOUD V.S. Farmer's DRAM, (BB) wireless connect with APP V.S. Farmer filed May 2011 had nothing of APP available for light or camera remote control from I-PHONE™ or I-PAD™ or hand-held device not from pre-program processor (402) built-into LED module (100).

(CC) Download APP software for setting, control, adjust LED light, camera from iphone or ipad or cellar phone not control by Farmer's processor (402)

(DD) Farmer never has any concept to turn-on the LED light and camera to take a colorful image inside whole text, so Farmer never disclosure the COLORFUL IMAGE under dark environment as the current No. 1 features so can become crime evidence.

(EE) Farmer never disclosure the Motion Detector from image or displayer or screen for moving objects to prevent false triggered alarm or send message to home owner or police department. This motion objects(s) detection or-and comparison is $2^{nd}$ feature for current invention.

(FF) Farmer has the central controller (608) to wireless delivery signal. This is not same as current invention, the APP and APP software to allow each house or phone owner to get the alarm signal or allow each owner to operate setting or adjustment or control not operated the signal by a central controller like ADP or other security company.

a-8 '652 Farmer FIG. 6 shown all the digital data for FARER use LAN to building the region signal connection which is need wire to connect with router then connect with internet. V.S. Current invention to directly to use WIFI to connect with internet without need to use Wire to link with internet. This is different.

From above comparison with (20) US Prior arts, the current invention had all following unique features. The current invention utilizes an power source provided by (1) an alternating current (AC) electrical outlet which the current LED light device has built-in prong plugged into outlet, or (2) LED light has a screw-in base to screw-into AC bulb-receiving socket, and/or (3) The LED light has conductive wires to get AC power source, All of them of prong or bulb base or wires is connected with circuit converting the AC power to direct current (DC) power to offer the power to said LED(s) for illumination.

In addition, the current invention incorporates a low cost, super compact Digital Video (DV) device (hereafter as DV) or any camera or same function products available at market place such as (webcam) or (driving Cam) or (Go-Pro) or (super mini size hidden camera with desire pixel) or other camera device, which is parts or whole unit built-into the said LED light device and preferred the camera is tiny head with tiny size so like hidden-camera built-in the said light device so bad man cannot easily find while get into people house so can solve the problems of high cost and difficult installation, eliminating the need to hire professional engineers at high cost per hours and saving wasted time in waiting for an installation appointment and never-understand setting procedures.

So, the current invention has sufficient LED light trigger by the motion and/or radar detector or both to turn on the LED light beam at once and camera or DV to take photo, video, stream image for colorful image because LED light supply sufficient brightness to let camera easily to take colorful image under dark environment. The day time as long as environment is bright enough the said motion sensor and/or radar detector or both will not trigger the LED light basing have out photo-sensor or brightness controller to stop LED to emit light and at that time camera or DV take photos, video, stream image depend on market requirement.

The current invention can transmit digital data from the digital camera the memory-device, or wireless server or cloud and after the desire comparison or logic-system or other analysis-assembly so can make decision weather deliver to people phone or computer or other to the display unit while receiving power directly (1) from built-in prong of the DV or any camera or (2) from a screw-in base or (3) from other conductive skills to connected with an AC power source through the AC-to-DC circuit to provide DC power.

The current invention preferably also provides
(1) Low-cost model: a DV or any camera device having a camera and display screen in one unit so that there is no need to spend cost for transmission by wireless device for most economical model for variety of low-income person. Or,
(2) All digital data got form camera can store within the memory unit such as SD or Micro-SD card or incorporate with Cloud storage station and can show image while take it out and connect with display software. Or
(3) the preferred update model can use blue-tooth or other device or USB wire assembly to download the digital data storage inside the memory unit such as SD card or Micro-SD card or other data storage kits. Or
(4) It also can use rounder or Wi-Fi wireless assembly to build with camera, storage unit wired or wireless including incorporate with Cloud storage station through communication system and APP, market available software, server, cloud storage station and send out or receiving digital data or use wireless assembly including but not limited for the email, skype, we chat, what's APP, twitter, face-book, Instagram, preferred platform or conventional platform so can make more functions including but not limited such as dial phone, call police, adjust camera operation, adjusts light functions, and transmit the digital data to desired consumer, computer, communication devices including phone, laptop, display screen, etc. for high-end products who willing to pay for.
(3) The current invention mainly to design for all kind of LED light device has different parts built-in on the said light device for low-end, middle cost, high-end cost version for different functions and parts. (A) The one of many preferred functions as below listed; (1) digital data storage into memory card, when needed take inside memory card or SD card or Micro SD card to display device to check digital data. (2) digital data can download by Bluetooth or USB wire assembly or other electric device into communication device(s) including phone, computer, display device, laptop, monitor. (3) Digital data can use wireless communication assembly to send out message, data, alert, words, sound, image to variety of communication devices including mobile phone, computer, monitor. Or, can multiple ways communication though wireless network, 3G or 4G or update wireless network, WIFI, Router, cloud storage station, incorporated with APP or other platforms to increase more function(s), wireless network or internet equivalent or same function wireless network.

Because the DV or any type camera is built with or built-into the light device, and may including an LED light, LED bulb, lamp holder, LED flash light, LED garden light, LED entrance door light, LED desktop/floor light, LED recess light, LED downlight, LED landscape light string, LED patio light-string, LED patio light, LED floor light or other light source or the LED illumination device, the invention offers excellent home security for low-end, middle-end, high-end with simple installation. One advantage is that a bad man into and cannot easily find the preferred hidden-installation the said DV or any type of camera from among a variety of lighting related device(s) such as lamp holders, LED bulb lamp holder, LED flash light, LED garden light, LED entrance door light, LED desktop/floor light, LED recess light, LED downlight, LED landscape light string, LED patio light-string, LED patio light, LED floor light or light device on the wall or ceiling, and all the bad man's behavior been detected and recorded inside the built-in DV camera and storage unit or other more deluxe type of security or wireless arrangement so this will offering the best safety record to protect home and family at any time.

The storage unit's inside digital data can get by (a1) Get SD or Micro-SD card to connect with display software (a2) Incorporate with Blue tooth or USB wire assembly or other electric device communication to download the storage unit's digital data even can download from cloud storage station while incorporated cloud system. (a3) Incorporate with Wi-Fi or 3G/4G or current setting 5G network, rounder's wireless communication, storage into cloud by wireless network to transmit to digital device including phone, computer, laptop, display, monitor . . . etc.

Furthermore, every electric component for camera, circuit, blue-tooth, Wi-Fi, rounder and related APP communication parts & accessories all built-into or individual-housing-unit for individual-sales or assembly with LED-light built-with the said light device and may has
(1) Wi-Fi-extender for big house to help reinforce or increase the electric signal, or- and
(2) the moving detector with its related software or interface to make the screen-comparison or-and detectors-heads comparison for selected area(s) to determined transmitting signal(s) to phone or communication device(s), or-and
(3) The moving-detectors sensed the difference or moving on selected area(s) of screen or display of communication device including mobile phone or displayer of screen then transmitting pre-determined signals to owner or police or security authorities or neighbors or friend, or-and
(4) moving detectors and its related software or interface can offer phone or communication device screen or display can selected-area(s) to prevent from the each car or each walking people or each animal passing through the device and trigger system to send out signals to communication device(s) and cause signal(s) send hundred times daily to annoy people. So moving-detector(s) with selected-areas feature as above discussion "Screen comparison" can let people to select the right areas or area(s) has moving-objects where is not interferer the people privacy, un-necessary signal(s) delivery, or false alarms for many time(s) to cause people live for troublesome and headache situation.
(#KKK-2011 U.S. Pat. No. 8,760,514) LED light device, (#KKK-2
U.S. Pat. No. 9,197,865) LED light device+Web-cam
(#KKK-5 U.S. Pat. No. 9,549,110) LED light device+Garden light
(#KKK-I U.S. Pat. No. 9,560,32), LED light device+individual motion sensor/movmg detector(s) salable unit And plurality of co-pending case including
(#KKK-2011) U.S. Pat. No. 8,760,514) LED light device,
(#KKK-1) U.S. Pat. No. 9,560,32), LED light device+individual motion sensor/movmg detector(s) salable unit
(#KKK-2) U.S. Pat. No. 9,197,865) LED light device+Web-m
(#KKK-3) LED light+Flashlight
(#KKK-4) LED light+individual motion or moving sensor
(#KKK-4) U.S. patent Ser. No. 15/390,783 filed on Dec. 27, 2016, now U.S. Pat. No. 9,838,430 issued on Nov. 28, 2017
(#KKK-5) U.S. Pat. No. 9,549,110) LED light device+Garden light, And, plurality of co-pending case including
(#KKK-6) LED light+individual Motion or moving sensor for multiple functions, And, plurality of CIP or Division filing. Or LED bulb,
(#KKK-7) U.S. patent Ser. No. 15/453,270 filed on Mar. 8, 2017, now is U.S. Pat. No. 9,838,652 issued on Dec. 5, 2017
(#KKK-8) U.S. patent Ser. No. 15/268,125 filed on Sep. 16, 2016, now is U.S. Pat. No. 9,838,430 issued on Nov. 28, 2017
(#KKK-9) U.S. patent Ser. No. 15/901,251 filed on Feb. 21, 2018
(#KKK-10) U.S. patent Ser. No. 15/972,798 filed on May 7, 2018, now is allowance on Nov. 30, 2018
(#QQQ-2) U.S. Pat. No. 9,551,477 LED bulb has multiple layers
(#MMM-1 U.S. Pat. No. 9,541,260) LED bulb has multiple areas illumination
(#MMM-12 U.S. Pat. No. 9,541,260) LED bulb has multiple functions
(#JJJ-1 U.S. Pat. No. 9,010,986) LED bulb has built-in camera and digital data
(#QQQ-12 U.S. Pat. No. 8,834,009) LED bulb has extendable
(#JJJ-2011) U.S. Pat. No. 8,562,158 LED bulb has built-in camera and digital data Or lamp holder or lamp socket adaptors
(#ZZ-2010 U.S. Pat. No. 9,033,539) lamp holder had built-in LED light (#111 U.S. Pat. No. 8,711,216), flashlight, garden light, entrance door light, floor light, patio light string as current invention, parent filing or co-pending filing case disclosure. It is appreciated all the above listed current, parent, co-pending filing still fall within the current invention scope and claim covering.

Other preferred embodiment of the current invention, the DV or any type of camera can include an endless recording that overwrites past digital data so that it will always update new data without the need to change any storage means, so long as the initial installation is selected for certain hours of recording and certain minutes for the storage section. Or even can incorporate with cloud storage station so can save and pick-up the digital data for super big number of files at any time.

The preferred DV or any camera device may have the most advanced technical features at least has MP4 or higher rank format and functions can increase while make proper arrangement and incorporate below parts for any combinations into basic LED light has camera device which may include any combination of a
(F1) wide Angle or telescope lens assembly and fine pixel/HD (1280.times.720 Pixel)/VGA (720.times.480 pixels)/good display screen (320.times.240 pixels) with a light weight, rechargeable batteries, and anywhere from I.3M up to 12M or more pixels to provide VGS or HD video or ISO selection;
(F2) auto focus/tilt/rotating/moving/scan functions;
(F3) a motion sensor by PIR detector;
(F4) a moving sensor by one or pairs or more detectors and comparison; and/or motion+screen image-comparison go through logic or analysis system to judge real object movement;
(F5) a night vision selection (IR or equivalent or same or replaceable device) for dark environment camera shooting helping device);
(F6) auto power shut-off with IC or timer application;
(F7) power saving;
(F8) built-in screen;
(F9) USB assembly for data delivery including wires, USB charging port, a pair of male USB output ends and software and hardware;
(F10) remote controller including IR or RF or Z-way or Zigbee or WIFI related remote assembly;
(F11) wireless data transfer to a remote cellular phone/computer/communication device(s) including remote controller, Bluetooth, Wi-Fi, router, wireless transmitter and receiver device or wireless communication including Wi-Fi, 3G, 4G or future available network for wireless equipment and also including APP software, platform software, cloud storage station. The wireless communication including mutual ends communication, software setting, hardware or software communication.
(F12) auto dialing to a police station or send emails or send line-message;
(F13) auto tracking or preferred detectors the size of moving object(s) from ants to elephants or other live objects;
(F14) other light means/device(s);
(F15) other wireless/remote/IR sensor/PIR sensor/motor(s) features;
(F16) any other electric or mechanical functions available from the marketplace for a digital camera or digital video recorder.

Any or all such features may be selected and incorporated with the preferred DV or any type of camera device to make sure people can see, know, and watch the desired site/events at any location/place/time away from site/events and get colorful photos, video, stream image under darkness environment by LED light sufficient brightness. This is the features do not disclosure for any of prior-arts.

The current invention further has other features or improvement while incorporate with MP4 format, Wi-Fi, 3G/4G/5G and internet network, download from internet for APP and software or other software for platform application, cloud storage station as below:

The DV or any type of camera device may have a plurality of cameras to provide multiple images that can be shown on a screen so as to monitor multiple areas and selected the area(s) where will not interferer the neighbor, not interferer the people privacy, not send out none necessary alarms or send signals to owner, So, this is one preferred or alternative arrangement features the said LED light device has this pre-determined design or related hardware or-and software design of APP such as one of preferred for screen-comparison need to preset the selected areas/site from APP software screen so image or photo or video comparison can be selected.

The said one of embodiment for (S1) outdoor sensor security camera LED light or (S2) front door entrance camera LED light or (S3) indoor recess camera LED light has built-in motion/Radar/or both sensor or-and other type sensor to turn on the said LED light source and has the moving-detector to comparison the screen(s) to confirmed the real-object-movement then incorporated the related software, APP or IC to send accurate alarm or signal can prevent from false alarm made by animal, passing through cars, out of house territories range moving objects for hundred or thousand time(s) non-necessary signals or alarms. It will also be appreciated that the DV or any type of camera device can incorporate an IC chip and related circuitry, motor-, and a motion-sensor or moving-sensor with more than one detector heads to detected or comparison difference so allow a single camera head with auto tracking functions to follow moving objects.

A preferred embodiment of the built-in DV or any type of camera device for LED light-device of the current invention includes an LED bulb and lamp holder, flashlight, garden light, entrance door light, LED desktop/floor light, LED recess light, LED downlight, LED landscape light string, LED patio light-string, floor light, night light or variety of lighting device to provide an LED light device, night light, or security light which has prong or socket or conductive wire to connect to (1) an AC power source or (2) a big capacity DC energy storage device which directly supplies current, or (3) a rechargeable big capacity power storage device such as a rechargeable battery, and which also may incorporate with any other separate parts & accessories such as wire(s), adaptor(s), or transformer(s) to deliver electricity from the AC power or big DC electricity storage unit source to the LED device and built-in digital data device.

Furthermore, the AC power source (AC application) or DC big electricity capacity storage unit (battery operated application) may use (1) prong, (2) a AC or DC bulb socket base or lamp holder, (3) conductive wires or parts, or (4) a USB-cable that directly comes out of the light device housing, or (5) a regular 120 Volt 60 Hz plug AC wire that directly comes out of the light device housing and connects with the public electricity system for home, house, and public areas.

The electric delivery between light device and AC or DC power source may select any available type from convention market for all kind of skill and method and kits.

One of the best applications for the current invention is as a webcam that already used for all kinds of computer, laptop, phone, or communication equipment. Or driving-Cam already use for all moving traffic device. Both are not expensive like the street police department use Traffic-Cam. Conventional webcams are limited in that they cannot follow moving people or moving objects, so people have to sit in front of the webcam to talk with people. After incorporated with current MP4 image format+Wi-Fi or 3G/4G/5G or-and internet network+storage assembly including Cloud storage station+download from internet of APP and related software by phone or computer owner, or other update software+the optional moving-detector with screen-comparison and selected-areas+incorporated with LED light device and camera device will become perfect visual products to let consumer pay the less but get the maximum protection for properties and personal safety.

The current invention makes big improvement from marketing simple LED light or Simple Camera/DY device including solve below major issues:

(Solve 1)

The webcam or any type of camera for prior arts lack of the brightness during the night time or dark environment, so have bad photos, image to be seen at dark or night time environment. The current invention has LED light sufficient light so can take the MP4 or more update high speed image to deliver out while the motion-sensor or moving-detector hard-ware or-and related soft-ware or interface with optional selected-area(s) to prevent non-necessary electric-signals transmitting to communication-device(s). The said moving-detector(s) hard-ware or soft-ware can detected the moving objects so can take full color even the Full HD image and can instant to deliver to consumer mobile phone or other communication device(s).

(Solve 2)

As for convention security light such as health Zenith®. motion sensor LED or PAR38 bulb or halogen light device for outdoor security light device lack of the camera took captured at least MP4 format data, storage unit, memory card, incorporated with Cloud storage station, Bluetooth, WIFI, Server, Router or-and 3G/4G/5G network and update APP or other software to communication so all heath Zenith® products just a Motion sensor light device to offer the light only to show path to bad guys. Zenith® products lack of function to take MP4 format photo, image, sound, movement recording and replay function and all current invention teach Wi-Fi, router, APP, motion sensor or-and moving-detector with optional screen comparison and selection(s) and APP remote control or adjust or setting or selection or dial-out to police, friend or other people to take care house situation, so it is not really to keep people has good security and prevent bad man to do bad things.

(Solve 3)

The current invention preferred all the motion-sensor or-and radar-sensor moving-detector(s) with image-comparison or screen comparison products such as the motion-sensor or-and radar-sensor or moving detector(s) lamp holder as FIG. 1A, 1B, 1C, 2A, 2B add the DV or any type of camera device & memory card or-and cloud storage station and APP with its remote control or selection, so it will add only limited cost but become motion sensor security products as other issued U.S. Pat. Nos. 8,562,158, 9,010,986 and above listed LED light, flashlight, garden light, entrance door light, LED desktop/floor light, LED recess light, LED downlight, LED landscape light string, LED patio light-string, floor light, night light.

Or for the LED bulb may has motion-sensor or-and moving-detector or- and other sensor and built-in the DV or other camera & cloud storage station or-and movable or downloadable memory card and other optional wireless kits as U.S. Pat. No. 8,711,216. So to add the DV or any type of camera device & Wi-Fi with reinforce Wi-Fi-extension or-and memory card or-and incorporate with cloud storage station with optional different combination for Bluetooth, WIFI, 3G/4G/incoming 5G network, Router transmitting or receiving kits built-into light related products including LED bulb, lamp holder, LED Flashlight, LED garden light, entrance door LED light, lamp holder adaptor, Light device which the said all related for offering the brightness for dark or night time illumination so can make the DV or Web Cam or IP Cam or Driving Cam or any type of camera device can has sufficient brightness to take full color photo, clear video into memory cards or memory unit. This also overcome the Night Vision design to use the IR or photo diode to makeup the dim or dark time for brightness, but such design normally makes the photos or video only become BLACK and WHITE with not-clear photos or image. So, Add the DV or any type of camera device and APP and screen-select areas for comparison or-and other related parts & accessories as above discuss or parent, co-pending, patented is the best combination than other IR night vision design.

The alternative design of the current invention to make an individual motion or-and moving sensor unit to incorporated with any light source of existing light device. The said individual motion or moving-detectors or other sensor unit has built-in camera, cloud storage station, APP software, moving-detector hard-ware or-and software to make screen or image comparison for selected-areas of screen or image can prevent non-necessary signal transmitting to owner, motion sensor for turn on and turn off LED light source, for cheap model has built-in movable or downloadable memory unit, and optional wireless communication combinations as desired functions such as APP with remote-control functions and cost so can replace all marketing none camera light device to upgrade to become has built-in camera device to increase the safety and functions. The individual motion-sensor or-and moving-detector or other sensor unit which also can assembly for any existing light device is also fall within the current invention.

(Solve 4)

The other problem for IR night vision can only take black-and-white photos, video, stream image, the current invention preferred to use existing light device to offer brightness for dark environment or night time to take colorful photos or video. This is the basic function or features of current invention. The IR night vision is not perfect than use existing light device to offer brightness for dark environment or night time to take photos or video. The IR night vision has major problem for power consumption for stand-by or operation, and more worse issues IR high vision also have high heat problem and distance range too short issues and finally is expensive cost issues.

To add only the camera and wireless to put digital data into cloud storage station or movable or downloadable memory units into existing all kind of light source light device has no such issues. So, the current invention preferred to add camera and wireless connect with cloud storage station or movable or downloadable memory unit and optional wireless transmitting & receiving kits is the best combination.

Also, there is no need to make one new security camera with memory unit with optional wireless device. Because majority house, home, public building had all kind of existing motion-sensor Security lighting so just add or replace the current invention's individual motion-sensor-unit which has key Camera and system so can make all existing lighting become more useful lighting device. The said existing light device including outdoor motion sensor security light, LED flashlight, LED door entry motion sensor light, LED desktop/floor light, LED recess light, LED down-light, LED landscape light string, LED patio light-string, LED motion or moving sensor night light, motion sensor anywhere light which can have plug-in or battery or wired or outside transformer or outside adaptor or other power storage unit to supply the sufficient power source to make all kind of light source light device for motion activated light device.

(Solve 5)

The current invention such as FIGS. 3A, 3B, 3C and FIGS. 4A, 4B, 4C the LED bulb as normal market LED bulb has built-in the current invention preferable (P1) camera can take min. MP4 format image, and
(P2) memory unit or use wireless skill to incorporate with cloud storage station, and
(P3) with optional wireless communication kits.
(P4) motion-sensor or preferred switch or sensor for turn on and turn off the LED light source
(P5) Furthermore the LED light device has related parts or software to let people to have optional screen or image comparison moving-detector system for preferred selected-areas.

The preferred the camera is so tiny diameter for lens so it become almost called "hidden camera" or "pin-hole" camera so not easily to be found by bad man while interrupted into home, house, building while do the bad things. Especially, the current invention products apply for outdoor including garden or front entrance door or garage or back door will I 00% can take bad guy full color image because bad guy wear the mask because light device offer sufficient light and camera take full color photo at the same time while motion or moving sensor triggered at night or dark environment at outdoor areas.

Same as applications for Lamp holder, lamp holder adaptor, all kind of lighting as list on this or as Figures of invention. The preferred the camera is belong to hidden-camera or pin-hole camera so not let people easily find the location of the security camera and destroy it. This is other feature for the current invention to overcome market camera location been notice and destroy by bad man.

(Solve 6)

From FIG. (8A)(8B) show the portable Flash light has built-in DV, memory unit, and optional wireless communication such as WIFI, 3G or 4G or future wireless transmitter or receiving kits to offer the police or army or military or security person can have the super bright light source to incorporated built-in DV and memory unit and optional wireless communication to incorporate with cloud storage system and 3G/4G/incoming 5G network or more high-tech settle-lite networks or army own network or channels to take photos, take video, offer on-line image though the optional wireless communication to the viewers to see the record or on-line or on-air instant live image to make sure the safety and status while people use the flash light. While use for Army or Military purpose the DV or Camera can incorporate with above discussion for night time or dark environment to use the (1) Visible flash light beam to offer brightness or (2) un-visible IR or photo diode to make the dim or dark environment to show the surrounding status and not let enemy see the Visible light beam and shoot the army or military team and persons however the un-visible IR or Photo diode still can offer black & white or green image so still become 2.sup.nd choice but for battle field it is OK, however still need incorporated current invention disclosure the MP4 format image+cloud storage station+high speed wider channel wireless transmitting including settle-lite system+APP or update software or plate-form(s)+displayer device+good communication device so can see all status at everywhere at any time.

The flash light offers super good brightness let the DV or camera or IP Cam or driving Cam or Web-Cam can take nice photos, video, on-line message with colorful image to viewer even Full HD or higher so can become court case evidence which superior than IR night vision device for only black & white. Same for other lighting device did as above discussion. This is offering the portable flashing light or wearable flashlight for people to report or send out image by wireless communication equipment to the phone, computer, screen, communication equipment to report the people status or environment at the dark or evening environment.

This is unique features and the power can be DC power source or rechargeable Power source or wireless recharge power source by market available charging or battery storage units with sufficient big capacity of the electricity.
(Solve 7)

The current invention for light device has communication assembly which have multiple-ways communication functions while incorporate with related or update software such as APP so can increase function including (a) talk though the security light (b) control the camera angle, position, focus, orientation, setting, adjust details (c) send out email, alert, words, talk, chat, dial to police station, connect with government utility service though the existing wife, router, internet, wireless network, 3G or 4G or future wireless network, even for settle-lite channel or military special channel, so can check all areas or locations status at any time though the wireless communication assembly or kits or device which built-in or built-with on the said security light to make the digital data can be communication.
(Solve 8)

The separate and individual the motion or moving sensor has built-in or built-with digital data device(s) and camera(s) related parts and accessories can let all non-camera motion sensor can upgrade to the built-in or built-with camera(s) motion sensor security light while replace the current invention built-in camera motion or moving sensor unit assembly with the other light source set, so can let consumer use the less cost to get the upgrade motion sensor has built-in camera to increase the home, house, office, environment space safety for less cost increase. Even, People can hang or put a sign, a sticker on the front house to show (Smile the hidden video is recording now!) to get the bad guys away from the residential house or office or business areas.

The current invention make the combination for the non-expensive and whole existing unit or selected parts & accessories of compact size of the Web Cam or DV or Driving Cam to put into or assembled with the existing or old light device so solve the all above list issues and most important this arrangement total solve and upgrade all non-camera light device which are (1) lack of brightness to take good photos at the dark environment (2) Add the camera, memory means, power storage unit, wireless transmitter & receiver, Bluetooth, WIFI, Rounder, motion sensor will total increase safety for properties and people so this should save a lot of money for Federal for overtime work of police to find witness while bad thing happened.

Also, the preferred embodiment of the current invention that provides a USB-cabled light device with a camera head having an auto tracking assembly will make an excellent auto-tracking webcam to let people freely move while talking with other parties.

Another preferred feature is to include foldable or retractable prongs so that the device can be carried anywhere such as (1) flashlight (power fail or inductive charged type or motion sensor or other multiple functions type), (2) Night light or (3) night light has USB charger products or (4) plug-in outlet with built-in rechargeable light products or (5) screw-in bulb receptacle or receiving socket LED light device has built-in hidden camera assembly. The current invention may have different constructions that provide an LED light with a built-in digital data device capable of being moved and used anywhere, including a car, motorcycle, boat, bus, truck, or other transportation equipment or outdoor activities. The carry or portable Light device as long as has (a) the foldable or push-in/push-out prong or (b) screw-in base with switch on-off products is incorporated with a proper receiving-ends and adaptor or receptacle or socket, or (3) has male cigarette plug or male USB plug to connect with cigarette lighter or USB-port female receiving end or socket so those (1)(2)(3) can has maximum functions and can take photos by sufficient light from unit with compact camera built-in and optional current invention discussed parts & accessories to make more than 2 function carry on anywhere good products.

Furthermore, the DV or camera device may have a variety of functions, parts, and accessories to get desired functions. The DV or camera device parts and accessories may be selected from different camera heads, kits, lenses, optics means, Lens assembly, night vision means, means for detecting motion by image screen or motion sensor, vibration sensors, sound sensors, storage means, SD cards, Micro-SD cards, memory sticks, memory means, operation functions, power saving circuits, screen touch panels, exposure means, and/or motor means, as well as means for adjusting or selecting clearance, pixels, sharpness, ASA, and so forth. Another preferred embodiment of the DV or camera device of the current invention is to add the DV or camera device to a lamp holder and LED bulb. A majority of Varity light source lights and lamp holders are installed at a position which is higher than people's height, so that they will easily record moving objects without any objects blocking the camera shooting directions. Furthermore, the current invention not only can provide an LED bulb or lamp holder with a DV or camera device, but also for all kind of market available variety of light source light device including a night light that incorporates at least one of wider angle camera so that it can look for moving objects from an unnoticeable position.

The current invention also can apply more than one camera head with a divided image on screen to save cost or use only one camera head that incorporates more than one sensor-means and an IC circuit to calculate a position or orientation difference to delivery electric signals to a motor-means to move the camera head toward a moving object and thereby provide an auto tracking camera. Still further, any equivalent or same function will still fall within the current invention and can be added to the preferred DV or camera device devices to provide nice, clear digital data and storage into a memory-means powered by an unlimited power source without causing worry about battery power or bad electric wire installation, unlike the conventional home security equipment.

In embodiments involving a lamp holder, insert parts may be provided to connect with an original lamp holder's receiving socket to change the lamp holder's current, functions, current type, voltage, and features, such as changing from AC to DC at a certain voltage and amperage, adding cameras and related parts and accessories, adding LED device current triggers, adding IC chips to operate desired functions, adding a tracking motor device, adding a motion or moving sensor(s), adding remote control parts and accessories, adding an infrared nighttime vision function, adding memory means with related parts and accessories, adding display means, adding transmitter means to transfer digital data to a remote distance, adding auto dialing system, and adding an internet connect function or any other electric or mechanical functions based on market requirements.

The lamp holder may be selected from market-available items, and may hold one or more light means, including any of an incandescent, fluorescent tube, PL, CFL or LED light for use with a variety of different bases, which may be in the form of a screw base, bayonet base, two-pin base, twist base, or push and twist base. The lamp holder connected with the house or home or building power source when the lamp holder's insert is connected with the original lamp holder receiving means so that the power can be obtained from the original lamp holder's unlimited power source.

The camera incorporated with the lamp holder of this embodiment, like the camera of any of other embodiment, can consist of desired parts and accessories including lenses, optics piece, electric parts, mechanical units, circuit, integrated circuit (IC), data delivery system, data storage assembly or cloud storage station, USB assembly, cable, microphone, recorder, displayer, sensor for any type, PIR remote controller, IR remote controller, night vision system, flasher, switch, motion detector, moving detector sets, sound detector, photo sensor, motor, tracking assembly or other market available parts and accessories to allow people to get digital image, video, and audio data and record it in memory or cloud storage station or send/transmit the data to a communication device, computer device, receiver device, and/or display device to provide predetermined functions, effects, and performance.

According to another preferred embodiment, and LED bulb includes a plurality of LED-units that fit within a bulb housing having an appropriate shape and dimensions, and positive and negative electric contracts to get power from the power source when the electric-contacts connect with the power source and the power source is thereby connected with the desired electric parts and accessories, which may include circuit, IC, conductive parts, switch, motion sensor, moving sensor remote controller, IR or RF remote controller, or other electric or mechanical device to cause the LED-unit(s) and the camera to be activated with the LED bulb and it is appreciated that the LED bulb can selected all above discussed parts and accessories for its added parts and accessories and image can display for all the above-mentioned pre-determined function(s) and performance(s).

The LED bulb has space to install the camera on its housing by using or together with any of the following: joint kits, rotating set, connector, spin device, catcher, a gear-set, a motor set, controller, IC, moving sensor head(s), motion sensor, tracking assembly, memory assembly, displayer, screen, USB assembly, conductive parts, digital data delivery system, battery, rechargeable battery, power fail functions, or others to provide the camera that fit-into or built-into or built-with the LED Bulb to have desired functions, features, and performance.

The space in the LED bulb may include a pole(s), block(s), piece(s), and/or compartment(s) having properties that cause the bulb or space to be extendable, retractable, foldable, rotatable, and/or transformable so that the related parts and accessories can be increase more space to allow all parts & accessories can installed within and prevent from any block-object to interfere the wireless signal to delivery as co-pending and patents disclosure.

The camera may be turned-on and turned-off by moving or motions sensor, a PIR sensor head, moving detector head(s), more than one moving sensor head(s), remote control, switch, motion detector, vibration detector, heat sensor, and/or smoke detector, so as to take photos, video, and audio and provide colorful, clear, and sharp digital data to be saved in storage means, shown on a screen, shown on a wireless screen, shown on a monitor(s), or transmitted to a communication device, computer device, Internet device, or auto dialing device.

The LED-units, camera, sensor(s), remote controller, moving LEDs device, moving, sensor, moving camera device, motion detection unit, heat detection unit, smoke detector unit, motor, auto tracking assembly, and so forth can be installed on a fixed housing, moving housing, or extendable housing, so as to provide a desired sensor range, distance, and angle with a variety of selection options for the camera's pixels, focus range, and/or pictures per second, for video/movie and sound/audio upon activation of the camera to shoot and store the digital data into the memory piece or cloud storage station, communication device, computer device, consumer electric device, screen, or monitor(s).

Finally, the light device including the Flash light as FIGS. 8A and 8B) has built-in Camera, memory kits, and optional wireless communication device may also take the form of variety of the light source light device selected from market available light devices such as a night light, desk lamp, floor lamp, down light, ceiling light, track light, security light, projection light, outdoor light, indoor light, LED light fixture, LED light bar, LED picture light, LED closet light, LED door light, LED garage light, LED motion sensor light, LED power failure light, LED motion sensor with auto tracking means, LED patio light, or any other LED light device available from the marketplace.

BRIEF DESCRIPTION OF THE DRAWINGS

FIG. 4AA show the details construction for the LED light device has built-in camera assembly and motion sensor or moving detector(s) with swivel or movable prong to change the sensor or detector or camera shooting angle so can cover the desired areas because some sensor or camera only has less than 180 degrees shooting or sensor angle.

FIG. 5AA show the $2^{nd}$ embodiment which has different front cover and light emit window than FIG. 4AA. FIG. 5AA show the side view for the LED light device has prong and how to make the movable prong so can change the sensor or camera shooting angle to desired areas.

FIGS. 6AA, 6AA-1, show how to change camera shooting angle or sensor detect angle to desired areas while the camera or sensor angle is not up to 180 degree and the FIG. 6AA can cover from center to right or left around 60-70 degree total around 120-140 degree so need to have built-in movable prong to make the camera and sensor to cover right side from wall to right side 120-140 degree to get desire right side detection. This is not only for LED light device with camera, It also good for LED light device only has motion sensor to turn on and turn off the LED light source only without the built-in camera so can make narrow shooting or sensor angle LED light device become very useful and practically. This is big improvement for any prong sensor or camera LED light.

FIGS. 9AA and 9AA-1 and 9AA-2 show the other construction for LED light shape and how to make 180 angles adjust on horizon FIGS. 1A, 1B, and 1C show a lamp holder according to a first preferred embodiment of the current invention has built-in DV or camera assembly, memory cards and optional wireless communication device(s).

FIGS. 3A, 3B, 3C, 3D, 3E, 4A, 4B, and 4C show a third embodiment and all the FIGS. 1A, 1B, 1C and FIGS. 2A, 2B, and below all discussion for different LED light device of the current invention in the form of an LED bulb.

FIGS. 5A, 5B, 5C, and 5D and 5E show another embodiment of the invention in the form of an light device has current invention's LED bulb.

FIGS. 6A, 6A1, 6B, 6C, 6D show a variety of different LED bulb designs which can have built-in camera-assembly and LED light sources to capture the colorful digital data under dark environment, and be powered by an AC or-and DC power source according to the current invention.

FIGS. 7A, 7B, 7C, and 7D show another embodiment of the current invention in the form of a light device having built-in digital data combination and powered by an AC power source.

FIGS. 8A and 8B and 8C show a foldable or retractable prong construction and details for Flash light or multiple functions LED light device which has built-in DV or camera unit, memory cards and optional wireless communication device(s) for security or military or army or police to use with different material and carry design so can easily hold, carry, attached on pocket, helmet, waist or weapons.

FIGS. 9A, 9B, 9C, 9D, 9E, 9F, 9G, which includes FIGS. 9G1, 9F2, 9G3, and 9g4, illustrate a size comparison for a traditional LED night light versus a plurality of current invention for Digital Video/Camera units which has all kind of light source for illumination powered by DC Power for light device has built-in camera kits, memory card, optional wireless transmitter to communicate system including wife, 3G/4G/incoming 5G/even for settle-lite network, Cloud data storage station with preferred APP or software from variety of platform so can make expected function(s) for camera or light device by wireless system.

FIGS. 12-A, 12-B, 12-C, 12-D, 12-E, show the individual separate camera-assembly or called motion or moving sensor-unit has built-in digital data device.

FIGS. 12A1, 12B1, 12C1, 12D1, 12E1, 12F, 12G, 12H, 12I, 12J, 12K, 12L, 12M, 12N, 12O,12P, 12Q, 12R, 12Ba, 12Ca, 12Ka, shown all the Motion and/or Radar and/or other movement detectors for all kind of LED light to turn-on the sufficient LED light source supplying enough brightness for camera or DV or hidden camera or DV to catch/take photos, video, stream image. And after logical-circuit or pre-set image comparison to confirm the real-objects-movement to deliver the image and/or audio data to cloud and people communication, computer products to give notice to phone, computer.

FIG. 13 show the multiple functions for current invention for any combination. The all features for each electric parts or accessories have details discuss on above but not limited for limited text inside this filing. It is appreciated that all the co-pending filing, patented parent, current invention all claim coverage or disclosure should be fall within the current claim coverage.

FIG. 14 shown the preferred the one of the PIR head with Digital not analog so can prevent from false triggers plus the software has optional image or screen comparison by motion detector(s) or moving detector(s) comparison features so can prevent any non-necessary electric signals transmitting to phone owner including (a) animals (b) passing cars (c) winds or planet (d) friend while has the screen or image comparison interface or software or pre-designed program(s).

FIG. 15 shown the one of APP screen with all selected areas, functions, controller with optional added screen or image comparison.

FIG. 16 shown the one of the user interface screen comparison or functions

FIG. 17 show the working details for current invention to incorporate with WIFI, Cloud, APP, 3/4/5G network, Lan to wireless inform phone or computer owner and use APP software on far away location to remote control the said LED light or camera-assembly or deliver video, audio digital with optional communication for talking or conversation or auto dial out to people, police.

FIGS. 19, 20,21,22, 23, 24, 25, 26, 27, 28, 29, 30,31, 32, 33, 34, 35,36 show preferred but not limited for sensor or sensor-assembly can detector over 360 degree and desired height so can offer the best sensor range and height for individual house or building for night time or all the time from inside house kits to cover outside areas(s). These embodiments also show sensor or sensor-assembly have pass through any material except the metal piece.

FIGS. 37, 38, 39, 39A, 39B, 39C, 39D,39E show the some of preferred circuit design for sensor or sensor assembly to offer the wider sensor range and height for people protect their home.

FIGS. 39F, 39G, 39H, 39I, 39J, 39K,39L, 39M show outdoor security light with the built-in radar sensor inside housing and can detect more than 270 degree with desired height to over people the best protection as some preferred exemplary shown on the FIGS. 19 to 36 for garden, backyard, walls, fence, building, house.

DETAILED DESCRIPTION OF THE PREFERRED EMBODIMENTS

Figure 1A:
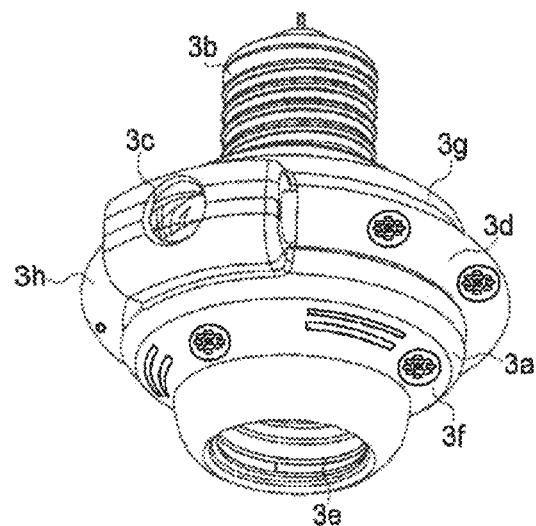
FIGS. 1AA, 2AA, 3AA, 3AA-1, 3AA-2 show the LED light device has built-in camera-assembly has angle adjustable to can make the narrow shooting angle camera or sensor to aim to desired areas while the LED light device has prong to get power source.

The current invention is division filing of co-inventor parent filed case (#KKK-2011) and has big improvement to get rid-off the out-of-date memory-unit including SD card or micro-SD card for high-end model and incorporated with update system or software or controller, selector, adjustment functions as below:

(D-1) 3G/4G or incoming 5G net-work to incorporate the update LED light device. or-and (D-2) APP and pre-programmed or even AI software to selection, adjustment, recognition, analysis, tracking, built-habit, comparison, select-area, handle financial, handle crime, handle monitor, send out wireless signal basing on pre-program software, or-and remote control the video, photos, audio kits (D-3) camera-assembly including at least one or more of Wi-Fi or-and Wi-Fi-extender to make perfect wireless transmitting from completely LED light device or separated housing of camera-system which without light-source but has all other parts including but not limited for all kind of camera, APP software, Wi-Fi, Wi-Fi-extend, wireless communication to cloud storage station, incorporate with pre-programed or AI software to detect or monitor desired moving object(s) face, personal, merchandise, products to handle following-work including object recognition, comparison, transmitting from cloud storage station and make further analysis to get desired pre-program crime or personal or merchandise or price or account or payment or financial process to get all kind of digital data for application including personal habit, or-and object, or-and time, or-and place of people life.

(D-4) cloud incorporate with preferred software including AI software for safety, security, terrorist, home land security, business, face recognition, merchandise purchase, behavior summary, habit summary or other economical or crime analysis or-and application for enterprise, bank, home land security, police, military application.

(D-5) cloud station with pre-program software to get desired digital data and analysis.

(D-6) The LED light source supply sufficient brightness under dark environment to offer the full color or-and full HD 1080 or desired pixel(s) image or phone or video to incorporated with mass computer system which connected with cloud big storage station and software to make desired personal or-and merchandise or products and financial account operation.

(D-7) The LED light has built-in or separated housing camera-assembly which has all digital data handle parts or accessories or the said all digital data handle parts or accessories is install into (a) LED light device housing, or (b) individual housing separated with said light source (LED or all other type) so can assembly with light-source housing or light-source base to upgrade the non-camera device to light device has camera device.

(D-8) The said all kind of camera and all related digital data handle parts or accessories is the said camera-assembly to apply for all kind of LED lighting which can get colorful digital data under dark environment.

(D-9) The said camera-assembly combined the said LED light source or lighting has camera with all digital data handle-assembly so can combined into one single piece or one single products including LED security light, LED doorbell light, LED flashlight, LED car torch light, LED door entrance light, LED motion sensor light, LED bulb, LED lamp holder as current and all prior-art with day-by-day update new technical for current inventor filed family (D-10) The current and all parent filed case for colorful digital data for dark environment with update new technical added on all child filed case(s) can prevent the people to install (h-1) LED light device and (h-2) camera and all related digital data assembly for 2 times which need too complicated to install (h-1) and (h-2) for house, office, building. Especially for the update no-counter or no-employee stores which to install the (h-1) and (h-2) for 2 electric system and 2 times installation and pay for 2 times engineer design fee especially the current invention for LED bulb has extension or-and retractable or-and adjustable angle bar or pole or tube or cylinder to install the sensor(s)/detector(s)/camera(s) is perfectly just need to connect the LED bulb male-base into bulb-female-socket . . . . Then, One time housing or office electric-arrangement can have both (h-1) and (h-2) installation and get light. For this application the motion sensor for turn-on LED light source is not necessary because no-employee stores always turn-on the LED light so only need moving-detector(s) has the screen or image-comparison so can trace the different persons within the non-employee stores for all behavior or movement and purchase(s).

(D-11) The current invention also has simple take the full color photos or-and video as some of parent filing which has (1) all kind of camera or digital video (DV) to take full color photos or video and audio and go through the MCU or CPU or IC and circuit to connect with wireless communication system, or-and (2) Wi-Fi or-and Wi-Fi-extend and preferred software to wireless communication with 3G/4G/incoming 5G net-work, or-and (3) wireless connect with cloud big storage station which may connect with complicated computer system has pre-program or AI software to make further analysis, comparison, financial procedure, crime comparison including but not limited for face, personal character comparison, crime comparison, behavior comparison, financial account procedure . . . etc. or-and (4) connect with APP and apply the preferred software or interface which has capability to handle or operate the selection, adjustment, comparison, transmitting, dial out, multiple-way communication for audio functions, or-and (5) other computer interface to make analysis, companson, arrangement, call out, transmission the camera-device took image, photos, video to big computer or servers to make further following pre-programed work.

The above (D-1) to (D-11) all belong to big improvement for current invention to up-grade the co-inventor's parent filed for basic LED light device has built-in or separated housing camera-assembly for high-end application basing on update technical which is not happened for earlier date because earlier date lack of all update new technical available for every people including:

(Early date 1) without widely or too many choices for App and good software available to easily download, also (Early date 2) earlier date lack the enough wireless communication for highspeed to delivery MP4 or 4K digital data until market has high-speed 4G network ground-station been set completed.

(Early date 3) The earlier date before 2014 without consumer can connect with maturity of Cloud storage-station and market has not finished all server(s) finished installation.

(Early date 4) Till today face recognition not install on LED light device for residence or stores to get colorful image or photos and connect with people the communication device is not existing yet, or (Early date 5) the touch panel for people communication device such as i-phone can enlarge screen not existing before 2011 November for current inventor 1st filed case to let people to select screen areas to detect moving objects.

(Earlier date 6) before 2011 November, market without these ground-station net-work 4G/5G wide set that is no way to transmitting wireless full color HD 1080 digital data and MP4 and 4K without electric signal delay, signals without the time delay because 2G or 3G transmitting speed too slow for big size digital data delivery by wireless equipment.

(Early date 7) Before 2011 November, market without the cloud station to storage such big colorful video or-and audio, it is impossible to allow wireless transmitting digital data to delivery and storage or even analysis or apply for other comparison-software.

(Early date 8) Before 2011 November, market without the phone touch panel to enlarge the screen or image without select-areas for detected or lock persons or merchandise by wireless. Without the APP software to connect with LED light digital data parts or accessories with quickly time that is no way can remote control or setting all auto-dial out or multiple-way communication.

Those update functions none is happen earlier than the 2013 but the current invention parent filed case is from 2011 November 14 and has all continuously or division filed case to add the update all new technical inside continuous-in-parts or Division filed case as above listed co-inventor from (KKK-10) (KKK-9) (KKK-3-1) (KKK-8) (KKK-7) (KKK-6) (KKK-5) (KKK-4) (KKK-3) (KKK-2) (KKK-I) (KKK-2011) total 12 parent filed cases.

From above discussed the current invention has all update new technical added on top of the all 12 parent filed case, so this current invention has big improvement for all parent discussed for LED light device including (1) LED bulb (2) LED flashlight (3) LED car torch light (4) LED motion security light (5) LED garden light (6) LED patio light or other (7) LED house or building or residence light (8) LED doorbell light. But, current invention is not including the LED Street light or Monitor device for street.

From FIG. 1AA show the LED light has adjustable-angle sensor which can make from back of the LED light (01) to make the prong as sealed-unit by top and lower housing (09) to assembly together so make the prongs (07) to solid installed the movable sealed unit (09) and make the front sensor (not shown) to cover the total 180 degree on horizon range which is vertical of the wall-outlet surface.

Figure 2A:
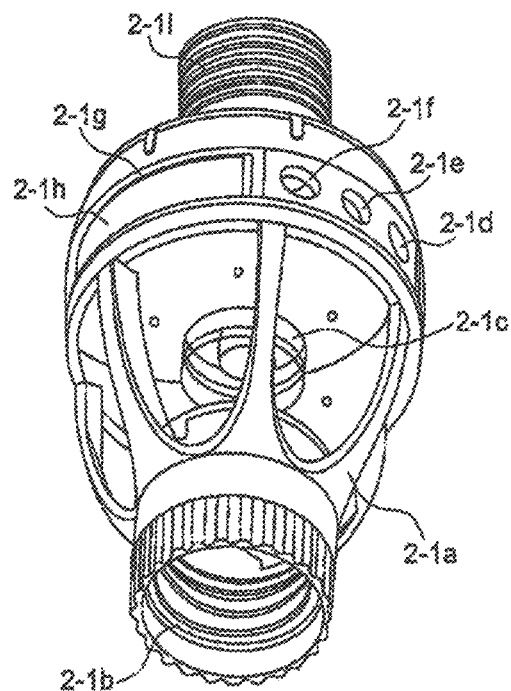
FIGS. 2A and 2B show a lamp holder of a second preferred embodiment has built-in DV or camera assembly, memory cards and optional wireless communication device(s).

From FIG. 2AA show the prong (016) can adjust from face I o'clock to the 5 o'clock position so can make limited detected-angle sensor can cover whole 180 degree on horizon range and at the same time LED light-beam or built-in camera or other sensors including Motion sensor, or Moving detected sensor, or (1) Light sensor, or
(2) Vibration sensor, or
(3) Heat or temperature sensor, or
(4) Gas sensor, or
(5) CO I sensor, or
(6) Smoke sensor.

Can face the desired area and overcome some block-means for sensors so this is big improvement for any sensor LED light which none of US prior arts has this kind of consideration and the current invention also can get most safety protection for life and properties. For example, this sensor adjustable LED light to face the stove of kitchen area with camera or video to take image especially during the dark-environment the LED light-beam supply the sufficient brightness to camera can use not expensive model to take full color even full HD and transmit to people to view the kitchen stove condition. That help aged or old people to relax while they out of home.

The current invention not only offer the kitchen LED light has camera incorporate with wireless communication with Wi-Fi or router or router-extend with or without storage-device or cloud-storage-station, or APP software has pre-programed ad remote controller system. It also can use for regular sensor LED light for night time use. Some house outlets is on the corner of rest room, or outlets is on center or corner of house where people is not able to walk those location so it will not able to detect the motion or moving of people, so those areas to install the sensor LED light is not useful. However, some illumination required for rest room, stair, corner but the sensor is not able to aim to the people walking-areas that is a big problem. So the current invention design the sensor adjustable on horizon-area so can make narrow detected-angle sensor can face to people moving range and make the light turn on for illumination during the dark environment, so the current invention cover for all sensor LED light has the horizon angle-adjustment. Not only for only built-in camera and can transmit the digital-data LED light only.

From FIG. 3AA, 3AA-1, 3AA-2 show the preferred sensor LED light (017) has front cover with built-in sensor on front and LED light-beam emit same direction with the sensor detect-range. The prong (022) sealed inside of sealed-housing (022) with the pole (022') so sealed-housing can make rotating to right or left which is on horizon range for LED light and rotating angle from left FIG. 03A to right FIG. 03B to let sensor detect-range cover full O to 180 degree.

From FIG. 4AA the LED night light for more than one directions for illumination including top, front, bottom with or without at least one of RF, Z-way, ZigBee, wifi or other wireless controller to make the LED light for pre-determined function by remote or wireless controller. The said LED light have angle, brightness, color setting, adjustment or functions-selection from no-light to light or low-light to hi-light brightness for each motion or radar detected moving of object. The said moving object detected by motion sensor (PIR) or/and radar sensor which has 360 degree detect area without affected by the environment factors such as high-temperature, moisture, humility, UV or other environment factors.

From FIG. 4AA show the sensor LED light has front cover (024) has plurality of opening (025) to allow the inner LED light-beam emit out from the openings (025), and has one cutout (026) to install the sensor (032) and its Fresnel lens (027) so can have desired detect-angle to sensor people moving or movement or temperatures changes to trigger the inner circuit (033) to operate desired one or more than one functions not only for LED light-beam for illumination but also to operate optional at least one or more than one functions selected from;

(a) Camera or-and video camera to take image up to MP4 or other desired digital-data, or-and (b) Image or-and audio or-and desired digital-data storage device or cloud-station, or-and (c) Wireless transmitting and receiving device, or-and (d) Sound related device including speaker or microphone for multiple way communication, or-and (e) Wi-Fi, router, or router-extend, Z-way, internet, 4G/5G network, (f) APP software with pre-program desired functions or-and remote controller and receiver device; to make the desired combination functions.

From FIG. 4AA also show the sensor adjustable sealed-housing (038) (038*a*) which has prong (39) fit within and connect with wire (039') to install on the arc-space (037) with a axis install on sealed-housing openings (038*c*) so the sealed-housing (038) (038*a*) can rotate along the art-space (037) to move the LED light sensor detect-range can cover whole 180 degree or more depend on market required.

The LED light has desired number of LED light source to make some lighting effects including (1) high-low or more level brightness incorporated IC design. Or-and (2) has sensor selection switch or control system with or without sensor or select sensor or select group of sensor to operate desired functions, or-and (3) make design LED light beam for design light show or light effects which including;
(a) Brightness, or-and
(b) Colors, or-and
(c) Time, duty-cycle, duration, or turn-on and turn-off, or-and
(d) Mix colors, or-and
(e) Freeze color, or-and
(f) Auto changing colors, or-and
(g) Fade-in and fade-out, or-and
(h) Market available LED light show or functions or performance.
and selected one or more than one of sensor works as pre-determined circuit or-and IC design.

From FIG. 4AA the said LEDs (032a) install on proper space to make illumination through the front cover opening (025) or top lens (035) or lower-lens (034) which may have texture or optics-design on the lens so can make illumination to front or-and low or-and high portion of the LED light so can make very good illumination. This kind of sensor LED light can put on low-profile outlet or new outlets for the 3-6 feet high wall outlet which for the new house TV power source so can supply excellent illumination for top or-and low or-and front illumination this also is other features for current invention.

It is appreciated that the FIG. 4AA only show one of preferred embodiment and construction but the limited drawing and text is not limited for any same function, equal effects, replaceable skill, alternative arrangement as long as the sensor LED light with or without other functions should still fall within the current scope and claim coverage.

From FIG. 5AA show other preferred embodiment which has a lot of louver or other geometric design such as peacock opening and has LED and sphere sealed-prong-unit which can rotating within the LED light arc or ball or sphere space to make the sensor or-and LED light-beam or-and camera to aim to the desired orientation or areas. or range to detect people moving or movement or temperatures depend on what kind of the sensor as above discussed to apply to the said LED light.

The FIG. 5AA the LED motion sensor or radar sensor LED light has unique features which have not only the front surface have sufficient light-beam emit out but also have the top and bottom window to emit LED light-beam so can offer the top wall and lower floor with LED light beam while LED motion/radar sensor light is install on low-profile wall outlets. While the motion/radar LED night light install on upper or 4-5 feet high wall outlet, it become a wall-mounted LED light to offer front illumination and also the top and lower wall surface with desire-art LED light beam depend on what is the art-design on the window or lens including texture, printing, marking, variable thickness, or other treatment so make wall illumination with arts or design or patterns.

Also, from FIG. 5AA show the sealed-prong-unit can rotating or change angle from center (Arrow head) to right or left for desire angle so can let the said motion sensor LED night light for people to install on any outlet and can face the motion sensor to desire angle to offer illumination. This unique angle adjustable sealed-prong-unit can improve some outlets located on corner where is bad location to install the motion sensor light because no one will approach the corner locations so outlet is waste and corner location areas always is dark. The current invention overcome this problem. It is appreciated this is one of our unique features should fall within the current invention claim scope and deserve for file this for individual patent right.

Figure 7A:
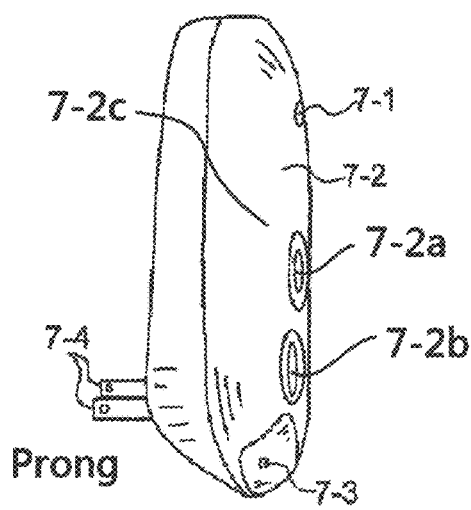
FIGS. 7AA and 7AA-1 and 7AA-2 show the other construction to how to make angle-adjustment for horizon level to make the LED light sensor can cover total 180 degree horizon range.
Figure 8A:
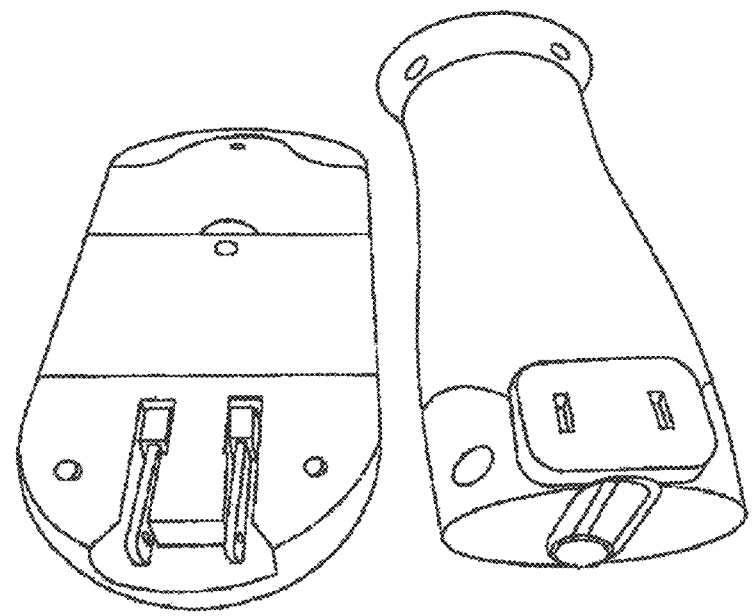
FIGS. 8AA and 8AA-1 and 8AA-2 show the other construction for LED light shape and how to make 180 angle adjustment on horizon.

From FIGS. 6AA and 6AA-1 or FIGS. 7AA, 7AA-1, 7AA-2 or FIGS. 8AA, 8AA-1, 8AA-2 or FIGS. 9AA, 9AA-1, 9AA-2 show the different construction of the LED light unit or-and sealed-housing or-and arc/ball/sphere space to explain some of embodiment to make the sensor or-and LED light-beam or-and camera or-and other sensors can be moved. It is appreciated the other skill to make same result to make the sensor or-and LED light-beam or-and camera or-and other parts to adjust angle to cover the horizon-level bigger range and not fixed on one angle should belong to replaceable, alternative, equal functions skill and should still fall within the current invention concept, idea, spirit, construction and protect by current invention claims.

From the above discussion the current invention mainly has one special application for LED light as below 9 features including;

1. LED light has adjustable horizon-angle sensor, consist of; At least one LED light has (1) prong to plug-into outlet to get AC power go through the built-in AC-to-DC circuit or (2) outside AC-to-DC transformer to get DC power supply to LED and other DC operated parts for desired light functions.
At least one angle adjust-assembly to adjust the less than 180 detected-angle sensor to let the sensor can adjust and cover total 0-to-180 degree of the horizon direction where is vertical to the outlet located surface.

2. LED light has adjustable horizon-angle sensor, the said LED light sensor is at least one or desired combination of
(1) Motion sensor, or
(2) Moving detected sensor, or
(3) Light sensor, or
(4) Vibration sensor, or
(5) Heat or temperature sensor, or
(6) Gas sensor, or
(7) CO1 sensor, or Smoke sensor.

3. LED light has adjustable horizon-angle sensor, the said LED light has number of LEDs to offer desired brightness after the current go through the built-in circuit or-and controller to make the light brightness for desired combination for different
(a) Brightness, or-and
(b) Colors, or-and
(c) Time, duty-cycle, duration, or turn-on and turn-off, or-and
(d) Mix colors, or-and
(e) Freeze color, or-and
(f) Auto changing colors, or-and
(g) Fade-in and fade-out, or-and
(h) Market available LED light show or functions or performance.

4. LED light has adjustable horizon-angle sensor, the said LED light not only offer the illumination but also incorporate with at least one of the other function select from
(a) Camera or-and video camera to take image up to MP4 or other desired digital-data, or-and
(b) Image or-and audio or-and desired digital-data storage device or cloud-station, or-and
(c) Wireless transmitting and receiving device, or-and
(d) Sound related device including speaker or microphone for multiple way communication, or-and
(e) Wi-Fi, router, or router-extend, Z-way, internet, 4G/5G network,
(f) APP software with pre-program desired functions or-and remote controller and receiver device; to make the desired combination functions.

5. LED light has adjusted horizon-angle sensor, the said LED light has adjustable angle to let light-beam and sensor to aim or face same direction or desired area. LED light has adjustable horizon-angle sensor, the said LED light is plug-into kitchen area outlet and emit the sufficient light-brightness to let built-in camera or video camera can see colorful image or-and sound or-and digital-data to allow people can see clear color image of kitchen-area under dark-environment.

6. LED light has adjustable horizon-angle sensor, the said LED light has angle adjustment so can cover desired angle or areas while the sensor detected range is less than 180 degree of in horizon where is vertical to the outlet located surface.

7. LED light has adjustable horizon-angle sensor, the said LED light has more than one piece or more than one type to get preferred functions and has sensor-selection switch-system to select desired combinations from
(1) Motion sensor, or
(2) Moving detected sensor, or
(3) Light sensor, or
(4) Vibration sensor, or
(5) Heat or temperature sensor, or
(6) Gas sensor, or
(7) CO1 sensor, or
(8) Smoke sensor.
To get most safety protection for life and properties.

8. Plug-in LED light has prong and horizon angle-adjustment sensor(s), consist of; At least one LED light has prong to plug-into outlet to get AC power go through the built-in AC-to-DC circuit to get DC power supply to LED and other DC operated parts for desired light functions.

At least one angle adjust-assembly to adjust the less than 180 detected-angle sensor to let the sensor can adjust and cover total 0-to-180 degree of the horizon direction where is vertical to the outlet located surface.

Figure 7B:
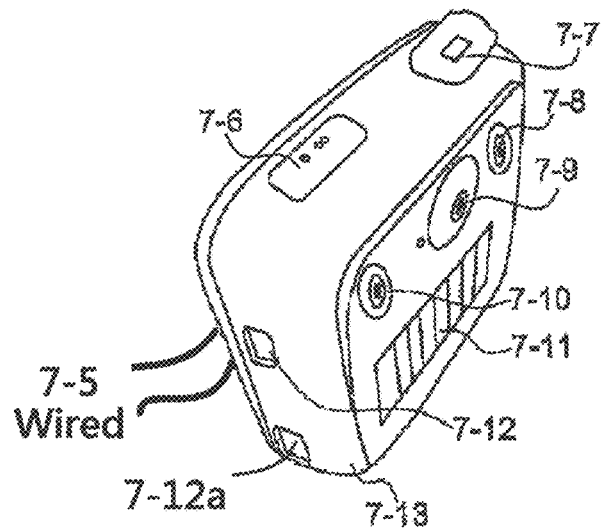
Figure 7C:
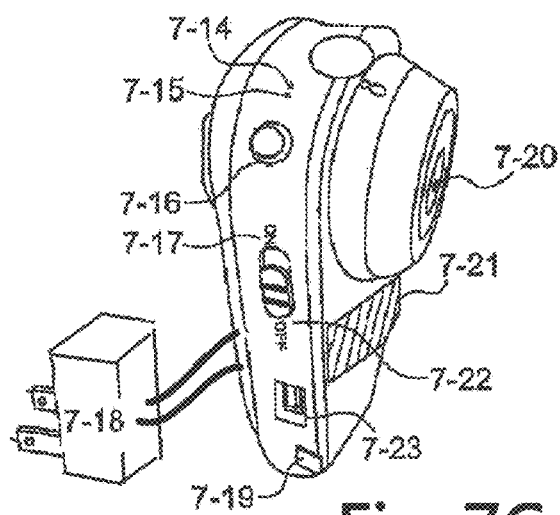
Figure 7D:
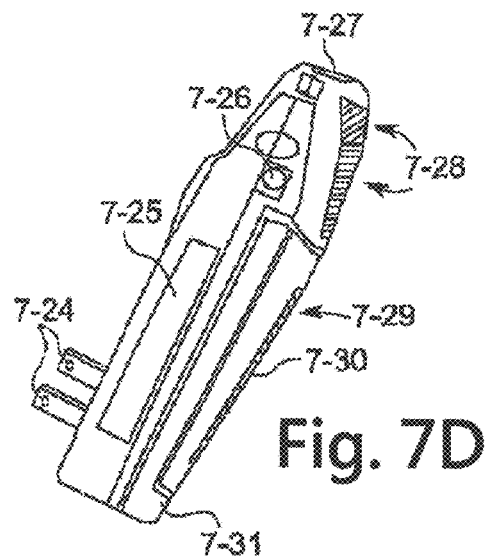
Figure 8B:
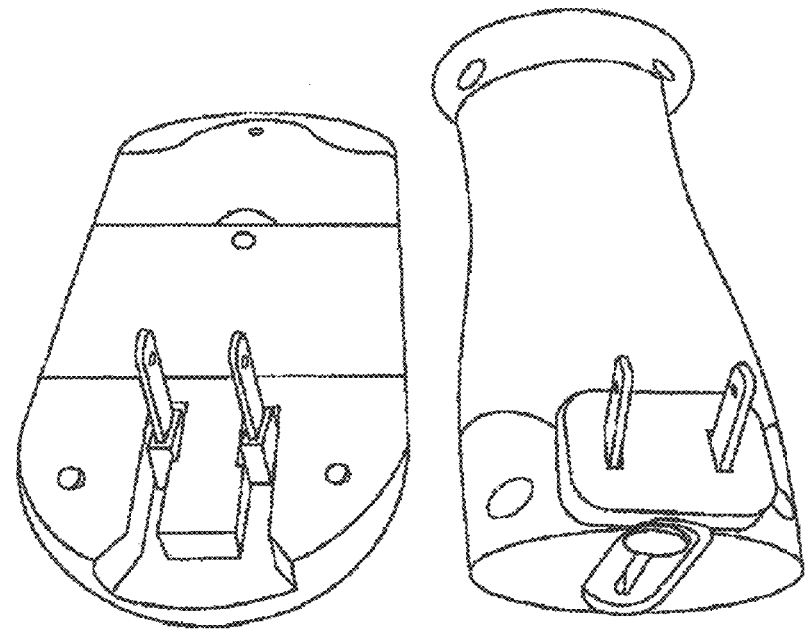
Figure 8C:
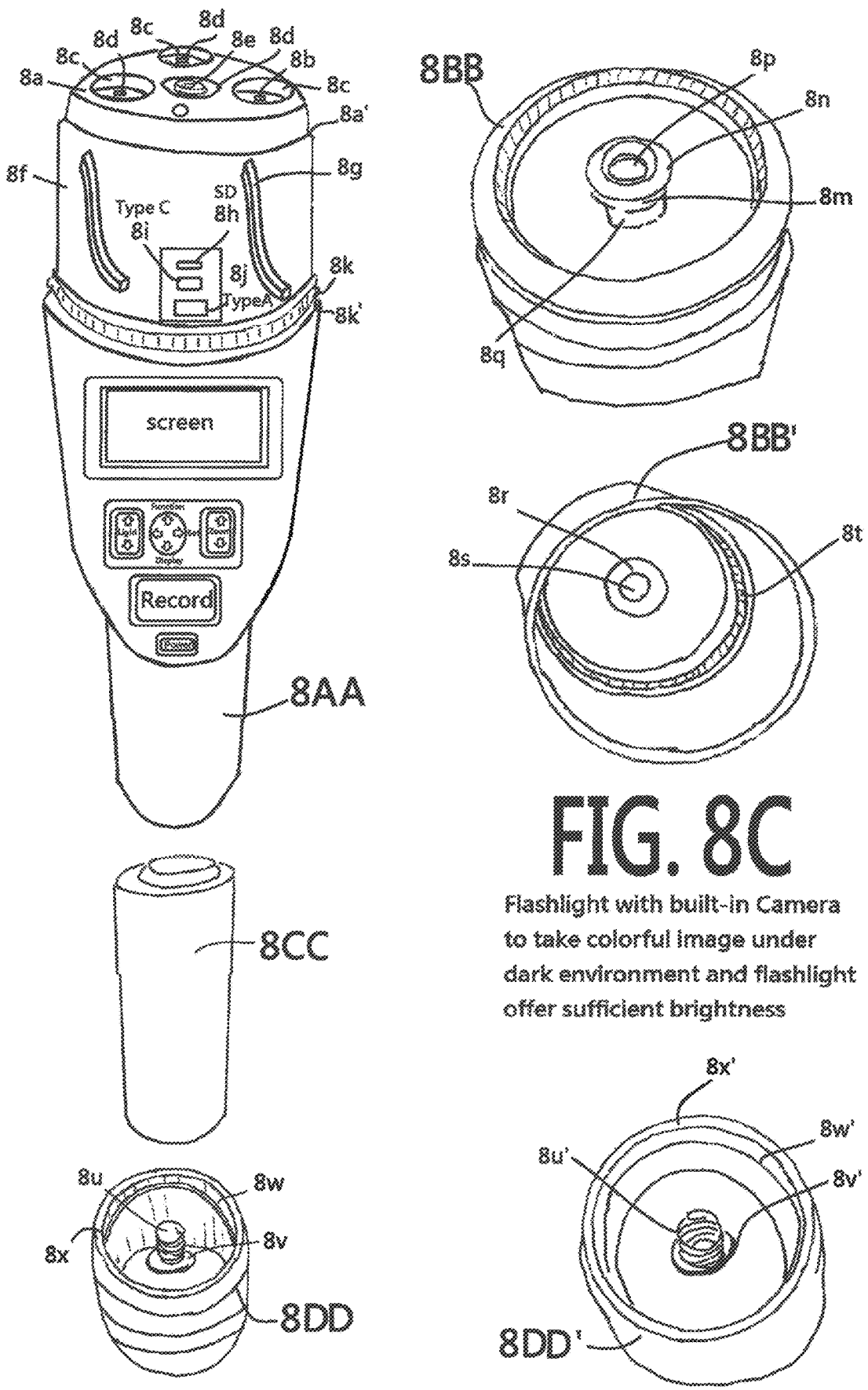

The invention is a device having digital data that is powered by an AC house electricity power source or DC Big capacity electricity storage unit power source and built-into a
(A) lamp holder as FIG. 1A, 1B, 1C, 2A, 2B,
(B) LED bulb as FIG. 3A, 3B, 3C, 3D, 3E, and FIG. 4A, 4B, 4C and FIG. 6A, 6B, 6C, 6D, or
(C) light device as FIG. 5A, 5B, 5C, 5D, and FIG. 7A, 7B, 7C, 7D, or
(D) All kind of other LED light device as FIG. 9A, 9B, 9C, 9D, 9E, 9F and FIG. 10A, 10B, 11A, 11B, or
(E) Flash light as FIGS. 8A, 8B and FIG. 8C, and
(F) other LED light device including but not limited including garden light, entrance door light, floor light, patio light, garage door light, pavement light, doorbell light which each one has LED light beam to offer sufficient light brightness to allow camera or DV to take colorful image, photo, or-and audio for following work(s). The following description was included as notes in the original drawings, and are now included herein:

In a preferred embodiment, as illustrated in FIGS. 1A-1C and 2A-2B, the device is in the form of an insert forming a lamp holder with a socket having desired lamp socket specifications, said insert being arranged to be inserted into an existing light fixture. Preferably, the light device may have multiple function in addition to a lighting function including portable or hand-carry flashlight or others, and may include a compartment for extendable, retractable, foldable, or transformable installing accessories that provide more than one function. The light device's digital data means include sensor means having more than one sensor head and an integrated circuit for controlling an auto tracking assembly that enables the camera to track moving objects or persons, and/or may include multiple cameras for capturing images of different locations. The light device's unlimited AC power source may be an electrical utility power supply system for supplying electricity to homes, residences, and businesses. The invention for Light device also provides a webcam having an auto tracking means and power supply connected to an unlimited power source to a USB interface, the webcam including at least one camera head having means for capturing images, data, or sound at a desired shooting angle, resolution, color, brightness, and sharpness, a motor, and sensor means for causing the move the camera head to follow a moving object or person, and means for storing or transmitting data captured by the camera head to one of a display, computer, communication device, phone, Internet, website, e-mail, or auto dialing system.

The webcam may include a USB adaptor for connection to a computer or communication equipment with a USB port, with the webcam being activated when connected with the power source to carry out predetermined image capture functions and to capture digital data under predetermined environmental conditions. The Light device's webcam may include suction cups for mounting the webcam to a computer screen or housing, and multiple camera heads for simultaneously viewing multiple areas, as well as a lighting device or devices having additional functions. The light device's webcam preferably further includes prong means for directly plugging the webcam into an electrical outlet, and weight supporting means for supporting the webcam on the outlet, said weight supporting means including at least one of the following: at least one suction cup, glue, double-sided tape, a hook and loop fastener, an adhesive, a chemical compound, a connector, an adaptor, and a fitting means, and may be arranged to operate at night or in low light.

Figure 1B:
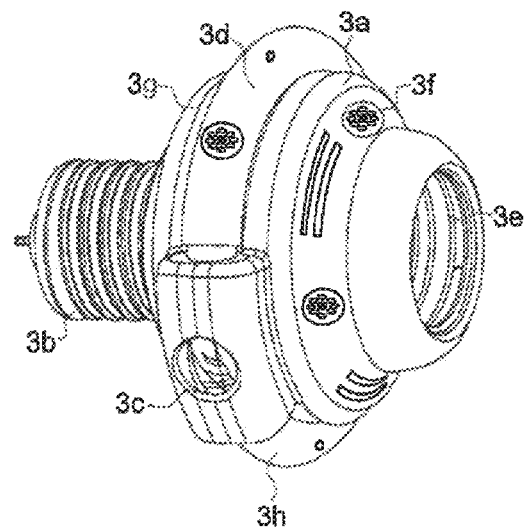
Figure 1C:
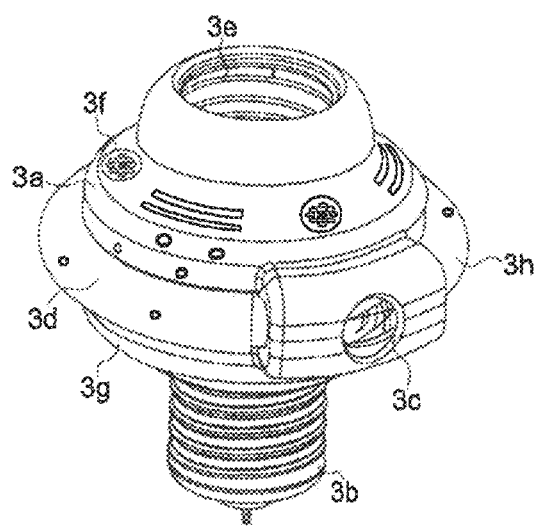

From FIGS. 1A-1C show a device in the form of a lamp holder or lamp adaptor or light fixture insert (3$d$) with a screw-in base (3$b$) and a built-in camera head (3±) that can be screwed into an existing light fixture female lamp socket or bulb holder to add digital camera functions, with power being supplied through an elastic terminal or traditional bulb-terminal at the top of the light fixture insert when the insert is screwed into the existing light fixture which power source can be AC or DC power source. The insert includes a female receiving socket (3$e$) into which a market available all kind of bulb male base may be screwed to receive power from an unlimited AC house electricity power source or DC big capacity energy unit through the built-in insert male base (3$b$).

A sensor (3$c$) may a photo sensor or-and motion-sensor or moving-detector or other sensor or A pair of moving sensor like (3$g$) (3$g'$) which is moving detector and has optional added screen or image comparison features or function device and IC are provided to sensor the moving of objects or alive animal or people and control to turn on and turn off the said Light device (not shown) or-and the camera at same time or different time. By replacing a conventional bulb in the existing light fixture with the illustrated lamp holder or lamp adaptor or insert (3$d$), a security camera can easily be installed without the need for expert installation. When the bulb is then screwed into the socket, the resulting installation will look like an ordinary light fixture and therefore bad guys will not notice the camera (preferred is hidden or pin-hole size camera for tiny unit). The camera can include night vision or infrared capabilities, and tracking features, and the insert may be waterproof to protect the camera and electronics while use for outdoor application. The bulb may be an incandescent bulb, or another type of bulb such as an LED bulb or CFL or any other light source bulb. The adaptor or lamp holder of insert (3*d*) may be screw type, or pin type or bayout type of any other type available from market place not limited for only screw-in and screw-out type. The insert (3*d*) my has other added device which shown on the drawing without marking for any preferred device can increase the said insert (3*d*) function including but not limited such as microphone, speaker, antenna adaptor, SD card slot, Memory card slot, Wi-Fi receiver or transmitter, . . . etc.

Figure 2B:
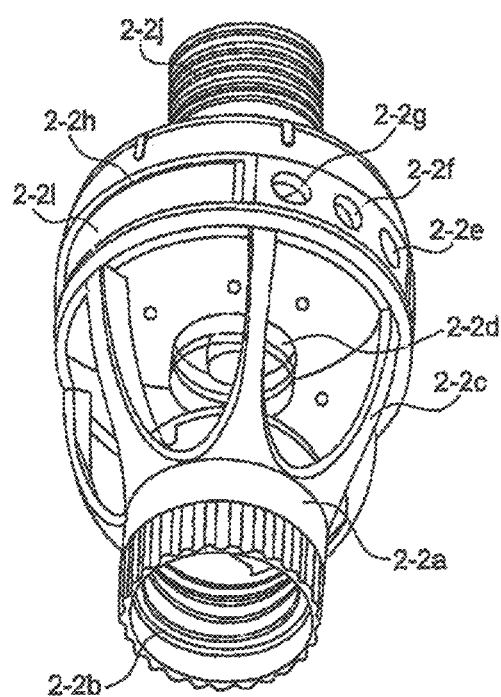

FIGS. 2A and 2B show an arrangement similar to that of FIGS. 1A-1C. In the arrangements of FIGS. 2A and 2B, like that of FIGS. 1A-1C, the camera preferably faces downward from a ceiling installation, and the motion sensor (2-1*h*) or moving sensor detector sets (2-1*f*) (211*e*) or any combination sensor-assembly may including other type sensor or photo sensor (2-1*g*) which may put inside or under (2-1*h*) motion sensor's Fresnel lens. The sensors or sensor assembly causes the camera (2-1*c*) or desired number of Led light source (small dots) to start recording or turn on the LED light at the same time in response to detection of motion or moving objects in the field of view under pre-design condition and programs.

The alternative or more features for the sensor or-and camera or-and LED light source or-and signal receiving or transmitter unit or-and IR remote controller receiving unit can install or built-in on extendable housing, body FIG. 3A which may be in many layer FIG. 3B and each of layer can be rotate to adjust the orientation or direction of the said LED light device, lamp holder, LED bulb similar as shown in FIGS. 3A-3C and 4A-4C.

The sensors and/or camera or-and above discuss electric parts & accessories can be extended or retracted and rotated to avoid interference by lamp shades, lamp covers, lamp walls, or other blocking items that otherwise might block a field of view of the camera or sensor while the current invention to apply for LED bulb like FIGS. 3A-3C and 4A-4C drawing shown.

The device may have multiple rings, each of which is separately rotatable to enable separate rotation of the sensor(s) and difference camera heads or-and LED(s), as shown in FIGS. 3A-3C and 4A-4C.

FIG. 3E show LED bulb for security light or entrance light assembled into the traditional Incandescent bulb base which have female bulb-socket (12) to receive bulb mal base electrode to deliver the AC power source to insert male-bulb base. The said LED bulb in-put AC current and go through built-in AC-to-DC circuit and related IC or/and circuit and motion or moving or radar and photos sensor or sensor assembly to turn on the LED bulb as pre-determined functions, color(s), brightness(s) with all kind of manual or WIFI or wireless switch(s), sensor(s), transmitting for remote control.

As shown in the LED bulb inside the light device FIG. 3D and FIGS. 5A-5D, the extension may enable the position, orientation, or angle of the sensor or camera head or LED(s) to be varied, or enable the sensor to be extended while the lamp holder or LED bulb or LED light device or lighting feature is within a shade, (for entrance door LED light, the LED bulb or sensor or camera may within the glass material housing) the device may further include external light elements such as lighting elements (31) and (36), as well as additional sensors such as sensor located inside the extendable tube.

As shown in FIGS. 6A-6D, a variety of LED bulbs may be inserted into the light related device which has traditional base, extendable base as FIGS. 6A, 6C the base can extendable or retractable or bendable or flexible or rotating to desired direction to overcome the recess light depth that may interfere the electric signal transmitting or receiving (Same as co-pending parent (#MMM-2) filing and patented parents or FIGS. 3A, 3B, 3 C, 3D show front extendable parts, 3C, 3D, 3E, 4A, 4B, 4C show the rotating and front extendable). All these different type LED bulb has built-in camera-system or DIY-system can take minimum MP4 format image or update 4K (60 image per second) including photos or video for digital data through the MCU or CPU or IC and circuit so can quickly saving or transmit out to memory card or cloud storage station to get on-line stream digital data while these digital data saved into memory card or wireless transmitted by Wi-Fi though 3G/4G/5G network or even through settle-lite channel with or without APP or other software to get more control functions by good program software so can do a lot of desired work including (1) adjust or setting the camera/the light source for angle/orientation/shooting properties adjustment, or-and (2) adjust lighting brightness/light turn on time/light color/light duration, or-and (3) adjustment, microphone/speaker communication relative properties or functions including volume, ring bell type and sound and duration, or-and (4) send out phone/text/photos/video by Wi-Fi, skype, email, twitter, what's App, WeChat, Instagram or other platform software, or-and (5) call for police department/911 or relative bureau/fire department/ambulance/hospital/security company, or-and (6) setting the sensitivity of the motion sensor or moving detector(s) or short or flood or fire or photo sensors, or-and From FIGS. 3A, 3B, 3C, 3D, 3E 4A, 4B, and 4C show a third embodiment and all the FIGS. 1A, 1B, 1C and FIGS. 2A, 2B, and below all discussion for different LED light device of the current invention is the form of an LED bulb. The said has built-in DV or camera assembly has minimum take MP4 or higher-grade image or data, memory cards or incorporate with wifi to wireless delivery camera or DV captured colorful image or-and audio digital data go through 3/4/5G or-and internet to cloud data storage station. The cloud storage digital data inform the said owner of phone or computer who had download APP from internet and incorporate APP software to make LED light or-and camera related parts for setting, or selected-areas to do following work which including selected-area, detection, comparison, tracing, record, facial recognition, trace moving people or merchandise or objects, calculation for items been pickup and amount for value, delivery and calculation for pay-pale or bank account for purchase behavior, or other behavior or movement for moving people, merchandise, object for desired or pre-program software in APP or Cloud to do all said following work. The optional wireless communication device(s) selected from Wi-Fi, 3G/4G/5G network or even settle-lite channel to display or phone or computer or screens or monitors. From FIG. 4B show the LED bulb has bendable or tilt LED bulb head which has motion/moving detector(s) and LED light source and camera-head(s) on top rotatable or tilt part, the rest circuit inside the lower male lamp-base housing so the major heat-created circuits is away from the top rotating or tilt head.

From FIGS. 3A, 3B, 3C, 3D, 3E, 4A, 4B, and 4C the preferred embodiment, the current invention LED bulb preferred the LED light source is surrounding the center camera-lens or camera-unit which can be plurality LED dice or LED chip or LED dip type or the update COB (LED chip on Board) to offer sufficient brightness for camera to capture colorful or Full HD 1080 or 4K or 8K clear image. Or, the camera head or-and motion/moving detector is install the extendable, movable, retractable, bendable, rotatable LED bulb housing parts, pole, tube, which can away from the LED bulb's heat-create parts so no need use any heat-spreader inside the LED bulb which is one of the feature for current invention for LED bulb application.

From FIG. 3A show the LED bulb as current and parent filed case (#JJJ family) that the LED bulb has extend-parts on front or rear parts, It also can bendable to desired angle. The said LED bulb also has rotating-parts to make the fixed or extendable or bendable body, parts, tube, pole with camera-head or motion/moving detectors can aim to areas because market place still do not have camera can cover 360 degree shot angle. However, the camera-lens can apply the Fish-eye type which can make 3D environment camera shooting angle but this kind of Fish-Eye lens of camera-system have to have other added software to make the curved or deviation image to back to normal. So the camera-system incorporated with Fish-Eye Lens(es) to capture 3D image also fall within the current invention for all said LED light device including LED bulb, LED security light, LED Flashlight, LED torch light for people or transportation equipment including car, boat, ship, air-craft with Camera-assembly and can wireless delivery colorful image or-and audio to personal phone or computer which has download APP and related software for following work discussed as above. From FIG. 3A show the extendable/retractable unit can be front or rear piece for all kind of LED light not limited for only LEB Bulb because it is simple construction so can add into all kind of LED light device. Also, from the FIG. 4B show the tilt able LED bulb which has built-in extend/retract units on top or front part of the LED bulb and which can have illumination output-area which can bendable along the joint-piece so can adjust the illumination, camera, receiver, sensor angles.

FIGS. 3D and 3E show a fourth preferred embodiment of the current invention, also in the form of an LED bulb which install on ceiling has extendable or rotating or bendable parts of the said LED bulb has built-in camera to get better wireless communications prevent from all block-objects including wall thickness or recess tube-parts to interfere the signal delivery has built-in DV or camera assembly, memory cards and optional wireless communication device(s) at least has above features of each part.

From FIG. 3D extendable or tilt or bendable parts can be in front of LED bulb or in rear parts of said LED bulb so can get camera-head(s) or motion/moving detector(s) to aim to certain angle while camera or-and sensor cover range is not up to 360 degree. While incorporated with 3D or Fish-Eye camera-head(s) it need to incorporated the software to change twisted or deforming colorful image to normal image. But still can install on tip of the front extendable parts. It is appreciated the camera-head(s) or motion/moving detector can install any location basing on market required and not limited for these limited diagram and text.

From FIGS. 5A 5B, 5C, and 5D show another embodiment of the invention in the form of an light device has current invention's LED bulb has built-in DV (56b) or unit (56d) may in normal camera-head (56b) or fish-eye camera-head(s) (56c) or 3d camera-head(s) (56c), memory cards and optional wireless communication device(s) as above discussion on FIGS. 3A, 3B, 3C, 4A, 4B, and 4C wherein has separated parts including female bulb-socket (56) or accessories (57) can supply desired circuit or current or signal to the said LED bulb and controlled by preferred switch (56e) which on the building or house.

From FIG. 3E show the LED light device has AC-wire to get AC power source and have built-in extend/retract (linear tube) and front illumination areas has plurality of LEDs to supply sufficient brightness to allow camera (square frame with dot inside) to take colorful image as current invention basic functions. The LED bulb is screw-into receiving bulb-socket (24) and the bulb-socket (24) have built-in areas has the desire opaque windows (31) (36) to act as accent or night light functions and the said LED bulb can control by manual switch in all type or all kind of WIFI, RF, IR, Z-way, ZigBee wire or wireless system including preferred transmitter and/or receiver and/or motion sensor and/or radar sensor or other preferred sensor combination From FIG. 5A, 5B, 5C, 5D, 5E show the preferred LED light-device incorporated with the said camera-assembly to allow camera-assembly can take colorful photos, video, steam-image under dark environment for basic functions of current invention including the motion-sensor and/or radar sensor and/or other sensor assembly built-in the said LED light which is one of many preferred embodiment of LED light-device and here show some of including the FIG. 5A is LED motion-sensor entrance door light with built-in camera-assembly, FIG. 5B is LED motion-sensor ceiling or wall installation light with built-in camera-assembly, FIG. 5C is LED motion-sensor and/or radar-sensor and/or photo-sensor for all purpose down or hanging light with built-in camera-assembly, FIG. 5D is LED motion-sensor desktop or accent light or LED light-bulb with built-in camera-assembly, FIG. 5E LED motion-sensor and/or radar sensor and photo-sensor and/or other sensor-assembly recess for ceiling installation light with built-in camera-assembly.

It is appreciated all these preferred 5 applications is just examples for current invention but not limited for all other LED light device including the security light or garden light or other light-strings or other LED light applications.

From FIG. 5A show the LED motion-sensor entrance door light with built-in camera-assembly (59) which has wall mounting bracket for entrance door/housing wall/patio light device has the build in preferred sensor which may selected from motion (PIR) or radar or photo sensor to detect the moving object approach the detect-range of preferred sensor or sensor-assembly and have pre-determined setting to turn-on the camera or video or DV to take desire photos, video, stream-image and go through the logic-circuit or analysis-system to send out wireless notice to consumer phone or computer during day time. At night time or dark environments the LED light turn on to supply the sufficient for camera-assembly to take colorful image while moving-object(s) been detected. The FIG. 5A the said LED light source is one of LED-Bulb with or without the extend/retractable unit which install the wireless transmitter/receiver or camera to overcome the outside glass block-piece (59) because glass will block out the electric signal transmitting/receiving. Alternative, the said LED entrance light the built-in camera, DV, video and wireless transmitter/receiver can install on the housing of the entrance light or the bigger wall bracket piece so prevent from the glass-shape block the wireless electric signal transmitting/receiving. It is appreciated all kind of installation location of camera-assembly and transmitter/receiver all fall within the current invention.

From 5A shown the movement detected wall mounted LED light or wall mounted Entrance door LED light which has wall mounted bracket (56") and lamp-shade the said LED light-source (59a) is one of preferred LED light source and the current preferred LED light source is one of LED-bulb (59a) and fit without the shaped (59) and LED-Bulb (59a) is install on its female receiving-base which has preferred motion and/or radar sensor with photo sensor (56''') so can turn on the LED light-source for sufficient light brightness whenever the motion and/or radar been trigger and LED light-source(s) turn on at once under built-in photo-sensor controlled so camera or DV can take/capture colorful photos, video, stream-image. Further, the said Wall mounted LED light (59) or ceiling or wall LED (FIG. 5B) or all purposes LED light (FIG. 5C) or Desktop or floor LED lantern (FIG. 5D) or Motion/Radar and photo sensor LED recess light device (FIG. 5E) have other parts as above discussed parts and accessories and go through the said logic-circuit or analysis-system to confirm the said real-object-movement so can send out wireless digital data to cloud and people computer or communication devices.

From FIG. 5B show LED motion-sensor ceiling or wall installation light with built-in camera-assembly same as entrance LED light which has the bulb=base (56) connect with AC power soruce by AC-wire to house electricity system and have one wired or wireless circuit to control the LED light-source and camera-assembly to operate pre-program functions. The said bulb-base (56) receive the said LED bulb which has built-in AC-to-DC circuit (56f) to get DC current and get into LED light-source (56g) with or without the extend/retract unit which install the motion-sensor or/and radar-sensor and/or photo-sensor (56d), however these parts also can install on the bulb-base which is outside the LED-bulb unit for simple or lower cost consideration but still should fall within the current invention scope and claims. From the FIG. 5B the LED-light is turn on or turn off the LED light source and camera-assembly can control by switch (56) outside LED light or use wired or wireless electric-circuit (57) to turn on the light-source and camera-assembly.

From FIG. 5C and FIG. 5D show similar arrangement with FIG. 5A and FIG. 5D for all purpose LED light such as down light or hanging light or desktop/floor accent light with built-in LED light-source and camera-assembly to take colorful photos, video, stream-image under the dark environment.

From FIG. 5E shown the motion/radar sensor(s) LED light device has built-in Camera-system for LED recess light device which has a hold-spring (56z) (56z') to hold the LED housing which has rim and rotatable housing for adjust the built-in hidden-camera (56p) so can adjust hidden-camera surrounding 360 degree to aim the desired shooting areas or angle. The said LED recess light has built-in plurality LEDs (56u) or desired geometric shape of LED-bulb (56t) to supply sufficient illumination for night time. The said LED(s) or LED-bulb also supply the sufficient light brightness to allow the hidden-camera or desired camera or DV to take colorful photo(s), video, stream-image for certain number or period time for video or steam-image. The said recess light have at last one sensor select from motions (PIR) or radar sensor (56w) (360 degree range sensor without affect by environment such as high temperatures, dust, rain) or both located on the rotating ring or the extendable/retractable piece (56Q) as market required. The said LED recess light have AC-wire (56x) or wire with male bulb-base (56y) to connect with AC power source. Alternative, the AC-wire or male-bulb-base also can connect with the AC power source and backup DC power source for power fail time use the back-up battery to supply current. The said recess light further incorporates with photo sensor which stop the LED(s) or LED-bulb for illumination during the bright environment or day time.

From FIG. 5E the recess light connect with female-receiving bulb-socket (not shown) which is connect with house electric-circuit or may link with the house wall switch or line with IR or RF or Blue tooth or Z-way or Zigbee or wifi incorporated with download APP software for setting, adjusting for color-changing, color selection, brightness-changing, link by wireless to other unit by RF or IR or wifi or Z-way or Zigbee while have built-in transmitter and/or receiver (56Q') for $1^{st}$ recess light to N-number recess light so can trigger the $1^{st}$ one all other wireless RF or other wireless linkable LED recessed lights at the same time for a living room, garden, patio, security light, light strips in same or different geometric shape and desired functions to turn on and operated each predetermined functions. Wherein the AC-wire including quickly connect set (56v) to quickly connect with AC or DC power source. The said LED recess light device preferred is one of indoor ceiling installation device. It is appreciated that the recess light can also link with other LED light application as long as the recess light have transmitter and other application LED light have built-in receiver or further also have built-in transmitter to send out wireless signal to other $2^{nd}$ group of LED light device those are beyond or over the recess-light transmitter the farest transmitting distance such as 150 feet for recess light transmitting distance. The $2^{nd}$ LED light receive the $1^{st}$ transmitting signal located on 149 feet and at the same time other LED light also transmit out the $2^{nd}$ 150 feet electric signal to $2^{nd}$ transmitter covering pre-determined distance such as one preferred distance is 120 feet. This will allow the LED recess light or LED security light can link with all other type LED light with at least one of receiver built-in any other type of LED light. And the any other LED light may also have transmitter to send out next 120 feet distance all $3^{rd}$ group of all kind of LED light have built-in receiver. This is offer people very convenience from AC wired front door motion security light triggered and turn on all garden path or back yard or even indoor recess light to turn on for predetermined time period and brightness.

This is one of alternative features for LED recess light applications has

1. Motion or radar detector or both incorporate with photo sensor.
2. The recess light has built-in wireless transmitter to transmitter IR or RF or Z-way or Zig-bee or WIFI electric signal to its valid transmitting-distance to all kind of other same or different LED light that have built-in receiver.
3. The said motion/radar sensor LED light for different purposes have link-function with all other have same or different shape, construction LED lights.
4. The recess light has rotating parts or movable parts or housing to install camera or DV to aim to desired shooting angle or areas.
5. The recess light has quickly connectors, conductive-wire, male-bulb-base to connect with the said AC or DC or both power source for normal LED light functions power-fail light function or AC power source for desired combination.
6. The recess light has at least one of sensor
7. The recess light has extendable/retractable piece with at least one of desire camera, transmitter, receiver on one of this part.

From FIGS. 5A, 5B, 5C, 5D the said LED bulb is turn on and turn off by the circuit or switch (56e) and the lamp-base (56) receiving the LED bulb. The LED bulb has extendable, rotating, bendable parts (56a) where install the camera-head(s) (56b) (56c) or-and motion sensor (56d) or- and moving detector (56d). The LED bulb has built-in rechargeable battery and it will charger while the switch is ON and while switch off or power shut-down the said rechargeable battery supply Camera-assembly and LED light source to work while switch off or power shut-down. Whenever moving objected be detected by motions sensor or moving detectors will turn on the LED light and camera-head(s) to take clear colorful photos. At this time bad guy or moving objects think only turn on the light and never think same time the colorful image with preferred audio digital data already use back-up power to wireless transfer through WIFI or-and WIFI extender to personal phone or computer which had down load the APP and software may already direct dial out phone to send out signal to police or relative to catch the intruder or bad-guys during 2-5 minutes after moving-object is been sensor or detected under dark environment.

From FIGS. 5C, 5D same as the above discussion, the difference at the LED bulb may use for google stores or Alibaba no employee stores so the LED bulb has built-in camera with all wireless transmitting camera-head(s) captured colorful image to cloud through WIFI or-and WIFI extend and go through 3G/4G/5G to cloud, and owner of the said phone or computer received the signal and use internet download APP and related software to make desired operation and give instruction to the LED bulb through 3G/4G/5G to internet and WIFI or ZigBee wireless receiving system to operate APP software instruction. This kind of LED bulb for non-employee stores can install on simple light circuit for house, stores, building no need to make special camera-head special circuit so can do nothing can just change current invention LED bulb then set up the both LED light and camera-head(s) in one time. This application, The LED light source almost turn on all the time during day time and night light, so No need any sensor on this kind stores always has 24 hours turn on the light. But offer both LED light brightness and built-in camera-head(s) to capture the colorful image or-and audio to use current invention wireless-system to know moving people purchase items, purchase amount and input to pre-program computer and connect with bank account to finish all peoples purchase behavior.

From 6A, 6B, 6C, 6A1, 6C, 6D show all kind of the LED light unit for individual use or assembly with other light-device, one of example but not limited for this examples is to assembly with outdoor AC-wired or Solar-powered motion security light for main-housing bulb-sockets with or without extend/retract or bendable or foldable extend/retract tubular device which can load the wireless receiver/transmitter or camera-assembly or backup battery inside the tubular space or other geometric-shape with pre-determined space within.

From FIG. 6A and FIG. 6A1 and FIG. 3D can see the LED bulb has rear-end extendable and bendable tube, bar, cylinder or parts which can make the LED light source or sensor-head(s) or camera-head(s) to aim to the desired area while the sensor(s) or camera-head(s) shooting range is less than 360 degree on x-y-z axis of the environment. So, the extendable or rotating or bendable or retractable LED parts is very important for any LED bulb has built-in camera-assembly which has all function as FIGS. 4B, 3D, 6A1 discussion. It is appreciated as long as the LED bulb has built-in camera-heads, sensor, detectors, and wireless transmitting and receiving through WIFI, WIFI extend, Zigbee, and go through 3.4.5G network and phone or computer had download APP and its software from internet to operate all following work should be fall within all the above discussed LED bulb or current invention scope, spirit, claims. Any replace, alternative, equal function, skill should still fall within the current invention scope.

The All kind of LED bulb as show on FIGS. 6A to 6D and 6A1 is some preferred popular model. It also can be different size including most common use for PAR38 shape and size which while add the motion sensor or moving detector(s) or other sensor with built-in camera-system with memory card or incorporated with cloud digital data storage station can save or transmit the camera device captured MP4 or higher rank image, photos, video to phone which through the APP and pre-programed software or AI with design following works can check pre-set location or touch-panel to select the selected-areas status, or moving object including people and merchandise or other objects, and do a lot of other desired function as above listed (1 to 9) for setting, adjustment, program, call, digital data delivery for following person identification, recognition, facial recognition, purchase, payment, tracking, analysis, built-behavior, study habit, crime recording, save evidence, save talking, send out audio signals through the cloud storage station data with pre-program MCU or CPU or IC or Circuit basing on the camera related device captured digital data. It is appreciated that all above listed multiple functions only for example which not cover all market available function, but it should not limit for listed function, it should be cover all market available functions.

The Light device has built-in DV or camera device and memory kits or-and optional wireless communication system as FIGS. 7A,7B, 7C, 7D show some of preferred built-in LED light device and built-in camera-assembly which has everything as above discussed to capture the colorful digital data by camera or DV has built-in LED lighting devices. From FIG. 7A can be a door bell LED light which has the camera (7-1) and has the one push button for trigger ring bell and system, other round can be a motion sensor or moving detectors inside which also can trigger the camera-system for desired pre-program functions and operate the desired following works.

From FIGS. 7A, 7B, 7C, 7D show some preferred or alternative or replacement LED light device has built-in multiple functions including LEDs for illumination, camera-assembly to capture photos, video, stream-image for colorful video and/or audio data, motion/moving/radar/photo sensors, storage device including memory card and wireless cloud storage device, wireless-device to connect with bluetooth, IR, RF, WIFI, internet, 3G/4G/5G network, logic-circuit or analysis-system or motion & image comparison, download software including APP, wireless communication & control & setting & adjustment & functions selection. LED light-source, camera-assembly, light-show changing, setting, control, adjusting.

These devices are shown on FIG. 7A to 7D with (1) built-in prong, or (2) built-into the wall connect by wired, or (3) built-in door powered by wired, or (4) install on outdoor anywhere powered by wired or AC plug-wire or transformer, or solar power by attachment means or other alternative place by attachment skill to connect an house electricity or energy storage power source to get AC or-and DC or-and power backup power source including a wall outlet or extension cord outlet, and also has built-in motion sensors or moving detector(s) or switch that can be used to provide control the light device and camera unit or-and auto tracking functions. It will be appreciated that the camera or DV devices include; (1) Lighting function and camera which can take at least MP4 images both can activate as pre-programmed such as (a) camera take photos or video always or every period of time during day time such as per second or minutes. (b) camera take photo or video while sensor(s) or detector(s) been triggered any time (d) camera take photo or video while light source turn on by switch at the night or under dark environment or inside store(s) (e) light device and camera activated by any pre-setting program. (2) The light device powered by the built-in prong or bulb-base or wired or outside transformer or solar-system, or backup batteries to get AC or DC or both powers. (3) and/or various preferred function or features or operate more following works as above or the current invention discussed inside all text and below more details for all functions.

The multiple functions LED light has built-in DV or camera of FIG. 7A may include an LED (7-3) to serve as a night light or-and offer sufficient brightness for camera-system for a big size (whole front surface) illumination by inside plurality of LEDs or COB (Chip on board) (7-2) for camera device and a DV or camera device (inside of the one of 2 circle), or-and has pair of moving detectors/sensor (inside of the other 2 round circles) or-and motion sensor (inside of the other 2 round circles. The alternative arrangement for this housing can be the 2 circles one is push switch to trigger the ring bell and camera system. One of the 2 circuit is sensor device may is a motion sensor or moving detectors and the whole front surface is super brightness LED light to offer sufficient LED illumination while under dark environment to allow camera-assembly to take color digital data including audio data.

From FIG. 7B the DV or camera device of FIG. 7B includes foldable prong or wires or AC plug-wire or bulb-base (7-5) to insert to bulb-receiving socket to connect with power source, a plurality of LEDs in desired type (7-11) to offer sufficient brightness for camera-assembly to take a colorful digital data may including audio sound or communications or conversation, or a pair of LEDs work as night light or-and power fail light (7-12), a pair of moving detector sensor or moving sensor(s) is install within the opening (7-8), or a microphone and speaker install inside the circle areas (7-9), memory card slot (shown on other side of 7-13), multiple position switch or for section auto/on/off/setting switch (7-6), camera head (7-9), and USB ports or power input-end or other receiving-end (7-7) to deliver digital data or charge or the electricity or current inside the cover and hidden antenna (inside the unit) for as long as length to get strong wireless transmission capability, MCU or CPU or IC or other circuit inside the LED light device including software to allow consumer can use touch-panel of phone or computer device to select-areas for detecting moving people or objects and these hardware or software has capability to wireless transmitter or communication with Wi-Fi or Wi-Fi-extend and connect with 3G/4G/5G network assembly (not shown) to connect with cloud storage station and pre-program software or even AI software to do the following work as above discussed and wireless communication circuit inside the housing. The LED device can be any geometric shape with above discussed all parts including all kind of LED light, LED bulb, LED doorbell light, LED garden light, LED security light, LED flashlight, LED torch light, LED motion sensor light, LED motion sensor light, LED Motion or moving detector light device as above discussed.

From FIG. 7C the LED light device is a multiple functions LED light device has optional project image features from top project image output-end with foldable prong or wired or AC Plug-wire or bulb-base (7-18) to get AC power source, has multiple-position slide or push-on switch including auto/on-off/selection/power/photo/video, and has super bright LED light source (7-21) to offer sufficient brightness for camera-device (7-20) has optional zoom in and zoom out focus adjustable camera-device to take a color photos under dark environment where the location also can install the motion sensor or moving detectors (7-21) inside the areas but separate with plurality of LED light source to prevent from interference from light beam to sensor or moving detectors, or optional including LED indicator lighted switch (7-17), microphone and speaker (7-16), indicator LEDs (7-14) and touch switch or inductive switch (7-15), one or more camera-device (7-20) has focus adjustable head(s) on center and plurality number of SMD LEDs or COB (Chip on Board) LED (7-21) light on ring or inside the window to offer flashlight or brightness illumination (7-20), motion sensor with Fresnel in flat or round or dome shape install on the front face of LED light device and inside has photo/shock/smoke/flood sensor or has pair of window to install for a pair of moving detectors sensor (7-21), USB port or solar power source input-end or audio data input-end or charge-input end, transformer input-end (7-23) for digital data or electricity or audio or power delivery or other adaptor (7-23), and micro SD card slot (7-19), and had all MCU or CPU or IC or selected circuit or module for wireless, Wi-Fi, cloud communication system built-into inside of the LED light device housing (7-14) in any geometric shape with power source connector selected from prong, bulb-base, wires, AC plug-wire.

From FIG. 7D the LED light device is a multiple functions LED light device can be one of night/power fail/motion or moving detector light, security light, LED entrance door light, LED doorbell light, LED bulb with or without a built-in displayer or screen light function, including foldable prong or blub-base or wire, or AC plug wire, outside transformer power source (7-24), a memory card or wireless to storage digital data to cloud by wireless connecting system such as Wi-Fi, Wi-Fi extend, APP, software, or-and USB adaptor compartment or-and back-up battery (7-25), an audio assembly including speaker and microphone or and doorbell sound chip and wireless communication for deliver the audio (7-26), a swivel or rotatable or focus adjustable camera head in center and has plurality of LED(s) on ring or donut circle (7-27), an motion or moving detectors sensor or other type sensor(s) fit within or behind the motion sensor Fresnel lens (7-28), an electroluminescent or LED light for big area illumination (7-29), an hidden antenna compartment (7-30), and a foldable compartment for a screen or displayer (7-30), the other sides of the LED light device has parts & accessories select from power/model selection/setting/Auto for power fail function/All Off switch which has multiple sections. All circuits, IC, electric parts & accessories, all kind transmitter or receiver for Wi-Fi, 3G/4G/5G network, settle lite channel, connect cloud digital data storage station, MP4 format creating circuits, etc. all fit within the housing.

From FIGS. 8A and 8B show the other light device application for portable or wearable flashlight application. Those devices have foldable or extendable prongs.

From FIG. 8A, the prongs are folded or retracted while people use flashlight so easily hold by hand or put into pocket, while in FIG. 8B, the prongs are extended for recharging from the outlet which inside housing or within the extension cord or power cord or other AC or DC power source has outlets.

From FIGS. 8A and 8B has all above discussed FIG. 7A to 7B all related parts & accessories so can offer not only the simple flashlight of super strong light beam with or without focus adjustable to make clear and brighter area for sufficient lighted area so can offer the built-in camera unit to take photos under night or dark environment. Also, The Flashlight has built-in camera as above discussed has MP4 or higher rank image shooting capability+Storage SD or Micro SD card or connect to cloud digital data storage station+ Wi-Fi or 3G/4G/5G and preferred APP or software has pre-determined programs to make people see screen of area and further operate all added or wished function as above discussed.

From FIGS. 8A, 8B, 8C show the portable Flash light has built-in DV, memory unit, and optional wireless communication such as Wi-Fi, 3G or 4G or future wireless transmitter or receiving kits to offer the police or army or military or security person can have the super bright light source to incorporated built-in DV or camera unit(s) and memory unit and optional wireless communication to take photos, take video, offer on-line image though the optional wireless communication to the viewers to see the record or on-line or on-air instant live image to make sure the safety and status while people use the flashlight. While use for Army or Military purpose the DV or Camera can incorporate with above discussion for night time or dark environment to use the (1) Visible flash light beam to offer brightness or (2) un-visible IR or photo diode to make the dim or dark environment to show the surrounding status and not let enemy see the Visible light beam and shoot the army or military team and persons.

The flash light offers super good brightness let the DV or camera or IP Cam or driving Cam or Web-Cam can take nice photos, video, on-line message with colorful image to viewer.

Same for other lighting device did as above discussion. This is offering the portable flashing light or wearable flashlight for people to report or send out image by wireless communication equipment to the phone, computer and screen, communication equipment to report the people status or environment at the dark or evening environment.

This is unique point and the power can be DC power source or rechargeable Power source or wireless recharge power source by market available charging or battery storage units with sufficient big capacity of the electricity.

From FIG. 8C can see the flash light has Main body (8A) has the top-portion (8a) has install LEDs (8c) within the reflectors surrounding or without reflector surrounding. The said LED (8c) is desired specification selected from dip-LED, chip-LED, dice-LED, COB (chip-on-board) LED or any market available LED for desired number, brightness, wattage, colors.

From FIG. 8C, the top-portion (8A) has install camera to take image on desired quality such as Full HD 1080 or other quality as above discussed for quality of photos or video with or without audio. The Top-portion (8a) has the (8a') step to allow install the rubber gasket (not shown) to prevent from water/moisture get into. From FIG. 8C, the main-body has neck-section ( ) has some quickly screw-thread (8g) to allow the cover (8B) to tight assembled by quickly screw-thread (8g) and pressed the second rubber gasket (8k) for water-proof to protect inner slots including; memory card slot (8h) which preferred for micro-SD card. The top-cover (8B) (8B') has a lens which has center hole (8m) to allow install a lens-rubber-gasket (8n) (8r) to well install the small-lens (8p) (8s) fit into big-piece optic-lens of top cover (8B) (8B'). or-and slot (8i) for preferred Type A USB-port (8i) which can let the flashlight act as power-bank to supply the built-in battery power to outside other electric device, or-and Slot for the preferred Type C USB-port (8j) which can charge the flashlight inner rechargeable battery (8C).

The main-body (8A) has one end-cap (8D) which has the 3rd rubber gasket (8w) to tightly the end-cap and main-body while screw-together both parts. The said end-cap (8D) has the elastic-conductive-piece (8u) (8u') which has base (8v) (8v') well install inside the end-cap (8D) (8D') inner-base.

The main-body (8A) has install the electric-parts, IC, conductive-rubber-switch/panels to make electric contact with inside circuitry to make the screen to display all kind of functions, setting, display, zoom adjustment, brightness adjustment, light-functions and also has big power on-off switch and super-big push-on/off switch to take photo or-and video while police or army or military or security people can quickly get bad-guy image with desired focus for pre-determined distance range of flashlight such as 300-1,000 feet or 100-300 feet or 10-200 feet or more far distance for military use. The said Flashlight can take photo or-and video or-and audio is most sharp and functional flashlight with built-in camera and storage-device (Memory cards).

The flashlight has built-in camera for professional people use including police or security or army or military or navy or air-force or home owner preferred to use metal piece with super long life for batteries such as 4 piece of D-size battery or 4 pcs of C-size batteries so can have strong metal and super heavy for profession people to use. That is not only can supply existing flashlight function and self-protection weapon (Heavy and long enough) but also can take image including photo or-and video or-and audio for longer-bar such as 1 foot or 2 feet or 3 feet long for profession use . . . .

This is the best than ever and brand new for the out of date flashlight only for illumination, not able to take any full color image or photo with or without audio device. This is the other big improvement for the current invention for flashlight application with built-in camera and this is the Child filed case of the parent 2011 filed case which still have other Child-Filed case still pending so this is CIP of the parent (#KKK-2011) filed case.

Same for other lighting device did as above discussion. This is offering the portable flashing light or wearable flashlight for people to report or send out image by wireless communication equipment to the phone, computer, screen, communication equipment to report the people status or environment at the dark or evening environment.

This is unique and the power can be DC power source or rechargeable Power source or wireless recharge power source by market available charging or battery storage units with sufficient big capacity of the electricity.

FIG. 9A, 9B, 9C, 9D are Similar with the FIGS. 7A, 7B, 7C, 7D for some of the LED light device has built-in camera-assembly to take the colorful photos, video, stream-image under dark environment has brief discussion as following details.

FIGS. 9A, 9B, 9C, 9D, 9E, and 9F illustrate a size comparison for a traditional LED light device is one of night light which may add the said camera-assembly so can become a plurality of current invention for Digital Video/Camera units which has all kind of light source for illumination powered by AC or DC or backup power for light device has built-in camera kits, memory card or wireless storage the camera-device captured colorful digital data storage to cloud storage station, optional MCU or CPU of IC or Software to wireless transmitter to communicate system including wife, or Wi-Fi-extend or Wi-Fi-region(s) which is connect with 3G/4G/incoming 5G/even for settle-lite network, cloud data storage station with preferred APP or software from variety of platform so can make expected function(s) or-and following work to detector or monitor all moving people or objects from camera and through camera-assembly with LED light illumination from LED light device by wireless system.

From FIG. 9B shows a typical LED light device which is combination of LED night light or LED motion light device to show the size and dimension so can compare the current invention's LED light has built-in camera kits, The size for current invention of LED light device has built-in camera-assembly has everything for wireless communication to connect with Wi-Fi, Wi-Fi-extend, cloud, 3G/4G/5G for detect moving objects . . . . The size of current invention compares with simple LED night light or LED motion light without camera-assembly depend on what kind of quality of the colorful image required. If less pixel of color image needed, then, size can make smaller because can use low-pixel camera-device such as pin-hole camera.

while FIG. 9B shows a device with multiple camera heads, which can easily fit within the approximate dimensions of the night light. FIG. 9C shows a night vision digital video device with a motion sensor that can be upgraded for auto tracking FIGS. 9E, 9F, 9G show extra small and slim digital recording devices that can be incorporated into a lighting device according to the principles of the invention.

FIG. 9B shows a typical night light to show the size and dimension so can compare the current invention's LED light has built-in camera kits, while FIG. 9B shows a device with multiple camera heads, which can easily fit within the approximate dimensions of the night light. FIG. 9C shows a night vision digital video device with a motion sensor that can be upgraded for auto tracking FIGS. 9E,9F show extra small and slim digital recording devices that can be incorporated into a lighting device according to the principles of the invention.

From FIG. 9G show all possible connector or contact or conductive element for current invention for LED light has built-in camera-assembly.

FIG. 10A, 10B, 10C, 10D are Similar with the FIGS. 7A, 7B, 7C, 7D for some of the LED light device has built-in camera-assembly to take the colorful photos, video, stream-image under dark environment has brief discussion as following details.

Figure 10A:
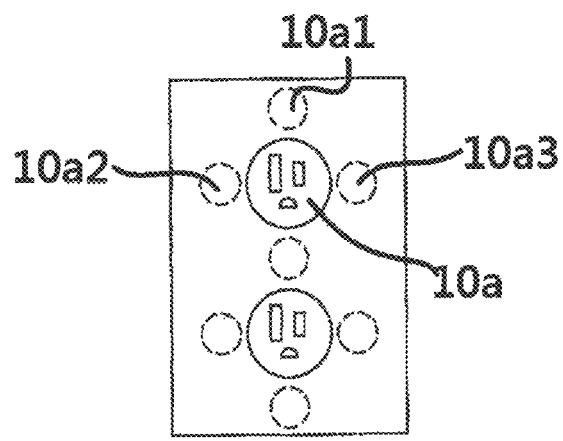
FIGS. 10A and 10B show an embodiment of the current invention which uses a plurality of suction cups to reinforce the prong and hold a super heavy device on a wall outlet cover plate which is a light device has built-in DV or camera device, memory cards and optional wireless communication device(s).
Figure 10B:
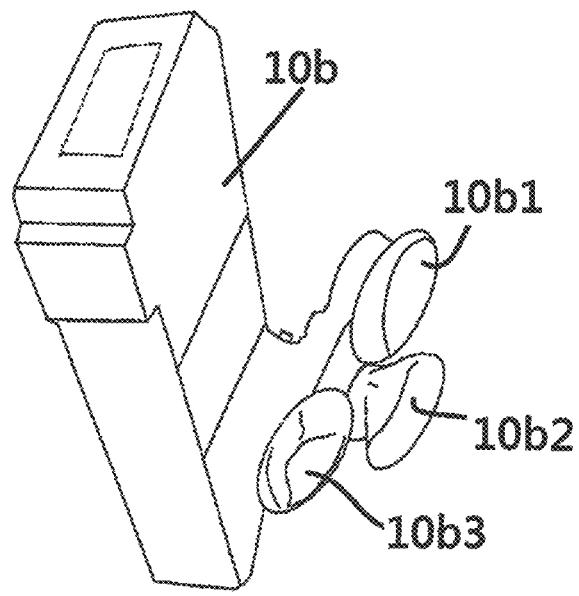
Figure 11A:
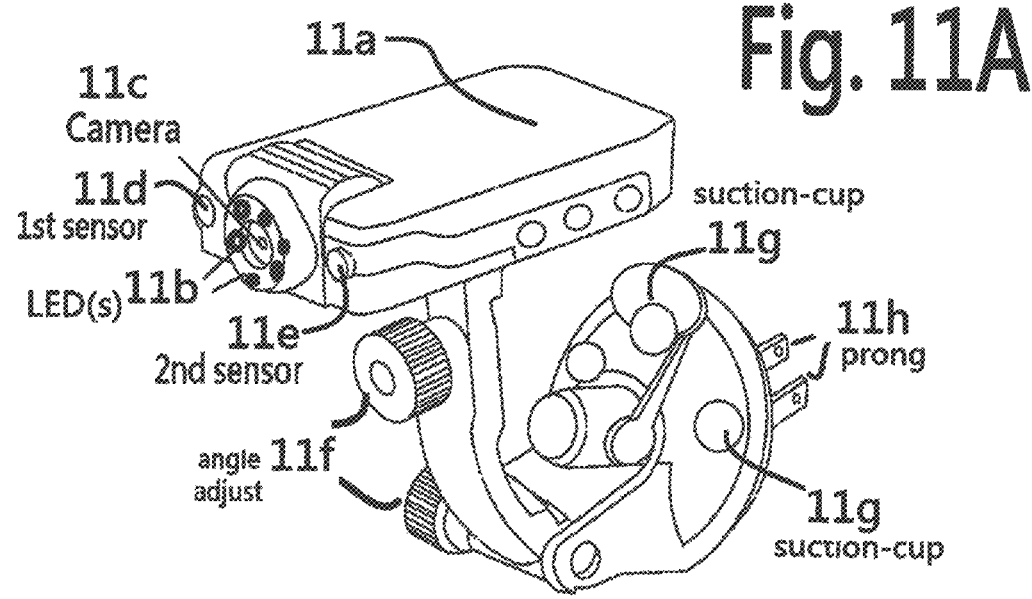
FIGS. 11A and 11B show another embodiment with a plurality of suction cups for light device has built-in DV or camera device, memory cards and optional wireless communication device(s).
Figure 11B:
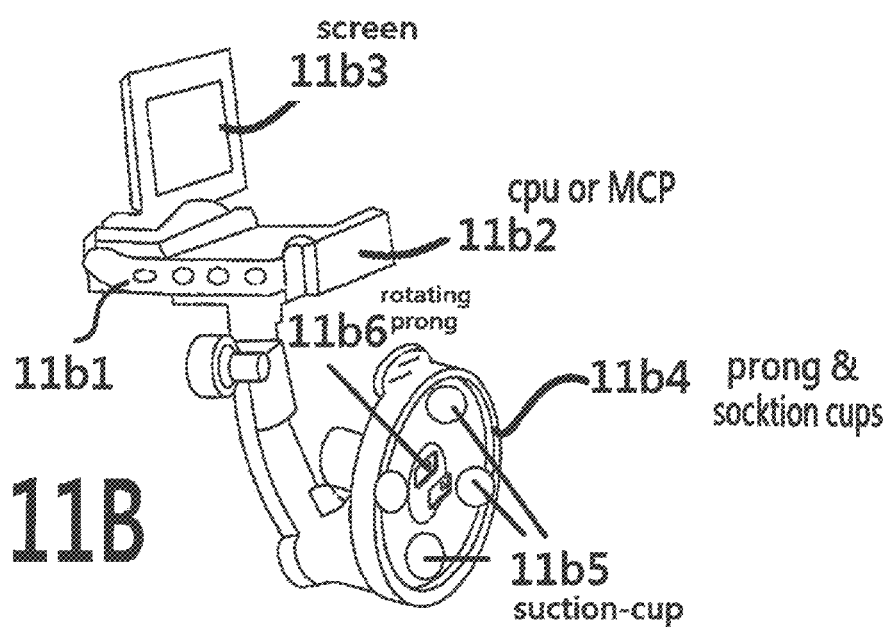

From FIG. 10A show the location where suction cups and where the suction cups will attach on the wall outlet cover plate, shown in FIG. 10B, The said current invention LED light device has prong to connect power source may incorporate with the suction-cup sets to be used to adhere to an outlet cover plate and support the extra weight of the combined DV device and lighting fixture when directly plugged into a wall outlet.

From FIGS. 10A, 10B show alternative current invention DV or camera devices arranged, according to the principles of the invention, to be plugged into a wall outlet and to be supported, as necessary, by additional suction cups. From FIG. 10A show the mount bracket set which can adjust of LED motion or non-motion light and camera to desire any angle which is feature of current invention including indoor or outdoor installation kits.

From FIG. 12A, 12B, 12C, 12D, 12E show the Motion/Radar/Photo sensor LED light device has built-in camera-assembly and wireless transmitter or/and receiver to individual sales to replace none-camera motion (PIR) sensor unit of the out-of-date or old-installed motion security light its motion-sensor unit. So, People can upgrade the none-camera-unit to become camera-assembly or have WIFI transmitter and/or receiver additional up-grade functions.

From FIG. 12A, 12B, 12C, 12D, 12E show the separate motion or moving detector(s) sensor unit has built-in digital data device at least has camera(s), digital data storage kits, memory card, SD card, Micro SD card, IR motion module, USB set to download or deliver digital data, Bluetooth Module, Wireless Module, control module, photo sensor module, circuit and conductive wires, wireless communication set, Wi-Fi, 3G/4G/or incoming 5G network or internet even for settle lite channel's connection kits, APP download by phone or computer owner, APP software to give wireless instruction to said LED light or-and camera-assembly, controller, circuit so can put the individual separated housing camera-assembly (100) or said motion/moving sensor-unit (100) has built-in camera(s) for the best location to shoot the wider detect angle, or install within hidden location of any LED light device including desk lamp, LED bulb, LED garden light, LED torchlight, LED outdoor light, LED indoor light to protect people home, residence, office, small business or non-people stores.

From FIGS. 12A, 12B, 12C, 12D, 12E, the said separated camera-assembly or called motion sensor-unit has built-in camera(s) has optional IR night vision optics kits to help people take the photos under low or no brightness environment for recognizable image while unit install alone for black-n-white; or The said separated camera-assembly or called motion sensor-unit has outside housing LED light source so can get the colorful and nice image, or The said separated camera-assembly or called motion sensor-unit can use the out-of-date any kind of light source brighter lights to take photos or video under lower or no-brightness environment while work with light device for the colorful and nice image.

From FIG. 12-A show the separate camera-assembly (100) or said motion sensor-unit (100) while assembled into (i) current inventions new LED light security light device has every preferred camera relate functions and the LED light source turn on and turn off by the motion sensor or moving-detector (s) trigger, or (ii) out-of-date any kind of light source security light to replace the out-of-date motions sensor-unit which just only has one motion sensor to turn on light function without camera-related functions so can upgrade it from no-camera function to has built-in camera to take digital data.

From FIG. 12-A the separated camera-assembly or called motion sensor-unit which has wired or quickly connector to get power from main security light. The said separated camera-assembly or called motion sensor-unit has everything just has no light source and the separated camera-assembly or called motion sensor-unit powered by conductive wires (110) which can within or inner of the install kits (105) or adjustable kits (105) such as tube, hose, retractable bar, empty linear tube or the others, and the said tube, hose, retractable arms, empty linear tube has the assembly design to allow the separated camera-assembly or called motion sensor-unit motion sensor unit to fit into light device.

The separated camera-assembly or called motion sensor-unit to fit into said Light device has 2 type;

(AAA) One is for out-of-date simple type has only motion/moving sensor as trigger or switch and the separated motion/moving sensor and circuit without camera-assembly, the simple type has its own housing same housing with light source of main light device, or (BBB) the separated motion/moving sensor unit has built-in camera-assembly for all camera related functions to capture colorful digital data and is to replace and new-install to out-of-date motion security light device and the out-of-date motion security light just only has light for illumination so can upgrade out-of-date motion security light device to security light has built-in camera with all desired operation of capture digital data.

This is very important because the separated camera-assembly or called motion sensor-unit only act as switch to turn on the main light device or main LED light device's preferred part or functions. The said separated unit on out-of-date motion security light without any parts related to camera or digital data functions except the motion or moving sensor as switch to turn on the main light device as above discussed is the model (AA).

The one of the preferred embodiments (BB) model is separated camera-assembly or called motion sensor-unit has all camera-assembly functions just has no light source so can use this (BB) alternative model to fit into all market out-of-date motion sensor security light device. The said out-of-date motion sensor security light device only had motion sensor to trigger the light source for illumination and without any (1) camera for MP4 format digital data, (2) memory assembly, (3) download USB ports or use other download device (4) Wi-Fi, (5) wireless transmitter or receiver, (6) connect to 3G/4G/incoming 5G network or settle-lite channel system, (7) connect to phone or communication equipment capability, (8) not incorporated with each person not center-control device or association and each person to use internet download APP and use its pre-program software to give wireless instruction to security light to make setting, comparison, selected-areas, adjust all setting or functions.

So this (BB) Alternative update separated camera-assembly or called motion sensor-unit replace old simple motion sensor and assembly by the said universal install kits which has adjustable kits to make all out-of-date simple motion sensor security light device up to security light device has built-in camera with low-cost or middle cost or high-end cost models.

The separate motion sensor unit (100) has at least one of the built-in camera related device which has its preferred functions for 8 points not existing on the out-of-date security light and the motion sensor (101) or moving detector(s) sensor fit within the separate camera-assembly or called motion sensor-unit housing (100).

From FIG. 12-B show the separated camera-assembly or called motion sensor-unit (100) work alone without working with other light source that has screw-in or plug-in or twist-n-lock male end for example like market existing male lamp base to fit into the female lamp socket or lamp holder to connect with the power source which has built-in camera (102) and built-in wireless communication assembly and related hidden antenna (103) and related electric circuit module (shown on FIG. 12-E) to allow the separate camera-assembly or called motion sensor-unit (100) can has camera to take digital data (which has at least of image or-and sound has minimum MP4 or higher rank data), or-and save into removable memory card or connect to cloud data storage station, or-and download by USB wires kits or send out by wireless system such as Wi-Fi through 3G/4G/or incoming 5G network or deliver by settle-lite channels of the digital data to preferred receiving ends which can connect with 3G/4G/incoming 5G network or catch settle-lite channel device such as mobile phone can connect with 3G/4G/incoming 5G network. Also has wireless receiving circuit to receive APP software instruction from internet go through WIFI to the separated camera-assembly or called motion sensor-unit (100) for software pre-program setting, adjust, selection selected-area detection or comparison, facial recognition, tracking moving people or-and merchandise.

The alternative or same function as FIG. 12-B separated camera-assembly or called motion sensor-unit (100) also has LED light source arranged on motion sensor or moving detector (101) to help to take colorful image, or night vision infra-red diode to help take black-and-white image, or other wireless communication equipment so can also communicate with APP software and take APP software instruction by wireless communication to each person not center-control system or device including personal computer, wireless receiving ends or equipment(s).

While the said separated camera-assembly or called motion sensor-unit (100) powered by female lamp holder, lamp base (109-1), lamp socket, contactor, connector because the home lighting may not turn on at the night time, so the separated camera-assembly or called motion sensor-unit (100) has built-in back up rechargeable battery (109-4) or energy storage device (109-4), so camera and light source will not lose power during the female lamp holder has no power or power failure time. So, (CC) The separated camera-assembly or called motion sensor-unit (100) has the male bulb-base or connector type preferred to has backup battery (109-4) or energy storage device (109-4) to supply sufficient and non-power shutdown power to the separated camera-assembly or called motion sensor-unit (100) to continue work while female lamp holder no power while people turn off the lamp holder power or power failure time (DD) The lamp-base type of camera-assembly or called motion sensor-unit (100) has the IR night vision module or built-in LED light source(s) to help the built-in camera can still take a clear photos while the power fail or female lamp-base power off These (CC) and (DD) 2 important preferred or alternative embodiments and features for current invention for the male lamp-base or connector type of separate camera-assembly or called motion sensor-unit (100) has built-in camera install alone and fit within the female lamp base, lamp socket, lamp holder or other connector or contactors.

From FIG. 12-B, the alternative type is (EE) camera-assembly or called motion sensor-unit (100) has AC or DC power from the female lamp-holder or lamp-socket or male lamp-base or connector from home, office, residence. The separate camera-assembly or called motion sensor-unit (100) has at least one camera or multiple cameras (102) has the male lamp-base or preferred connector or contactors (109-1) to connect with the female lamp-base or lamp-holder or lamp-socket connector or contactors (not shown), so the AC or DC electricity to drive the separate camera-assembly or called motion sensor-unit (100) but while the lamp holder power is shut down or power failure time, the power will use the backup energy storage device such as rechargeable batteries or the other energy device to supply sufficient power to the said male lamp-base separate motion sensor.

From FIG. 12-B also show the camera-assembly (100) which has foldable parts, arms, or extendable pole to assembly with the base of security light with hidden antenna (103).

The said separated camera-assembly (100) or said motion sensor-unit (100) has built-in camera(s) has one of the preferred parts including:

(A) optional IR night vision optics kits (109-3) to help people take the photos under low or no brightness environment for recognizable image, or (B) all kind of the Light source (existing security light may not has LED light source or current invention for whole set security light has LED light source as FIG. 17), so can offer the brighter lights to take photos or video under lower or no-brightness environment for black-n-white, or colorful and nice image.

It also has the IR night vision for this power fail or power off time period to allow the camera kits to take photos. This is other alternative design by current invention and cover for the current invention for separated motion sensor unit application.

The current invention if power is come from the male lamp-base or prong or AC wired or AC plug wire or connector or contactor into the said LED lighting including LED light fixture, LED bulb, Lamp holder, flashlight, entrance door light, garden light, floor light, outdoor or indoor application as above discussed example with power fail consideration while power failure or power shut-down need to have the backup energy storage device to supply power with (a) IR night vision diodes or (b) sensor to turn on light source; to help to take a clear photos or video.

From FIG. 12-C shown the separate camera-assembly or called motion sensor-unit (100) has the wireless communication antenna (107) on outside housing area to get the best wireless communication capability than the FIG. 12-B hidden antenna (103).

Also, From FIG. 12-C show the camera-assembly or called motion sensor-unit (100) has one or more than one fresnel areas and motion/moving PIR sensor (101), camera (102), memory card in a SD or micro SC card or other market available memory kit's slot (108) for low-end version without Cloud and download APP with pre-program APP software to let phone or computer owner (not center control system) to remote control the said LED light or-and camera-assembly.

From the FIG. 12-C the separated camera-assembly or called motion sensor-unit (100) power by the conductive wires (110) has the installation kits or adjustable kits (105) to help the said separate camera-assembly or called motion sensor-unit (100) can well installation on any desired location(s) of current invention complete light device or replace all out-of-date non-camera light device to get all the current invention discuss for camera related functions similar with the above discussion for variety combinations with preferred pole or long length of antenna to get best signal from wireless system.

From FIG. 12-D show the separated motion sensor unit (100) has the plug-in prong to supply the power. The prong may retractable so can easily carry to anywhere. The wireless communication antenna (107) also can quickly take apart and re-assembly while traveling or packing to reduce the packing size. The separate camera-assembly or called motion sensor-unit (100) has the desired circuit combinations including link to the other wireless system including zigbee so can control more than one light source but also outlet, adaptor, surge protection adaptor or and all kind of electric product within the indoor ZigBee electric wave cover area(s), so can get different or part or all functions as current invention discussed on above text or also can make model as market required and cost consideration such as (Product group I)=The low-cost model will be only the PIR motion or moving detector sensor (111), (Product group 2)=The middle-cost model, PIR motion or moving detectors sensor (111)
  Blue tooth module or USB download wires sets (112),
  (Product group 3)=The higher-cost: PIR motion/moving detector sensor (111)
  wireless communication assembly of Wi-Fi (113) and internet 3/4/SG to wireless the camera captured color image and audio digital data wireless to cloud storage station
  incorporate with download APP and its software to do following work,
  (Product group 4)=The Deluxe model: for more higher grade will be PIR motion/moving detector sensor (111)
  wireless communication assembly of Wi-Fi (113) and internet 3/4/SG to wireless the camera captured color image and audio digital data wireless to cloud storage station
  incorporate with download APP (113) and its software to do following work,
  Wireless communication with cloud from personal phone or computer through download APP and software through internet 3/4/SG to Wi-Fi (113) to LED light device has built-in camera device for following work.
  Multiple-ways communication including a speaker to delivery audio sound, ring bell, or conversation (not shown) so can talk with the people or alive objects with sound while people or alive object stay in the camera location range.

These different level products depend on the cost and functions and these products just for example, it is appreciated that all the FIG. 12-A to FIG. 12-D just limited samples it should not limited for all alternative, replacement, equal functions, details for part or all function as above discussed, it is appreciated any alternative or equal function or equivalent or replaceable of all current invention or co-pending filing or issued parent patents discussed, mentioned should still fall within current invention scope and claim coverage.

From FIG. 12-E show the one of embodiment detail construction for the said separated camera-assembly or called motion sensor-unit (100) which has front case (120) which has openings (120-1) to install the motion-sensor PIR (122-1) or moving detectors sensor (122-1) Fresnel lens (121), or PIR head (122-1) or photo sensor head (123) on the PIR sensor or detectors module (122) also has 2nd openings (120-2) on bottom location) to install the Camera head which on the camera module (124) with its camera lens or lens assembly (125).

The said camera-assembly or called motion sensor interface sensor-unit (100) and for upgrade model can has the Blue-tooth/USB download set, and/or wireless, and/or WIFI, and/or Zigbee interface install within the wireless module (126) depend on the market required for part of all above discussed functions.

From FIG. 12-E, the said camera-assembly or called motion sensor-unit (100) has more higher-grade sensor or detector module (122) specification and functions including Wi-Fi, connect with cloud, receiving APP software instruction, connect with Cloud, 3G/4G/5G or-and internet or-and network, settle-lite channel connection system or assembly.

From FIG. 12-E, the Back case has several screws or fasten kits (120-3) to assembly the front case (120) and back case (120') together. The inner housing has adjustable kits or join kits (127) connect with the outside adjust or join kits (127') to make the separate motion sensor unit can install, adjust angle, position, orientation on anywhere preferred.

The inner empty space of the adjust or join kits (127) (127') allow the electric wires to connect with circuit (122) (124) (126) which now is 3pcs PCB(s) but it can make into 1 PCB while all function is fixed and need all these 3 circuit separated functions PCB and power source.

The wireless antenna (129) can tread-into the inner holder (not shown) to make quickly install and take-apart and re-assembly for wireless communication models. The antenna also can be a hidden antenna like FIG. 12-B shown with as long as possible to get preferred transmitting or recelvmg range.

This preferred embodiment teachs the said separated camera-assembly or called motion sensor-unit (100) has multiple of the circuit or single one PCB circuit and modules which each of the circuit or module has its own functions which may including
(a) Motion/moving detectors sensor and photos sensor module
(b) Bluetooth module or USB port with data delivery sets
(c) wireless communication module
(d) Memory card or connect system to cloud storage station module
(e) sound module
(f) recorder sound module for capture sound
(g) camera module for visible capture functions has minimum MP4 Format digital data
(h) SIM card or slot device
(i) Wireless communication system including Wi-Fi, 3G/4G/5G network or settle-lite channel communication or transmitting or receiving system
(j) back up batteries or power storage device for power fail time do not stop working, and
Has desired electric parts & accessories & IC chip to help all these different or part or all functions modules, circuit to present the pre-determined function, performance, effects.

The electric parts & accessories may has desired combination or at least one selected from motion sensor/moving detectors, photo sensor, speaker, microphone, memory storage device, camera capture system, video capture device, sound capture device, Bluetooth device or USB port for data delivery, wireless communication device, sim card (for wireless communication to send out phone, email, alert, message though the internet, wireless network though market available internet or telecommunication system available from market place), conductive wire, prongs, backup battery (for power fail time for backup power source) so can incorporated with phone owner download APP and related software from internet. So, one of the preferred embodiments of the said separated camera-assembly or so-called sensor-unit has everything except the light source inside the said separated camera-assembly housing.)

FIGS. 12-F, 12-G, 12-H, 12-1, 12-J, 12-K, show some current invention's preferred models to upgrade the current market available non-camera motion sensor security which has different light source, construction, number of light units, shape, brightness, sensor range, sensor distance has built-in Motion sensor or separate motion sensor, or separated wireless motion sensor unit, has IR night vision or without the IR night vision. All these preferred embodiments for FIGS. 12-F, 12-G, 12-H, 12-1, 12-J, 12-K are some of preferred embodiment for the whole sets of the motion security light but not limited to these embodiments.

From FIG. 12-F, 12-G, 12-H, 12-1 show the AC or DC powered by wired or plug-in or other power source connector as FIG. 9G model for all kind of market motion/moving detectors sensor security light which has Par38 or Par30 or other preferred light source (LI) or LED light source (L2) to offer the super bright light beam while the motion or moving or heat been detected by motion sensor or moving detector(s) (M1) which are install on the base (B1) with adjustable frame or arms or join-piece (FI) so can adjust the angle, position, orientation of the said camera (C1) and each of light source (LI) (L2) of the said LED security light has built-in base (B1) or separated housing camera-assembly (M1) also called sensor-unit, will take colorful or even Full HD or 4K or 8K image or photos or video at the same time and get super bright light beam help at the dark environment to take a colorful photos or video and storage inside memory storage device such preferred SD or MicroSD card for low-end products without any wireless system, or wireless transmitting through WIFI or WIFI-extend or-and internet, 3/4/SG network to the cloud storage station for phone owner download APP with software to make instruction, selection, operation for all possible and preferred following work as above discussed.

The FIG. 12-F, 12-G, 12-H, 12-1 show the motion sensor or moving detector(s) (M1) is install on the base (BI) or install inside separated housing (M2), and camera-assembly fit into base (CI), or (C3) install on the separated camera-assembly or called sensor-unit housing. From FIG. 12-F, 12-G, 12-H, 12-1, 12-J show all kind of motion sensor or moving detector (M1) (M2) or camera-assembly install base (CI) (C2) or separated housing (C3) or other installation should all fall within the current invention scope for motion sensor LED Security light for variety construction for FIG. 12-F, 12-G, 12-H, 12-1, 12-J, 12-K for all construction for different arrangement for LED light source, Camera-assembly, Power connection, power type (AC or DC or solar Power or storage power device or rechargeable battery). It is appreciated any other LED security light has same function has LED light source to supply the brightness to help camera-assembly to take color image or-and audio digital data and use wife go through 3/4/SG or-and internet to wireless delivery digital data to cloud to let people use download APP with software from internet to control the LED light or-and camera-system to make following work while owner of phone to use APP software to wireless through 3/4/SG or internet with optional SIM card to give instruction back to WIFI and WIFI-extend to LED security light for setting, adjustment, selected-areas, comparison, calculation, tracing, recording video, take photos, send out audio data, ring bell; should fall within the current invention without any limitation basing on limited embodiments or FIGS. 12-F, 12-G, 12-H, 12-1, 12-J, 12-K show variety combination, arrangement, examples. Any equal functions or alternative or replacement still fall within the current invention which is not same as all US prior art before current invention parent filed on November 2011 with current invention with all update skill or technical including cloud, download APP with software, give back all instruction by APP with software to send back instruction or operate following work.

From the FIG. 12-H is one of the preferred the current invention's separated camera-assembly or called motion sensor has built-in camera (C3) which has adjustable frame or arms or join-piece (F1) so can make easily install, add-on, take-apart, re-assembly for all the market available none camera security light so can replace the non-camera motion sensor to the current invention's built-in camera motion sensor.

From FIG. 12-H other application is to use the same adjustable frame or arms or join-piece (F1) to make this upgrade from Non-camera security light become to built-in camera motion sensor security light instantly. The market available non-camera security light has limited type of base and frame, arms, join-piece so it is very simple to make universal kits to make the replace or upgrade from non-camera motion sensor unit to the built-in camera motion sensor module.

Some time, the camera kits also can has its own housing if required so can make the camera-module also put on the separate unit for special customer-made application is not limited for current invention for security light or more wide as parent filing U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No.

8,760,514, each of which is incorporated herein by reference. to cover all kind of lighting fixture.

From FIGS. 12-1, 12-J, 12-K show more than 18 of some preferred embodiments which has different light source, motion/moving sensor, different constructions, detachable motions/moving product/unit, different motion sensor (Flat or dome or half-ball). Some of embodiment, the power is from DC power source which is solar (Solar 1) (Solar 2) or the inner backup batteries (see FIG. 12-E (126-1) shown for power fail time use).

From FIG. 12-J can see the solar power module (Solar-2) which can use wired or wireless to offer the power to the said separate housing which has built-in camera-unit (C3) and motion sensor (M2) and detected the moving or heat of the moving object(s) and use the inner wire or wireless assembly and kits to deliver or transmit the electric signal to the light device (L2) here is preferred is LED light source and/or send the wireless transmitting digital data though the inner SIM-card and though market available internet or Wi-Fi or internet or other tele-communication channels to send digital data such as email, message, data, image, sound, alarm to people's mobile phone, computer, security system, police station to know the house, residence, office, business area's situation further more can electric wireless multiple-ways communication talk and send out all video or audio data to all parties which more than 2 ways wireless communication or send out pre-determined signals to other device to do pre-determined works, functions. FIG. 12-F, 12-G, 12-H, 12-1, 12-J, 12-K, show 5+18=total 23 different parts and accessories embodiment of current invention's preferred models to upgrade the current market available none camera motion sensor security which has different light source, construction, number of light units, shape, brightness, sensor range, sensor distance has built-in Motion sensor or separate motion sensor, or separated wireless motion sensor unit, has IR night vision or without the IR night vision.

All these preferred embodiments for FIG. 12-F, 12-G, 12-H, 12-1, 12-J, 12-K are some of preferred embodiment for the whole sets of the motion security light but not limited to these embodiments.

The current invention for above FIGS. 12-A to 12-K drawing and detail description is not a new issues basing on the Parent filing which cover all the lighting device as parent filing details listed on U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No. 8,760,514, each of which is incorporated herein by reference. to cover all kind of lighting fixture.

FIG. 12-K show other 18 preferred assortment for light source, built-in or separated sensor products/unit, camera to incorporate with the built-in wireless transmitter-device to connect the Wi-Fi or-and Wi-Fi-extender device or-and more router to get the best functions for far-distance between the outdoor security light to the Wi-Fi or-and router device and apply the Wi-Fi-extender device to increase the distance to make sure the distance and walls do not block-out too much electric-delivery as FIG. 12-J showed the more than one Wi-Fi or-and Wi-Fi-extender or- and more router units.

From FIG. 12-K show all preferred 18 different shape, construction, size, brightness, number of LED-light unit(s) (FIGS. 12A, 12B, 12C, 12D, 12E, 12F, 12G, 12H, 12I, 12J, 12K, 12L, 12M, 12N, 12O, 12P, 12Q, 12R) built-in transmitter-device, or-and separated housing motion/moving products/units which can assembled with LED light device base which is attached on the wall. These 18 preferred embodiments and 5 embodiment of FIG. 12-F to 12-J has brief construction. It is appreciated any similar or replaceable or equal functions construction or concept or applications should still fall within the current and all above discussed parent filed case idea, scope, concept, design features and should be fall within current invention and all parent filed cases' claims.

FIGS. 12A, 12B, 12C, 12D, 12E, 12F, 12G, 12H, 12I, 12J, 12K, 12M, 12N, 12P, 12Q, 12R shown all the Motion and/or Radar and/or other movement detectors for all kind of LED light to turn-on the sufficient LED light source supplying enough brightness for camera or DV or hidden camera or DV to catch/take photos, video, stream image. And after logical-circuit or pre-set image comparison to confirm the real-objects-movement to deliver the image and/or audio data to cloud and people communication, computer products to give notice to phone, computer.

From FIG. 13 show the multiple functions for current invention for any combination. The all features and construction been discussed as above text. It is appreciated that no any limitation for limited text inside this filing. It is appreciated that all the co-pending filing, patented parent, current invention all of claim or disclosure should be fall within the current claim coverage. The flow charter may have different text. Please check the current invention for all same function, equal function, replaceable, alternative words to back up all any confusing words shown on flow charter list.

From FIG. 13 show the most important show the (1) phone owner down load APP and APP software, (2) 3G/4G/5G or internet wireless transmitting (3) receiving APP software signals or instruction back to Wi-fi and LED light device has LED light source and camera-assembly (4) Wi-Fi or Wi-Fi-extend, internet (5) cloud storage station (6) moving detector(s) hardware or-and related software for selected-areas for image or screen comparison (7) camera captured MP4, 4K, 8K image with audio digital data (8) sufficient light brightness supply from LED light source (9) All kind of camera device to offer digital data including photo, video, audio depend on what kind of combination for market requirement.

From FIG. 13 show the current invention have LED light-source and it will be turn on by the Sensor or sensor-assembly (2-1 to 2-8) basing pre-determined function to turn on the LED light to supply sufficient brightness to camera-assembly under dark environment to catch colorful photos, video, stream-image. During day time or bright—environment no need to turn on the LED light-source but still take/catch colorful photos, video, stream-image. The said catch colorful photos, video, stream-image, audio digital data is storage wired memory-unit(s) or wireless cloud storage-station. The built-in or pre-programed IC or logic-circuit or analysis-system or comparison motion & image comparison-program to judge the false or real object-moving result. If it is not real object-moving, the system will not send out wifi wireless notice to people phone, computer or communication device and show the image or video or stream-image. If the judge result is real, the LED light will send out the notice to people at least the phone to show stream-image and optional offer the wireless communication for talking or chat or send out message to police or other people. This is the main features for the current invention with basic light-source supply sufficient light brightness to help camera-assembly to take colorful photos, video, stream-image under dark environment . . . . This is the basic features so no more light-source and camera is separated two products at market place.

From FIG. 14 show the preferred the one of the PIR head with Digital not analog so can prevent from false triggers In summary, the invention provides a light device having a built-in digital data device powered by an AC unlimited power source that supplies unlimited power to the device or DC big capacity of electricity to supplies sufficient power to device, the digital data device including at least one camera having means for capturing images, data, or sound at a desired shooting angle, resolution, color, brightness, and sharpness, and at least one of means for storing the images, data, or sound into a memory and means for transmitting the images, data, or sound to at least one of a communication device, computer device, phone, receiver device, and display device, the digital data device further including at least one of components selected from
lenses, optical components, electrical components, mechanical components, circuitry, an integrated circuit (IC), data delivery means, data storage means, a USB port, a cable, a microphone, record means, display means, sensor means, PIR means, IR means, night vision means, flash means, a switch means, motion detect means, sound detect means, a photo sensor, a motor, and tracking means. The light device includes a housing and means for emitting light beams, and is supplied with power from the power source by circuitry including at least one of a controller, switch, sensor, conductors, integrated circuit, remote controller, and wireless communication means, The light device may be selected from a night light, desk lamp, floor lamp, down light, ceiling light, track light, security light, projection light, flashlight, outdoor light, indoor light, LED light fixture, LED light bar, LED picture light, LED Closet light, LED door light, LED garage light, The light device including LED motion sensor light, LED power failure light, LED light with auto tracking, LED patio light, and LED light device, and may be connected with the power source by prongs, a conductive wire with a plug extending from the light device, a USB adaptor, a transformer device, and an inductor device.

FIG. 15 shown the one of APP screen with all selected areas, functions, controller with optional added screen or image comparison. It is appreciated all the APP software present on the people phone screen to pre-set the selected-areas for detect the object-moving for last-image v.s. the current image to confirm the false or real object-moving result. This can prevent from the motion sensor (PIR) sensor as FIG. 14 shown which have risk to send moving-object while the environment temperature is higher than 36 degree even a hot wind happen on front of PIR sensor front Fresnel lens, it also will send out trigger message. So, the current invention need to have more than one sensor-combination or use motion-sensor & screen comparison or use single screen-comparison or logic-circuit or analysis-system or screen-comparison device to confirm the false or real object-moving so can make decision to send the notice to people phone. This can prevent people phone notice ring and ring all the time for false triggers. This is big and fatal to keep phone or computer only get real notice of real object-moving.

FIG. 16 shown the one of the user interface screen comparison or functions.

From FIG. 17 show the current invention one of the operation's flow-chart. The Security light or LED light device has built-in camera-assembly. The said one or more than one of LED light source has separated own housing which is separated with the said camera-assembly which has all CPU, MCU, IC circuit so can take video or audio under-predetermined program to turn on the LED light source(s) on day time or bright area. The said security light also works under dark environment to take colorful photo, video, image with optional sound or audio to incorporate with wi-fi or wi-fi-extend to deliver to cloud storage station under the LED light source turn on to offer sufficient brightness. The said full color image, photo, video with or without the audio digital data delivery into cloud storage station and the phone or computer owner download the preferred or pre-program APP has designed software to remote control the said LED light device or the said camera-assembly on far away from the home or office or residence wi-fi or wi-fi-extend location. The said APP with designed software is download from internet. These
controller or adjust or setting or selected-areas or make comparison, detection, send out message, send out alarm signal, call for police or people all need download from internet and use wireless send instruction to the used wi-fi to connect with the said camera-assembly or-and LED light source. So, the current invention has to connect or link with APP and its software outside the said camera-assembly or-and LED light source. This is not similar with Farmer prior art filed on May 2011.

Figure 18A:
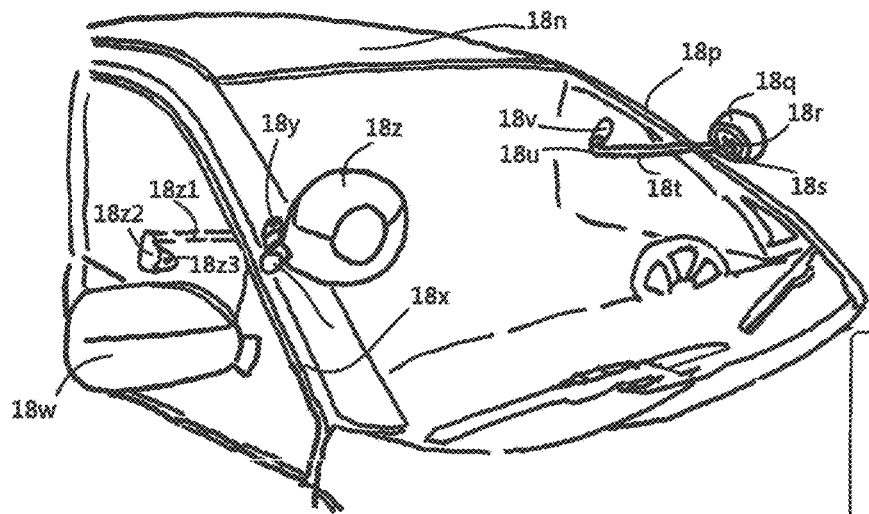
FIGS. 18, 18A, and 18B show the torch light on traffic-equipment at least is one of preferred embodiment including the moving vehicle or moving device, boat, bus, ship and torch light offer super brightness LED light beam with built-in camera-assembly to update the current torch light for police without built-in camera-assembly.
Figure 18:
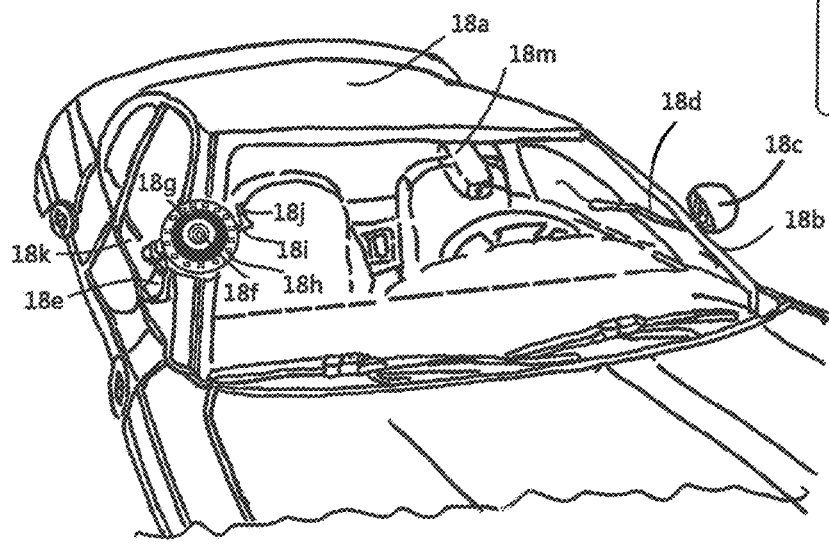

From FIG. 18 show the LED light has built-in camera-assembly for traffic equipment or device or moving traffic device including motor-cycle, vehicle, RV, mobile home, boat, ship, train, air-craft which has LED light to offer the sufficient brightness under dark environment to let camera-assembly to catch colorful image or photo or video or update steam image incorporate with wi-fi or wi-fi-extend wireless transmit to cloud storage station and send signal to owner of phone or computer or monitor to connect the pre-download APP and use APP software to get digital data to make setting, adjust, select-areas from image or screen-image. The said full color image, photo, video, or-and audio device inside cloud and allow APP software or other CPU or MCU or IC or Circuit to make further analysis, comparison, recognition, detection, calculation, set group for moving people or objects or merchandise including (1) facial recognition, (2) crime tracing, (3) auto tracking moving people with purchase merchandise, (4) make calculation for people purchase merchandise for type, quantity, unit price, total sum for financial calculation, (5) comparison or detection for moving people or-and merchandise from screen image or camera-image to prevent non-necessary trigger signal or alarm deliver to owner of phone or computer, (6) analysis or built-habit or compare peoples or group people behavior, (7) detect, trace, analysis for moving people or merchandise or products or objects related movement.

From FIG. 18 show the one of traffic equipment is a police or security car (18*a*) has body parts (18*b*) can install current LED torch light (18C) on the car frame (18*b*) and has control bar (18*d*) which can adjust the said LED torch light (18*c*) to desired location, orientation cover all x-y-z axis. This made a big improvement for current all police car use the head-lamp as light source to supply sufficient illumination under dark environment to let built-in camera-assembly (18*m*) to take full color image, photo, video or-and audio digital data so this kind of out-of-date equipment only can take image in front of the car head-lamp and all rest area not in front of car is impossible. Also, the out-of-date police car without link to cloud and can operate by all other police-teams or police-mans from their phone carried by police colleague or computer system inside the car. So, the current invention to built-in camera-assembly into torch light made big improvement for police to do their duty under dark environment to take any orientation or position crime for digital data recording or steam-display to all colleague or police station or police central internet station.

From FIG. 18 the one of transportation equipment is car (18a) has body parts (18K) to install a base of torch light (19e) and base and arms to support the LED torch light which has built-in camera-assembly (19±) and preferred super bright LED COB (chips-on-board) (18g) light source or-and plurality of super bright LED-dice or LED-chips or LED-unit (18h) to offer super brightness illumination up to 300 feet or 100 meter or more far distance so can let camera to take clear and color image or photos or video with audio digital data to instantly transfer to wireless transfer to cloud storage station. It can have Wi-fi system built-inside the areas or through the current invention FIG. 14 for built-in Sim card so can go through the wi-fi or sim card system and 3/4/5G and internet. The said car torch light has the control bar (18i) and controller which may has plurality of controller or adjust-switch to change, set, adjust the said LED light brightness, LED light focus, camera zoom, light or camera shoot angle, distance, or other adjust or setting or pixels or sound or microphone audio adjustment or setting, take photo during take video, position or location or orientation detection and wireless pass to colleague or control center for GPS of crime or car or moving objects.

From FIG. 18A, show the one of preferred traffic equipment here preferred is car for police or security which has car (18n) has two side car body-frame (18p) (18x) has install the LED torch light (18q) (18z) both has base (18y) to solid install movable to any location of x-y-z axis LED torch light and the torch light has connected with inner car control-bar (18t) (18z1) and control-switch (18u) (18v) (18z2) (18z3) so can adjust or set or change all details, angle, light brightness, camera shoot properties, camera shoot quality, LED light beam distance, camera-assembly shoot and wireless transmitting functions.

Figure 18B:
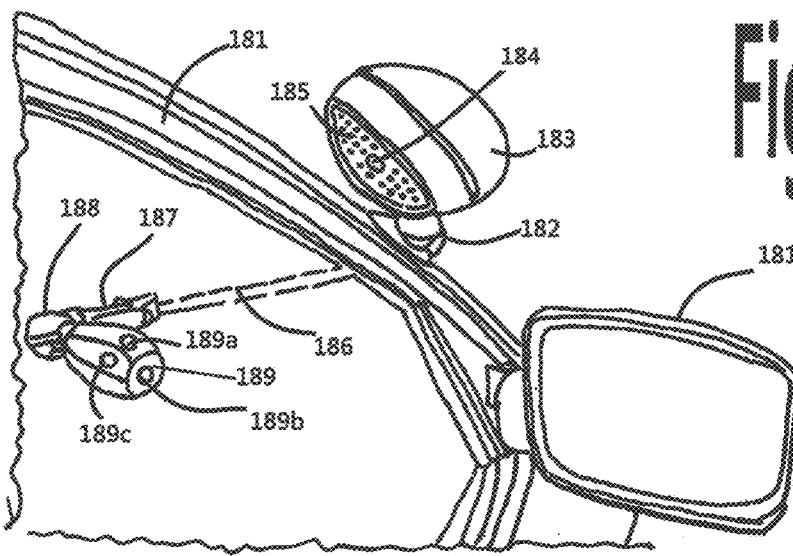

From FIG. 18B, show the LED torch light install on traffic equipment which has the body-frame or body-parts (18l) to install the torch light base (182) and the top LED torch light (183) which has camera-assembly (184) or camera-lens (184) to allow preferred high-power LEDs in COB or dice or chips or dip types to supply sufficient illumination to camera to take full color image, photo, video or-and sound, audio under dark environment. The outside torch light connect with inner control-bar (186) and control-bar has built-in plurality of switch, may in any type such as knobs (187), twist switch (188), touch switch (189), conductive switch (189a), push on-off switch (189b), slide switch (189b), rotating switch (189c), or rotatable or push-up or back or position switch (189) so can make all kind of setting, adjust, selection, zoom, focus, or other related all setting or adjust, or control. The said LED light device at least including LED bulb or security light or flashlight or garden light, or torch light, or other LED light source which can get the full color image of photos or video which also can incorporate with the phone owner download APP software which including image or-and screen comparison to make sure the selected-area(s) or person(s) or face(s) or object(s) including (1) movement or-and moving (2) face recognition (3) Identify the person (4) pick-up item(s) (5) other behavior or action to go through the other pre-determined interface or computer-analysis or cloud-system to get digital data including one or more than one functions selected from (AA) moving or movement status, (BB) personal identification including face comparison, (CC) pickup items and wireless to calculate the total items pickup and total amount been pickup, (DD) detect the payment or-and stolen (EE) calculate the personal bank account or i-pay, electric payment system, pay-pale, google pay or other wireless payments related to the personal account (EE) habit and times and items and time and place and objects for purchased.

The current invention for LED bulb which connect the female bulb-socket is the most simple connect with AC power source with optional extendable or retractable camera or-and motion sensor or-and moving detector or-and screen-comparison features to connect with Wi-Fi or-and Wi-Fi-extend to get clear digital data including image or video with audio to connect with cloud and computer system which phone owner download APP has desired software or APP has pre-program to get image or-and video or-and audio to input the computer system to do all kind of analysis or calculation or saving or comparison or operate the personal face, identification, purchase, movement, behavior to make record, calculation, payment from Wi-Fi, or-and Wi-Fi-extend, or-and cloud storage-station, or-and remote control, or-and screen comparison, or-and screen calculation pickup items and connect with financial accounts for finish the business, purchase, trading behavior, or-and face recognition to find people wanted or compare with crime analysis, or-and other personal analysis and storage and comparison. This is the best personal identification because (1) simple to connect with power source by the bulb-base to bulb-socket (2) The extendable and retractable parts to load the sensor(s) or-and any kind of camera can fit into recess light deep hole on ceiling and overcome all possible block-object including ceiling wall because the ceiling bulb-socket is always on top of ceiling which is the lowest block-objects such as people height, displayer height, stores racket, poster . . . etc. So, the current series LED bulb with extendable or retractable parts, pole, bar, cylinder, tube with angle adjustable or length tightness parts is one of the best applications for no people stores.

Other best application to prevent from the residence or office or stores safety is security light incorporated with the all kind of camera basing on above discussed with Wi-Fi, or-and Wi-Fi-extend, or-and internet, or-and cloud storage-station, or-and motion sensor to turn on/off light under dark environments, or-and moving-detector hardware or screen-image comparison to determine the wireless transmitting signal(s) to communication device, or-and multiple way communication for all kind of audio-type, or-and phone owner download APP with desired software or APP has pre-program software to make selection, control, adjustable, or-and 3G/4G/5G or internet or more high speed network to connect with Wi-Fi or-and communication device. This is best home, office, stores safety protection and whenever the bad guys get into selected-areas covered by the current invention security light has above listed function, the owner of house, office, stores can instant know without false signals so can use built-in or auto-dial or manual dial to security, police, friend, neighbor to catch bad guy at once whenever they interrupt into the people properties.

Other best application for current invention is for security or police or military to have the current inventions LED flashlight has all kind of camera to take the photos which not only for flashlight light for police or security but also for the LED torch light on police or security light which has built in camera. Thus, the police or security light can use the body-carried flashlight or built-in on cars torch light with built-in camera to take the running bad guy to record the colorful image under dark environment. The said flashlight light because only has limited battery life so preferred only storage the colorful image into memory-unit such as SD card or Micro SD card. But for car torch light which is perfectly because normally police or security use the car-headlight to offer sufficient light brightness to the built-in recorder equipment but this kind of car head-light only emit light to front areas without change direction at all, so the current invention for police car torch light can adjust to any angle wanted, so to make the current invention for LED torch light has built-in camera device so help police or security to get desired colorful image or-and audio to any direction . . . . Also, the car torch-light has the built-in all kind of camera device and can adjust desired angle to offer full color or HD 1080 or-and video to support the crime scene evidence is the other one best of application From above discussed text, figure, drawing, flow charter, function working charter, The current invention features also should be cover: A LED light having a built-in camera including digital data device consist of: said LED light has preferred LED light source(s) and at least one of motion sensor including PIR detector, or moving detectors with comparison functions, wherein: said digital data device includes: at least one camera having function(s) for capturing images, data, or sound at a desired shooting angle, distance, resolution, color, brightness, and sharpness in MP4 or more high speed format to take photos or video for pre-determined time, period of time for certain times, and at least one storing kits or station for storing the said images, data, or sound into a memory or storage kits or cloud storage station for (1) an USB set or electric device or wireless set to download, or/and (2) a delivery-tool to deliver the said images, data, or sound by connection system or transmitter to at least one of a communication device, computer device, phone, receiver device, display device; or for display or replay or reply or answer of the images, data, or sound by the digital data device itself; said light device includes a housing and function(s) for emitting visible LED light beams offer sufficient brightness to camera unit to take colorful photo(s) or video(s) into MP4 format digital data with sound and other data under the dark environment, said LED light device has AC-to-DC circuit to operate the DC LED light source, and optional circuitry including at least one of a controller, switch, motion or moving or photo or other sensor, conductors, integrated circuit (IC), remote controller, and wireless connect system, communication assembly and the said LED light having desired combination functions select from:

(1) MP4 of higher rank digital data is storage into memory kit or card, or save into cloud storage station, and download to display, replay, reply;

(2) or digital data can use electric device or Bluetooth or USB set by wire or wireless tool(s) to download and displayer, replay or reply;

(3) or digital data delivery by Wi-Fi or-and Wi-Fi-extend or desired wireless connect system with APP software with optional added features including but not limited to select moving detect-areas incorporated desired pre-program software for certain functions and cloud storage-station(s) through wireless network, 3G or 4G or update wireless network, router, server(s) to operate message, data, alert, words, and preferred to incorporate with apps, other programed-software to deliver by emails, line, skype, WhatsApp, or update platform(s) software to variety of communication or computer or consumer electric products or-and software to make personal identification, purchase, crime comparison from colorful or HD I 080 or image took by all kind of camera equipment, which can connect with 3G/4G/incoming 5G connection system to communication device(s) including mobile phone, computer, monitor;

(4) or LED light device have multiple-ways communication assembly to talk and hear and other audio-effects and to review by microphone or-and speaker through Wi-Fi or-and optional added Wi-Fi-extend and wireless network, 3G or 4G or update wireless network, router, server;

(5) or LED light device while incorporate with related program(s) software can selected moving detected-areas, compare selected-areas for moving or movements, or-and remote control camera angle, position, orientation or-and selection, adjustment, changing setting, and talking or delivery audio-effects though LED light device;

(6) or LED light has motion sensor/moving detector or other sensor unit or module which only has motion sensor/moving detector/or brightness or other sensor act as switch or comparison equipment just to turn on or turn off all LED lighting or-and camera or- and digital data function(s) which motion sensor/moving detector/brightness or other sensor can be (a) install with camera or separated with camera, or
(b) install module inside of LED light wall mounted base without its own housing, or install unit outside of LED light wall mounted base has its own housing and assembly with LED light base, or
(c) the motion sensor or-and moving detector incorporated with all kind of camera install inside one individual housing to assembly on wall mounted base of said LED light device by screw-assembly and tighten kits. The said individual device has all functions as above discussed camera, motion sensor, moving detectors, Wi-Fi, wireless communication, wireless delivery video, photo, audio, wireless connect to APP, 3G, 4G, SG, cloud storage station, connect with preprogram APP has detected-areas or personal face recognition or other comparison features for people, products, items, object to input to computer system or cloud system to get desired digital data and record and delivery desired signals for certain purpose; and this kind of individual unit has any desired combination except the light-source will use LED or use the existing light source while the security light has no camera functions but has its own any of light-source (LED or any others);

(7) or LED light has motion sensor/moving detector(s) or other sensor unit which has separated own housing not install inside LED light wall mounted base, and (7-1) at least has built-in camera and memory kits or-and
(7-2) has parts or all of digital data operation including
(7a) USB download set or wireless transmitter or receiver for download work,
(7-b) communication to wireless Wi-Fi, 3G/4G/incoming 5G network, cloud storage station, APP or other programed software has optional screen or image-comparison to make sure not non-necessary movement so not send out electric-signals for hundred times while trigger by cat, dog, street cars, or moving objects is no harm to residence or house or office
(7-c) deliver digital data to display, phone, computer, displayer, monitor functions has optional added screen selection or-and screen-comparison or- and image-comparison for moving people, object, merchandise, products and send out pre-programed digital data or following pre-program(s) operation
(7-d) operate for other selected or added functions basing on all kind of camera took colorful image or-and audio with pre-programed software to make comparison, identification, calculation, selection, payment, account management by related electric or mechanical parts and accessories so can fit the said separated housing motion sensor or-and moving detectors or-and other sensor unit to non-camera LED light device including motion security light, or LED bulb, or car torch light, or flashlight or garden light or patio light not including street light to upgrade and increase value and functions, said LED light device is connected with the power source by one or combination of (a) prongs, (b) conductive wire, (C) a conductive wire with a plug extending from the light device, (d) a USB adaptor, (e) a transformer device, (f) a power fail backup power storage device (g) an inductor device for wireless charging inner power kits, (h) AC plug-wire, (i) male bulb-base assembly with female bulb-socket.

The Wi-Fi extend, or extender prolongs the connection range between the current invention and home or office Wi-Fi router to link the current invention to the internet. The Wi-Fi extend, or extender also serves as a conduit between APP software and the current invention to execute desired functions of the current invention. In order to achieve said transmit functions between APP and the current invention, the Wi-Fi extender or extender will not only transmit internet signals but also provide APP functions for long-range connections between APP and the current invention.

The said different generations of cellular wireless transmissions: 1G, 2G, 3G, 4G, 5G, etc. began around 1980 for 1G, 1992 topped at 14.4 kbps for 2G, 2001 topped at 200 kbps for 3G (began commercially in US by Verizon Wireless in July, 2002), 2011 topped at 42 mbps for 4G (began commercially by International Telecommunications Union (ITU) after their press release on Oct. 21, 2010). All the information is acquired from public documentations websites such as Wikipedia.

The said cloud services and storages functions began when Amazon.com enabled the Elastic Compute Cloud, which started on August, 2006, followed up by Microsoft Azure in February, 2010, followed up by Rackspace Hosting and Nasa, Open stack, on July 2010, followed up by IBM Smart cloud on March, 2011, followed up by Oracle Cloud, on June 2012, etc. All the information is acquired from public documentations websites such as Wikipedia.

The said Facial Recognition or Comparison software began history after Bledsoe's research. In 1966 standard University has a database for recognitions approximating at 2,000 photos. The first time AI technology shined the most was back in 2002, when Super Bowl used AI to identify people with Criminal Records. In 2009, more than 170 deputies on US Highway equips cameras for cross-referencing civilians. Until now, Facebook has photo facial recognitions for each photo to be tagged at. All the information is acquired from public documentations websites such as Wikipedia.

The said Artificial Intelligence (AI) has been a strong asset for daily workers since the 1956s. AI has been providing help for mathematical equations, data mining, logistics, etc. In the 1980s, Japan had developed fifth generation computers with strong AI functionalities. Has developed two strong computing modules since the beginning of AI history: expert systems and intelligent agents. In the $21^{st}$ century, since the generalizations of strong processing personal computers, AI has always been providing assists for workers. All the information is acquired from public documentations websites such as Wikipedia.

The said touch panel, or touch screen's history began in the first patented tablet used for air traffic control in 1969. Then Bell Labs developed a multi-touch device with interact able function with 2 hands in 1984. In 1992, IBM Simon released a so-called first "smartphone" with a touchscreen. In 2007, Apple released a new touch-only phone iPhone that nobody has yet to seen. In the modern days, the touchscreen or panel technology has been expanded to desktops, laptops, smart home functionalities, etc. All the information is acquired from public documentations websites such as Wikipedia.

Figure 19:
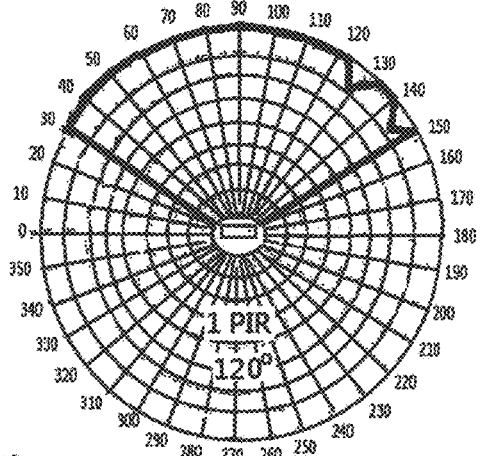
Figure 20:
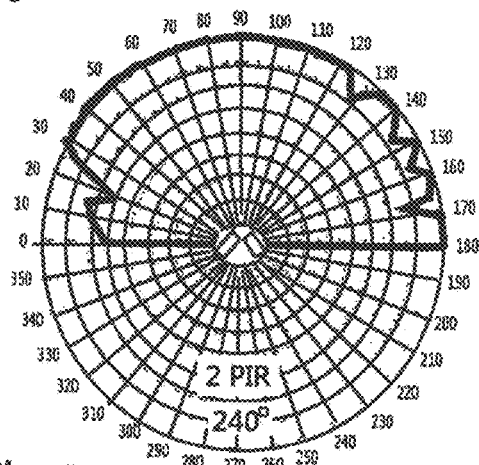
Figure 21:
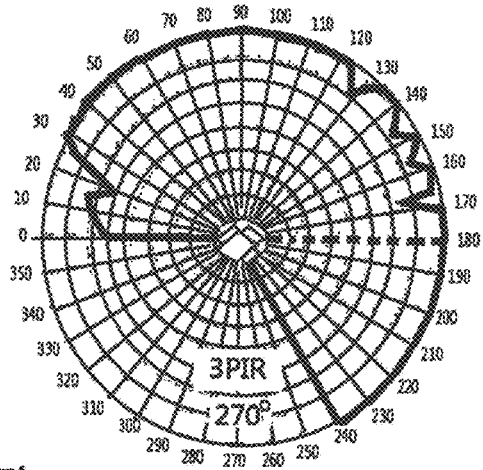

The current invention makes big improvement for PIR motion-sensor limited degree of detect-angle problem as above FIGS. 19,20,21 show for each one of PIR sensor-head for around 120 to 150 degree. If need more wider detect-angle need to add one or more PIR sensor-head(s) to get up to 240 to 270 degree or detected the up & down levels.

However, to apply the current invention FIGS. 37 to 39E microwave-sensor can get the FIGS. 19 to 24 for both 360 degree of surrounding areas with variable distance and hi-low areas in y-axis detection-areas to offer the best sensor-range and sensor-levels than PIR motion sensor.

Furthermore, the PIR motion-sensor is very sensitive for environment or ambient temperatures because PIR motion-sensor is detect the moving-object(s) body temperatures so while the environment or ambient temperature is higher than human-body temperatures such as 38 degree Centigrade (° C.), the PIR sensor-head will be affected and send out false-trigger. This is major problem while the world environment is higher and higher for many locations all over the USA and other continental. The current invention for microwave-sensor is not affected by the environment temperatures, moisture, water, dust is the Biggest benefits for current invention to incorporate with microwave-sensor for all LED or COB LED or Organic EL or Organic LED or laser light source.

The $3^{rd}$ features for current microwave-sensor has penetrate wall, glass, fence, wood, pottery, brick, cement or all other material except the metal which is impossible for the PIR motion-sensor so the said PIR motion-sensor is not able to fit within the glass, lamp shade, lamp cover for many lighting applications.

The $4^{th}$ feature for current microwave-sensor penetrate glass, wall, fence, brick, cement properties can offer people not only the detect the indoor, garden-area, patio-area, pathway, drive-way, but also outdoor, outside garden, outside patio, outside pathway, outside drive-way adjacent-areas, walkway, garden also fall within the detect-areas and turn on the said desired device for examples the plug-in wall outlet, desk lamp near the wall, floor-lamp near the wall, security light on top of garage door, door-bell or entrance light install on the entrance door adjacent wall, or garden light near the garden fence or garden wall or garden tree-bush. These near-wall or near-fence or near plant or near tree-bush installation night-light or garden-light or patio light, landscape light, light-string, project-light, security light while install on traditional locations and also will triggered and turn-on while people not only in outdoor or indoor but also will be triggered by indoor or outdoor because the light-device or other device has built-in microwave sensor can penetrate the wall, dividers, glass, wood, cement wall, fence, wood, plant, bush.

Basing on the above four major features for current invention, hereafter has details descriptions;

From FIGS. 19, 20, 21 shown PIR motion-sensor for actually walking testament for trigger point from each 10 degree for whole circle 360 degree with distance from center to each circle.

The FIG. 19 show the only 1 PIR motion sensor test result normally only can get 120-140 degree basing on the PIR motion sensor Fresnel-lens is good design or copy unit.

From FIG. 20 shown the 2 PIR motion sensor light its walking testament data which has 2 PIR-heads has angles between the 2 PIR-head and each face the different front-areas. Basing on the 1 PIR-head normally get 120-140 degree so the 2 PIR motion sensor will get 240 to 280 degree, however, because the majority manufactures only use copy Fresnel lens and wrong design for the PIR-head(s) related angle so majority market 2 PIR motion sensor get only 180-220 degree but the cost is dramatically raised because need pay for one more PIR-head and bigger Fresnel lens.

From FIG. 21 shown the 3 PIR-head(s) basing on one of PIR-head can get 120-140 degree detect-area and around 100 feet distance so the 3 PIR-head(s) should get over 360 degree however, basing on the wrong arrangement for 3 PIR-head(s) for each related position and use copy Fresnel-lens so market only get max only 270 degree. However, this also have big issues for cost need to add 2 more PIR-head(s) expensive cost but only get limited angle increase and not up to desired 360 degree.

From FIGS. 19, 20, 21 for PIR-motion sensor for cost and detect-areas analysis, the other big trouble for PIR motion-sensor is very sensitive for environment or ambient temperature and this is very bad for current worldwide strange weather especially for summer for hot weather.

PIR motion-sensor mainly to detect the moving-object(s) body temperatures, other words the PIR motion-sensor detect the Centigrade temperature range around 36 to 38 degree (° C.). However, during summer even for night time majority areas has outdoor temperature is over 36-38 degree (° C.), so many false triggers happened all the time.

The PIR motion-sensor need front Fresnel to collect all incoming electric-signal and which has a lot optic-lens designs on surface which is other big problem to get accumulated dust, ash, sand so will block the electric-signals to transmitting and receiving. This is $2^{nd}$ major problem for all PIR motion-sensor for period of time it will out of standard function because affected by ash, dust, sand . . . etc.

The PIR motion-sensor electric-signal is not able penetrate the glass, lamp shade, brick, wood, cement, or any other material. So, all PIR motion-sensor device have to Fresnel-lens exposed to people so can operate pre-determined functions.

Figure 22:
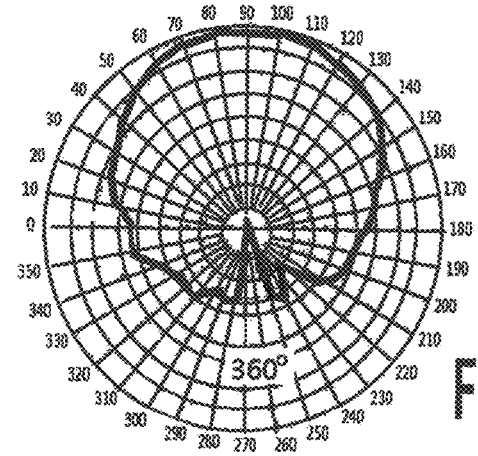
Figure 23:
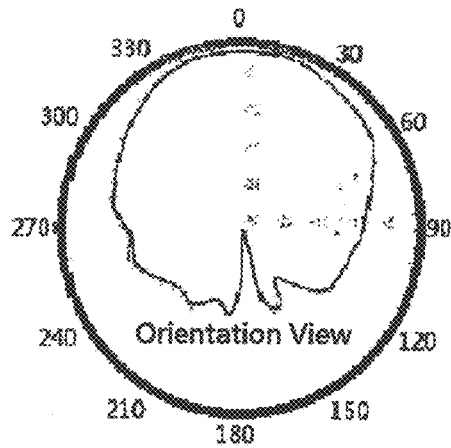

From FIGS. 22, 23, 4 shown the current invention for microwave sensor which is install within the housing because microwave sensor can penetrate the glass, lamp shade, brick, wood, wall, cement, floor material. It also can penetrate the different floors (height) within the designed range in y-axis that is means high-and-low such as FIG. 24 It also the microwave sensor can cover all 360 degree as FIG. 22 even deducted the some blind-area which no trigger-points for walking-test such as FIG. 22 still has 20 degree less than 360 degree.

From FIG. 23 shown the microwave-sensor for detect-areas in X and Y-axis which cover whole 360 degree.

Figure 24:
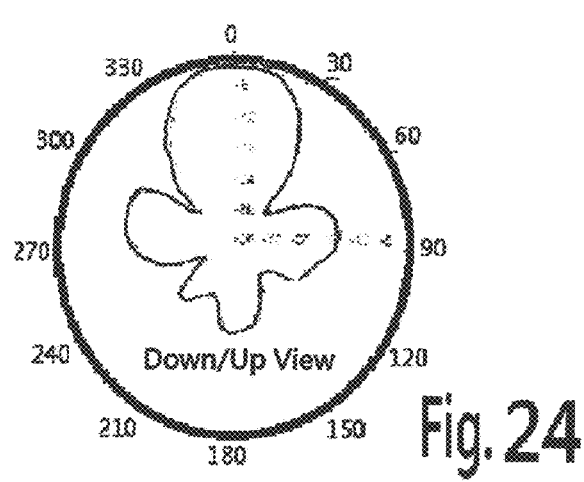

From FIG. 24 show the microwave-sensor for detect-area in Z-axis which cover the vertical distance to cover the high-and-low levels, so the device installed on the ground-floor it also can be triggered on $2^{nd}$ floor while people on $2^{nd}$ floor walk into the trigger-areas. For examples, the desk lamp is installed near the wall, or plug-in night light plug-into wall outlet which only 1 foot above ground level floor, or outdoor security light install on ground-floor garage door, while people walking on $2^{nd}$ floor near the sensor-range of micro-sensor so the desk lamp or night light or security light can be triggered. This will help people had free security light device and give bad-guys or theft or burglars a instantly light brightness to let bad guy back off for bad idea. This will scare the bad guys ran-away because someone notice bad-guy interrupted house, garden, driveway and people no risk for harm because people on the $2^{nd}$ level or indoor which is far-away of microwave sensor application lighting or other device. Those microwave-sensor application lighting or device has detect-areas as FIGS. 25 and 26 show.

From FIGS. 27, 28, 29, 30, 31, 32, 33, 34, 35, 36 shown the different areas including indoor living room, bed room, bed room, garage, garden, patio, drive way, path way has install the said microwave-sensor lighting or other device including but not limited for alarm, RF receiver device, sound maker device for all kind of market available (1) desk/Floor/ceiling lamp, (2) night light, (3) power fail light, (4) light-bar, (5) light-string, (6) cabinet light, (7) garden light, (8) Patio light, (9) landscape light, (10) security light, for indoor or outdoor use, for different power source including but not limited for (a) AC, (b) DC, (c) outside transformer, (d) energy storage device of solar, chemical, wind power, (e) power bank.

From FIG. 27 can see The LED light device including night light (9a) install on indoor living room and one desk lamp (9b) install near the wall and one light-bar or 3 LED-unit restroom-lighting (9c) install on wall; those all had built-in microwave-sensor to detect the indoor x-y axis surface basing on the microwave-sensor specification. While people walk within the detector areas (circle) will turn on the said LED light device (9a) (9b) (9c) respectively. Because the microwave-sensor detect-areas is almost cover 360 degree in x-y surface so while people (p1) (p2) (p3) walk within the microwave-sensor detect-area of outdoor, the indoor installation LED light (9a) (9b) (9c) also will be triggered and turn on under pre-determined functions and effects. If the People (p1) (p2) (p3) is bad guy and close the people housing, the indoor light will instantly to turn-on, so bad-guy will see light is turn-on and think people is alert someone get into residence house so will give-up or back-off from bad idea. This is the one features of the current invention to apply the microwave-sensor which not only can be trigger indoor but also can triggered at outdoor basing microwave-sensor has almost 360 degree detect-area and also can penetrate all material wall except the metal wall or material.

Same as the FIG. 28 show the indoor have built-in microwave-sensor plug-in light or AC-Plug wired LED light device including desk lamp (10a), night light (10a), light string (10b) or multiple LED light LED ropes (10b) which has pre-determined detect-areas depend on the different specification of the microwave-sensor design. While people walk fall into the microwave-sensor detect-area indoor will turn on the said LED device (10a) or (10b). Basing on microwave-sensor detect-area cover almost 360 degree and can penetrate the all kind of material except metal so even people walk within the detect-area(s) even at outdoor still will trigger the said indoor LED light device such as people (p4) (p5) (p6) will trigger the indoor lights (10a) (10b). This also offer people while they back to home and fall within the detect-areas, the people can get good brightness before step into home. This is much convenience than the RF remote controller or the said Smart home appliance which need get into home and PIR Motion sensor detect people movement. However, the PIR motion sensor is very sensitive for ambient temperature is higher than people body temperatures 36-38 (100° F.) degree, PIR motion sensor is not reliable for false trigger. Especially during summer season, outdoor temperature over 100-140° F. will cause indoor temperatures easily too high to make PIR had false trigger. The microwave-sensor is no affected by the temperature so this is most reliable sensor.

From FIG. 29 shown for (A) LED outdoor security light (11a) which is AC-wired or Solar-powered or connect with outside transformer AC-to-DC power source which hang-on wall or install on the top of garage, or (B) LED indoor or outdoor Security light (11c) which is battery powered light with 1 or 2 or 3 angle adjustable LED-unit(s) which use preferred batteries and install on top of the fence (11b), wall (11b) of the garden, backyard, garage door, patio, building or on the ground; those had built-in microwave-sensor so can cover sufficient detect-area(s) almost for 360 degree and can the all kind of material except the metal material. From FIG. 11 can see the security light (11a) install on top of garage door with desired detect-area in x-y axis surface to detect the person (p7) activity and turn-on the light. It also can turn on the light (11a) while the indoor people (p8) walk fall within the detect-areas which offer people convenience while at dark environment people (p8) want to go out from garage door has sufficient light brightness before step out. The battery powered LED security light (11c) also had other features is while people (p9) near-by the wall of resident house or building instantly turn on the light (11c) so give the brightness or alert to the person (p9) can offer illumination or warning signal to person (p9).

From FIG. 30 shown the outdoor garden, landscape, patio, backyard areas which has all king of light-string, landscape light, or landscape light-string, garden light, accent light, floor light, torch light, or garden projection light or garden projection light-string has more than one functions, other LED or laser or both light device with built-in microwave-sensor to detect moving-objects within the X-Y axis and Z-axis areas. The said LED or laser or both light device such as plug-in outlet or outlet pole LED light (12a), or AC-plug wire or low-voltage powered or solar powered garden light (12b) or project light (12d) or patio light-string (12c) or landscape light or light-string (12c) the all kind of light-string (12c), or other LED or laser or both lighting device can trigger by indoor people (P 11) or outdoor passing-by people (p10) or (p11) so can save the outdoor LED or laser or both light device to turn on and turn-off under pre-determined time period with desired chasing, fade-in and fade-out, gradation, color changing, color selection, functions section, brightness setting or adjustable, dimmable, sound activated, photo sensor controller, RF transmitting from microwave-sensor to other device which has built-in RF receiver or $2^{nd}$ RF-transmitting device to $2^{nd}$ ground of other device(s) which has built-in RF receivers. So, an make the said outdoor all kind of light, light-string, flood light, torch light, garden light, project light to activate under pre-determined functions, also can give good or bad people (p10) (p11) for illumination or give warning alert to let them give up bad idea.

From FIG. 31 shown above discussed FIGS. 9, 10, 11, 12 which show the all locations applications including indoor (13f), drive way (13g), living room (13h), bed room (13i), patio (13j), garage (13k), garden (13m) has all kind of LED or laser or both light device including plug-in outlet, AC-plug wired, low-voltage connected power source, solar powered, battery powered, outside transformer powered device including security light (13a), or power fail light, emergency light, flashlight, multiple functions light, multiple changeable functions light (13b), or desk top light, reading light, lantern (13c) or all of purpose light-string, landscape light, landscape light-string, floor light, torch light, projection light, garden light, seasonal/holiday light string (13d) for people (p15) (p16) (p18) (p19) (p21) (p22) (p24) for indoor or garden or patio or living room or rest room, bed room walking to trigger the said LED or Laser or both light device for desired functions. It also can give walk-by people (p13) (p17) (p20) (p23) illumination or warning alert while they close people (p15) (p16) (p18) (p19) (p21) (p22) (p24) housing or residence or garden or backyard or patio areas.

From FIG. 32A shown the indoor has LED or laser or both light device here is one of desk or floor lamp (13a-1) or night light (13b-1) which near the wall or corner so allow people walk within the built-in microwave-sensor detect-areas to turn on and turn off under desired functions. The people (p26) (27) (p28) walk within the detect-areas also can trigger the said LED or laser or both light devices.

From FIG. 33 show more details for two of preferred LED security light one is AC-wired or AC-plug wire or Solar powered or built-inside or outside transformer powered security light (14b) is install on top of garage door (14a) which has microwave-sensor face outside so can have desired big detect-areas on outside and also has small detect-areas for inside of garage door (14a) so while people inside also can trigger the security light (14b) for offer illumination before people step out to garage-door. From FIG. 14 also shown the $2^{nd}$ battery powered security light (14e) has built-in 4D or more big power DC energy storage unit(s) which is install on outdoor wall (14c), or sit on the wall (14c) or patio (14c) which also can offer big detect-areas for outside areas and also the indoor people can trigger the light (14e) while feel something is at outside. This is more practically than any PIR motion sensor LED or Laser or Both Light device which only can detect narrow angle in front only, Not cover the almost 360 degree and never can penetrate the glass, lamp shade, wall, window, fence, building material, cement at all.

From FIG. 34 shown alternative for living room installation for LED or laser or both light devices can trigger not only from front of the microwave-sensor but also can triggered from outside wall people (p31) (p32) (p33).

From FIG. 35 same and alternative the said LED or laser or both light devices are put indoor on corner location which offer more wider detect-areas at outdoor which can detect people (p34) (p35) to trigger the light device (16a) (16b) (16c)

From FIG. 36 shown the garden or patio or backyard area has installed the LED or laser or both light device (17b) which can trigger inside the garden, patio, landscape, backyard areas and those light (17b) also can trigger by people (p36) (p3'7) walk within the detect-area(s) which is outside the garden, patio, landscape, backyard (17d) (17e).

From FIGS. 37, 38, 39, 39A. 39B. 39C. 39D, 39E with details description for

FIG. 37 shown working flow charter apply for Doppler theory, and

Figure 39D:
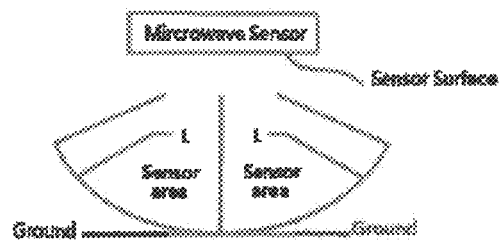
Figure 39E:
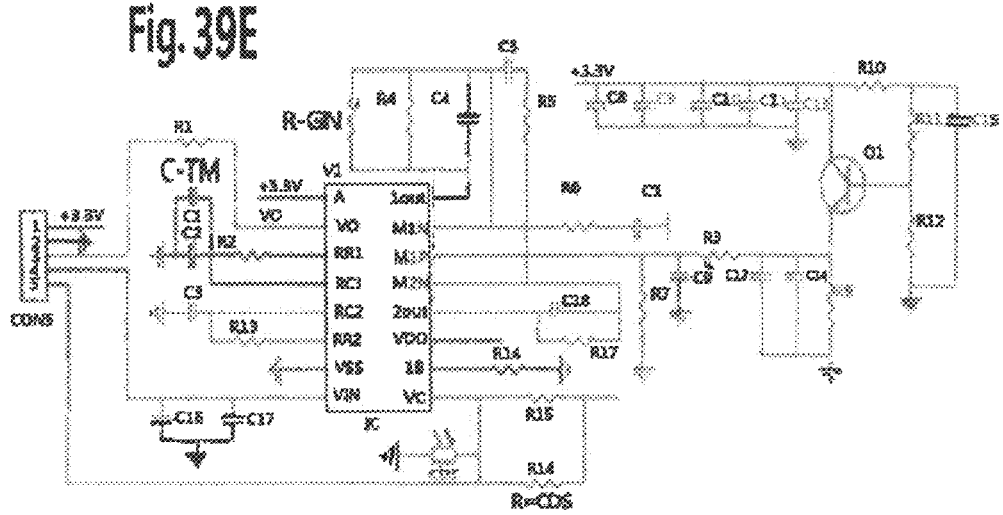

FIG. 38 shown one of preferred circuit for microwave-sensor,

FIGS. 39A to 39C shown the One of preferred microwave sensor diagram with parts list, FIG. 39B show the one of preferred for DC current connection application, FIG. 39C shown the one of preferred embodiment connection for AC application, FIG. 39D shown one of preferred module for microwave sensor for detect-area, FIG. 39E show other preferred circuit diagram for microwave-sensor, It is appreciated any alternative, replaceable, equal functions of above discuss for market available microwave sensor circuit, diagram, flow-charter as long as offer the x-y axis for approximately 360 degree detect-area or-and Z-axis for height detect-areas should still fall within the current invention scope, idea, concept, construction and should still belong and fall within the current claim scope and range.

From FIGS. 39F, 39G, 39H, 39I, 39J, 39K, 39L, 39M shown some preferred embodiment for battery powered security light. From FIG. 39F show the Battery operated security light has main-housing (228a) which has 4 D batteries inside to supply sufficient power to the at least two of Light-unit (228b) which has respectively adjustable or- and foldable arms (228c) (228f) which can adjust angle on vertical and horizon from 100 to 360 degree and some upgrade model also can fold the light-unit (228b) and into a cube or rectangular-unit to save the delivery cost because the size and dimension for foldable construction can save packing measurement to save delivery freight or storage-space needed. From FIG. 39G show the similar with FIG. 39F difference at the light-unit (229b) from rectangular to the round or oval shape of the Light-unit (229b) and has different ventilation hole which is grill like or slot like ventilation holes (229f) which can evacuate the heat but also can prevent water get into.

From FIG. 39H show the three Light-units (230d) (230f) (230j) and has main-housing (230a) which has desired number of batteries (not shown) and built-in microwave-sensor inside and the said LED or Laser or both light source (230c) (230g) (230i) can be plurality of LED dice, chip, dip, COB LEDs or laser light source. The said light-unit has gaps (230h) (230b) (230e) to install water-proof silicone or rubber or O-ring and assembled with the front clear or opaque or milky lens to get weather environment or meet standard for Wet or outdoor testament requirement.

From FIG. 39I show the alternative design for the battery powered or AC-powered security light which has main housing (231a) where install desired number of light-unit (231b) which has a 180 to 360 degrees rotatable Y or U base and one of round or ½ ball light-housing are fixed on the Y or U frame which allow the rounded or ½ ball light-housing can be rotatable on vertical from 180-360 degree so the two light-unit can have horizon and vertical rotatable angle has min. 180-360 degree to rotate and emit light-beam to any direction in x-y-z axis.

From FIG. 39J shown the AC-wire or Solar power or Built-in AC-to-DC or Outside AC-to-DC transformer or battery powered LED security light (232) which has the main-housing (232a) and the top has horizon or vertical rotating-angle each has 360 degree rotating so can emit light-beam or project lighted-patterns or lighted-image to any location or orientations. This is similar with the FIG. 39I.

From FIG. 39K is similar with FIG. 39J which different at the top light-unit (233b) (233b') which has the different adjustable-arms (233c) (233f) and arms-base (233d). Rest of parts is similar or alternative for FIG. 39I and FIG. 39J.

From FIG. 39L is similar with FIGS. 39I, 39J, 39K with alternative light-unit (234d) (234f) rest parts is similar with FIG. 39K.

From FIG. 39M is similar with the FIG. 39I, 39J, 39K, 39L with alternative light-unit (234a) (235g) rest parts is similar FIG. 39Med.

It is appreciated all the above discussed embodiments and figures or any replacement or equal functions or alternative skill should still fall within the current invention for LED light incorporated with any kind of camera or digital video device to take a full color image or video go through wireless communication including Wi-Fi and delivery to cloud storage-station has desired storage or calculation or incorporated the personal money accounts even for personal identification and all behaviors.

I claim:

1. An outdoor LED light device having a camera assembly, comprising:
    at least one LED light having built-in LEDs that are turned on for a period of time, without flashing, by a photo sensor and one of a motion or radar, photo sensor to supply predetermined and sufficient brightness in front of the built-in camera assembly to capture a full color digital photo, digital video, or digital image, in a dark environment without photo or infrared diodes; and
    a communication device for transmitting the captured digital data via a Wi-Fi or a Wi-Fi extender system to a portable phone or at least one wireless communication device,
    wherein the at least one LED light is powered by one of (i) AC power, (ii) a DC rechargeable battery of a solar module system, and (iii) DC power.

2. An LED light device having a camera assembly as claimed in claim 1, wherein the LED light device has one or more of:
    (a) an LED light source for illumination;
    (b) a camera assembly having a preferred shooting range; and
    (c) a movement detector with or without a comparison system by a motion or radar sensor and a photo sensor, that covers a distance of at least three feet and an angle of at least 30 degrees.

3. An LED light device having a camera assembly as claimed in claim 1, wherein the camera assembly captures the digital data, or a multiple way conversation, in response to a predetermined or remote control instruction that specifies a time period, zoom, focus, pixel resolution, angle, ASA, aperture, speed, and mode for day and night operation.

4. An LED light device having a camera assembly as claimed in claim 1, wherein the LED light device has at least one of an LED arrangement, LED units, LED bulb, and LED head, having at least one built-in LED light source that supplies a minimum of 50 lumens brightness.

5. An LED light device having a camera assembly as claimed in claim 1, wherein the at least one LED light includes built-in LEDs or an LED unit that turns on and off in response to pre-programming, a remote control, or at least one sensor to supply light having a predetermined brightness, function, period of time, brightness, and/or duty cycle upon detection of an object's preset movement or activities to illuminate a desired area for the camera assembly.

6. An LED light device having a camera assembly as claimed in claim 1, wherein the at least one LED light includes a built-in light source triggered by a motion sensor and a photo sensor in a dark environment.

7. An LED light device having a camera assembly as claimed in claim 1, wherein the LED light device includes a plurality of sensors and/or a comparison program to judge movement of an object and send a wireless notice to a phone or computer when the comparison program confirms that movement by a person has been detected.

8. An LED light device having a camera assembly as claimed in claim 1, wherein the LED light device uses a logic comparison or analysis system to judge whether a sensed object position shown on at least one phone screen has changed with time and therefore indicates a real image movement.

9. An LED light device having a camera assembly as claimed in claim 1, wherein the LED light device includes an image comparison program or system to judge real object movement within a shooting range of the camera assembly by monitoring at least one selected phone screen at least two different times, wherein when the image comparison program or system confirms that a real movement of a person has occurred, the light device sends out a wireless notice to a phone or computer.

10. An LED light device having a camera assembly as claimed in claim 1, wherein the LED light device further includes an MCU or CPU and a downloaded app for selecting and monitoring at least one phone screen to confirm that a real movement of a person rather than an animal, tree, or other object has occurred.

11. An LED light device having a camera assembly as claimed in claim 1, wherein the LED light device further includes a device for monitoring at least one selected area, section, or space within a camera shooting area and displayed on a mobile phone screen, for verification of movement by an app or software based on changes in images captured by the camera assembly at two different times to confirm that a real movement of a person rather than an animal, tree, or other object has occurred, and providing notification via Wi-Fi to the cloud and/or to mobile communication devices.

12. An LED light device having a camera assembly as claimed in claim 1, wherein confirmation of real movement of a person by the camera assembly is provided by at least one of (i) at least two sensors, (ii) an MCU or CPU, and (iii) a comparison system or software, and wherein upon confirmation of real object movement, the LED light sends a captured image and/or audio via a wireless system to personal communication devices by at least one of Wi-Fi, a Wi-Fi extender, the Internet, or a 3/4/5 mobile network.

13. An LED light device having a camera assembly as claimed in claim 1, wherein confirmation of movement in digital data captured by the camera assembly is provided by (i) at least two sensors, (ii) an MCU or CPU, or (iii) a comparison system or software, and wherein upon confirmation of real object movement, a captured image and/or audio is sent out by at least one of Zigbee, Zway, Bluetooth, Wi-Fi or a Wi-Fi extender with downloaded app software, and wires to a memory storage device selected from at least one of an SD card, disc drive, server memory, or memory of a phone or computer.

14. An LED light device having a camera assembly as claimed in claim 1, wherein confirmation of movement in digital data captured by the camera assembly is provided by (i) at least two sensors, (ii) an MCU or CPU, or (iii) a comparison system or software, and wherein upon confirmation of real object movement, a captured image and/or audio is sent out to a server or the cloud by Wi-Fi or a 3/4/5G cellular network for download via an app to a personal phone or computer.

15. An LED light device having a camera assembly as claimed in claim 1, wherein the camera assembly stores captured digital data inside memory units or a cloud storage for viewing, downloading, playing, or replaying by a phone or computer.

16. An LED light device having a camera assembly as claimed in claim 1, wherein the LED light device is configured to send out alerts or notices to a phone or computer of a designated person, police, neighbor, security department upon confirmation of a movement or trigger.

17. An LED light device having a camera assembly as claimed in claim 1, wherein the LED light device is an LED sensor security light.

18. An LED light device having a camera assembly as claimed in claim 1, wherein the LED light device is an LED flashlight, spotlight, or torch light.

19. An LED light device having a camera assembly as claimed in claim 1, wherein the LED light device is an LED garden light.

20. An LED light device having a camera assembly as claimed in claim 1, wherein the LED light device is an LED night light.

21. An LED light device having a camera assembly as claimed in claim 1, wherein the LED light device is an LED desktop or floor light.

22. An LED light device having a camera assembly as claimed in claim 1, wherein the LED light device is a built-in LED spotlight for a police car or construction vehicle.

23. An LED light device having a camera assembly as claimed in claim 1, wherein the LED light device is a spotlight for a car, bus, boar, train, firetruck, ambulance, or transportation equipment.

24. An LED outdoor sensor security light having a camera assembly, comprising
at least one LED light source built-in the security light and controlled by a photo sensor and one of a motion or radar sensor for providing sufficient brightness in front of the camera assembly of the security light to capture one or more of a color photo, video, image, and audio digital data in a dark environment without a photo diode or infrared diode; and
a wireless or Wi-Fi system with a downloaded app to transmit the capture digital data to a portable phone or communication device,
wherein the at least one LED outdoor sensor security light is powered by one of (i) AC power, (ii) a rechargeable battery of a solar power system, and (iii) DC power.

25. An LED vehicle spotlight having a camera assembly, comprising:
at least one LED light source built-in the spotlight for providing sufficient brightness to enable the camera assembly to capture one or more of a color photo, video, image, and audio digital data in a dark environment, and
a wireless or Wi-Fi system with a downloaded app to transmit the capture digital data to a portable phone or communication device,
wherein the LED vehicle spotlight is powered by at least one of: (i) a power source of a vehicle, (ii) a DC storage unit of at least one of a solar or chemical power unit, (iii) at least one battery, (iv) a rechargeable battery, and (v) a non-rechargeable battery.

26. An LED outdoor or entrance door light having a built-in camera assembly, comprising:
at least one LED light source controlled by a photo sensor and one of a motion or radar sensor for supplying sufficient brightness in front of the built-in camera assembly to capture one or more of a color photo, video, image, and audio digital data in a dark environment, and
a wireless or Wi-Fi system with a downloaded app to transmit the capture digital data to a portable phone or communication device,
wherein the LED outdoor or entrance door light is powered by at least one of: (i) a power source of a vehicle, (ii) a DC storage unit of at least one of a solar or chemical power unit, (iii) a rechargeable battery, and (iv) a non-rechargeable battery.

27. An LED ceiling recess light having a built-in camera assembly, comprising:
- at least one LED light source built-in the recess light and controlled by a photo sensor and one of a motion or radar sensor for supplying sufficient brightness to enable the camera assembly to capture one or more of a color photo, video, image, and audio digital data in a dark environment, and
- a wireless or Wi-Fi system with a downloaded app to transmit the capture digital data to a portable phone or communication device,
- wherein the LED ceiling recess light is powered by AC electricity when a control switch is turned on and powered by a battery when the control switch is turned off, through electric parts selected from: (i) an AC wire, (ii) an AC lamp holder, (iii) an AC wire with a quick connector, (iv) a DC power source, and (v) a battery.

28. An LED garden light having a built-in camera assembly, comprising:
- at least one LED light source built-in the garden light and controlled by a photo sensor and one of a motion or radar sensor for supplying sufficient brightness to enable the camera assembly to capture one or more of a color photo, video, streaming image, live image, and audio digital data, in a dark environment,
- a wireless or Wi-Fi system with a downloaded app to transmit the capture digital data to a portable phone or communication device,
- wherein the LED garden light is powered by one of (i) AC power, (ii) a rechargeable battery of a solar power system, and (iii) DC power.

29. An LED night light having a built-in camera assembly, comprising:
- at least one LED light source built-in the night light and having sufficient brightness in front of the built-in camera assembly to capture one or more of a color photo, video, image, and audio digital data, in a dark environment,
- wherein the LED night light is powered by one of (i) AC power, or (ii) DC power.

30. An LED desktop or floor light having a built-in camera assembly, comprising:
- at least one LED light source built-in the desktop or floor light and having sufficient brightness in front of the built-in camera assembly to capture one or more of a color photo, video, image, and audio digital data, in a dark environment,
- wherein the LED night light is powered by one of (i) AC power, or (ii) DC power from an external transformer or from an external DC power source through a plug-in wire.

31. An LED bulb having a built-in camera assembly, comprising:
- at least one LED light source built-in the LED bulb to enable the built-in camera assembly to capture one or more of (1) a digital color photo, digital video, or digital image, and (2) digital audio data, in a dark environment,
- a wireless system or Wi-Fi with a downloaded app, for transmitting the captured digital data to a portable phone or communication device,
- wherein the LED bulb is powered by (i) an AC wire, or (ii) a female bulb socket, and is controlled by an outside switch or wireless controller for at least one of predetermined functions, brightness, on-off time, countdown timing, or color.

32. An outdoor LED light device as claimed in claim 1, wherein the camera assembly further captures digital audio.

* * * * *